US007177266B2

(12) United States Patent
Sudo

(10) Patent No.: US 7,177,266 B2
(45) Date of Patent: Feb. 13, 2007

(54) OFDM COMMUNICATION APPARATUS AND OFDM COMMUNICATION METHOD

(75) Inventor: Hiroaki Sudo, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1085 days.

(21) Appl. No.: 10/182,104

(22) PCT Filed: Nov. 22, 2001

(86) PCT No.: PCT/JP01/10206

§ 371 (c)(1),
(2), (4) Date: Jul. 25, 2002

(87) PCT Pub. No.: WO02/43293

PCT Pub. Date: May 30, 2002

(65) Prior Publication Data

US 2003/0012126 A1    Jan. 16, 2003

(30) Foreign Application Priority Data

Nov. 27, 2000    (JP) ............................. 2000-360113

(51) Int. Cl.
*H04J 11/00* (2006.01)
*H04J 1/16* (2006.01)
(52) U.S. Cl. ...................................... 370/208; 370/252
(58) Field of Classification Search .................... None
See application file for complete search history.

(56) References Cited

U.S. PATENT DOCUMENTS 5,719,883 A * 2/1998 Ayanoglu ................... 714/751

| 6,512,758 B1 * | 1/2003 | Sato et al. .................. 370/344 |
| 6,714,511 B1 * | 3/2004 | Sudo et al. ................. 370/208 |
| 6,940,845 B2 * | 9/2005 | Benveniste ................. 370/349 |
| 7,027,464 B1 * | 4/2006 | Nakahara et al. ........... 370/503 |
| 7,039,120 B1 * | 5/2006 | Thoumy et al. ............ 375/275 |

(Continued)

FOREIGN PATENT DOCUMENTS

JP    06204969    7/1994

(Continued)

OTHER PUBLICATIONS

International Search Report dated Feb. 12, 2002.

(Continued)

*Primary Examiner*—Andrew C. Lee
(74) *Attorney, Agent, or Firm*—Stevens, Davis, Miller & Mosher, LLP

(57) ABSTRACT

An OFDM communication apparatus and OFDM communication method that both improve information signal transmission efficiency and improve demodulated signal error rate characteristics in an OFDM method to which multicasting is applied. An OFDM communication apparatus according to the present invention comprises a receiving section that receives an OFDM signal transmitted to a plurality of OFDM communication apparatuses, a detecting section that detects whether or not there is an error in a received OFDM signal, a generating section that generates a retransmission request OFDM signal by superimposing a retransmission request signal on a previously specified subcarrier when there is an error in a received OFDM signal, and a transmitting section that transmits a generated retransmission request OFDM signal at previously set timing common to all the above-mentioned plurality of OFDM communication apparatuses.

34 Claims, 27 Drawing Sheets

U.S. PATENT DOCUMENTS 7,095,708 B1 * 8/2006 Alamouti et al. .......... 370/208

FOREIGN PATENT DOCUMENTS

| JP | 10229383 | 8/1998 |
| JP | 10247901 | 9/1998 |
| JP | 11215136 | 8/1999 |
| JP | 2000031944 | 1/2000 |

OTHER PUBLICATIONS

Toshimitsu, Kiyoshi, "NAK Sense ARQ Scheme for Milticast Wireless Access System", Corporate R&D Center, Toshib Corp., B-5-22, p. 407, 2000, with partial English translation.

* cited by examiner

OFDM COMMUNICATION APPARATUS AND OFDM COMMUNICATION METHOD

TECHNICAL FIELD

The present invention relates to an OFDM (Orthogonal Frequency Division Multiplexing) method communication apparatus (hereinafter referred to as "OFDM communication apparatus"), and more particularly to an OFDM communication apparatus that performs retransmission control (control whereby, if an error occurs in a demodulated signal in a receiving-side apparatus for a predetermined transmit signal, that transmit signal is retransmitted to the receiving-side apparatus).

BACKGROUND ART

Retransmission control in a conventional OFDM system will now be described taking a case where a transmitting-side apparatus performs retransmission to a receiving-side apparatus as an example. First, the transmitting-side apparatus performs IFFT (inverse Fourier transform) processing using an information signal, etc., for the receiving-side apparatus, and thereby generates an OFDM signal in which that information signal is superimposed on each subcarrier. The transmitting-side apparatus then generates a burst unit signal by performing predetermined transmission processing on the generated OFDM signal, and transmits the generated burst unit signal to the receiving-side apparatus.

The receiving-side apparatus extracts the signal superimposed on each subcarrier by performing FFT processing (Fourier transform processing) on a received signal for the above-described burst unit signal. The receiving-side apparatus then generates a demodulated signal by performing demodulation processing on the extracted signal, and performs error detection processing on the generated demodulated signal. If an error has occurred in the generated demodulated signal, the receiving-side apparatus transmits a burst unit signal containing a signal requesting retransmission of the above-mentioned burst unit signal (hereinafter referred to as "retransmission request signal") to the transmitting-side apparatus. A burst unit signal in the receiving-side apparatus is generated by means of the same kind of processing as in the transmitting-side apparatus described above.

On receiving a burst unit signal containing a retransmission request signal from the receiving-side apparatus, the transmitting-side apparatus generates and transmits again (retransmits) the above-described kind of burst unit signal using the same information signal as the above-described information signal. By this means, the receiving-side apparatus can generate a demodulated signal with improved error rate characteristics.

The same kind of retransmission control as in the OFDM method, as described above, is also performed in the OFDM-CDMA method, which combines the OFDM method and CDMA method. Retransmission control in the OFDM-CDMA method is similar to retransmission control in the OFDM method except for the following point. Namely, in the OFDM-CDMA method, the transmitting-side apparatus generates an OFDM signal by performing IFFT processing using an information signal that has undergone modulation processing and spreading processing, and the receiving-side apparatus generates a demodulated signal by performing despreading processing and demodulation processing on a signal extracted by means of IFFT processing.

Meanwhile, communication has been investigated in which multicasting is applied to the OFDM method and OFDM-CDMA method (hereinafter referred to simply as "OFDM method"). Multicasting is communication whereby a transmitting-side apparatus transmits a specific (identical) burst unit signal to a plurality of receiving-side apparatuses (that is, communication whereby a plurality of receiving-side apparatuses receive a burst unit signal transmitted by the same transmitting-side apparatus). Retransmission control in an OFDM method to which this kind of multicasting is applied is similar to retransmission control in the OFDM method described above, except for the following point.

Namely, the transmitting-side apparatus transmits the same burst unit signal to a plurality of receiving-side apparatuses, and if an error occurs in a generated demodulated signal, the plurality of receiving-side apparatuses transmit a burst unit signal containing a retransmission request signal to the transmitting-side apparatus. On receiving such a burst unit signal from any of the plurality of receiving-side apparatuses, the transmitting-side apparatus retransmits the above-described burst unit signal to the plurality of receiving-side apparatuses. By this means, the plurality of receiving-side apparatuses can generate a demodulated signal with improved error rate characteristics.

However, there is a problem with the above-described conventional OFDM method, as follows. Namely, when an error occurs in a demodulated signal, the transmitting-side apparatus performs retransmission to a receiving-side apparatus in response to a retransmission request issued by the receiving-side apparatus to the transmitting-side apparatus. By this means, a receiving-side apparatus can improve demodulated signal error rate characteristics.

However, in an OFDM method to which multicasting is applied, since a specific burst unit signal transmitted by a transmitting-side apparatus is received by a plurality of receiving-side apparatuses, there are cases where a plurality of receiving-side apparatuses in which an error has occurred in the received burst unit signal transmit a burst unit signal containing a retransmission request signal simultaneously in the same frame. This situation will be described in detail with reference to FIG. 1. FIG. 1 is a schematic diagram showing the frame format used in the conventional OFDM method.

The transmitting-side apparatus transmits specific burst unit signals (that is, down burst 1 and down burst 2) to a plurality of receiving-side apparatuses. Of this plurality of receiving-side apparatuses, a receiving-side apparatus that detects an error in the demodulated signal for the above-mentioned burst unit signals transmits a burst unit signal containing a retransmission request signal (for example, retransmission request burst 1) to the transmitting-side apparatus. If there are a plurality of receiving-side apparatuses that have detected an error in the demodulated signal, each of such receiving-side apparatuses (in FIG. 1, four receiving-side apparatuses) transmits one burst unit signal.

Therefore, the greater the number of receiving-side apparatuses that detect an error in the demodulated signal, the greater is the time occupied by these burst unit signals containing a retransmission request signal. As these burst unit signals containing a retransmission request signal are not directly involved in information signal transmission, information signal transmission efficiency falls in proportion to the amount of time occupied by burst unit signals containing a retransmission request signal in the same frame. A fall in information signal transmission efficiency can be prevented by arranging for a receiving-side apparatus that detects an error in a demodulated signal not to transmit a burst unit signal containing a retransmission request signal. In this case, however, demodulated signal error rate characteristics in a receiving-side apparatus will deteriorate.

As described above, a problem with an OFDM method to which conventional multicasting is applied is that it is difficult to achieve both an improvement in information signal transmission efficiency and an improvement in demodulated signal error rate characteristics, due to the fact that there are cases where a plurality of receiving-side apparatuses that have detected an error in a received burst unit signal transmit burst unit signals containing a retransmission request signal in the same frame.

DISCLOSURE OF INVENTION

It is an object of the present invention to provide an OFDM communication apparatus that achieves both an improvement in information signal transmission efficiency and an improvement in demodulated signal error rate characteristics in an OFDM method to which multicasting is applied.

A first theme of the present invention is that when, in OFDM communication, retransmission is requested for a predetermined OFDM signal transmitted by the same transmitting-side apparatus to a plurality of receiving-side apparatuses, each receiving-side apparatus transmits to that transmitting-side apparatus a retransmission OFDM signal in which a predetermined signal is superimposed only on a subcarrier specific to the above-mentioned predetermined OFDM signal among that plurality of receiving-side apparatuses at a time identical to the transmission time of a retransmission OFDM signal by other receiving-side apparatuses. In addition, the transmitting-side apparatus extracts the signal superimposed on each subcarrier by means of Fourier transform processing on an above-mentioned retransmission OFDM signal, and based on the level of a signal superimposed on a subcarrier specific to an OFDM signal, retransmits that OFDM signal to the receiving-side apparatus that received that OFDM signal.

A second theme of the present invention is that, in OFDM-CDMA communication, a transmitting-side apparatus generates a multiplex signal by multiplexing information signals that have undergone spreading processing by means of a spreading code specific to a group (a group of receiving-side apparatuses that receive the same information signal), and transmits an OFDM signal generated by means of inverse Fourier transform processing on the generated multiplex signal to a plurality of receiving-side apparatuses, and on the other hand, a receiving-side apparatus, when requesting retransmission of an information signal concerning a group to which this receiving-side apparatus belongs, generates a multiplex signal by multiplexing predetermined signals that have undergone spreading processing by means of a spreading code specific to the group, and transmits to the transmitting-side apparatus a retransmission OFDM signal generated by performing inverse Fourier transform processing on the generated multiplex signal, at a time identical to the transmission time of a retransmission OFDM signal by other receiving-side apparatuses. In addition, the transmitting-side apparatus generates a demodulated signal for the above-mentioned group by means of Fourier transform processing and despreading processing using a spreading code specific to the group on a received retransmission OFDM signal, and based on the level of a demodulated signal for that group, recognizes whether or not a retransmission request has been made by a receiving-side apparatus belonging to that group for an information signal for that group.

BEST MODE FOR CARRYING OUT THE INVENTION

Figure 1:
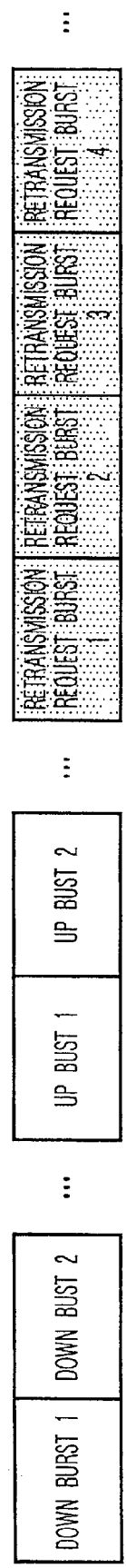
FIG. 1 is a schematic diagram showing the frame format used in the conventional OFDM method.

With reference now to the accompanying drawings, embodiments of the present invention will be explained in detail below. In Embodiment 1 through Embodiment 4, retransmission control in the OFDM method is described, and in Embodiment 5 through Embodiment 14, retransmission control in the OFDM-CDMA method is described.

(Embodiment 1)

In this embodiment, retransmission control in the OFDM method is described. First, an overview of this embodiment will be given. A transmitting-side apparatus transmits a specific burst unit signal (hereinafter referred to as "multicast burst") to a plurality of receiving-side apparatuses. Specifically, the transmitting-side apparatus transmits sequentially group-specific multicast bursts to groups of receiving apparatuses (hereinafter referred to as "groups") that receive the same multicast burst. For example, the transmitting-side apparatus transmits multicast burst 1 to group 1 (receiving-side apparatus 1 through receiving-side apparatus 10) in time t1, and transmits multicast burst 2 to group 2 (receiving-side apparatus 11 through receiving-side apparatus 20) in time t2.

Figure 2:
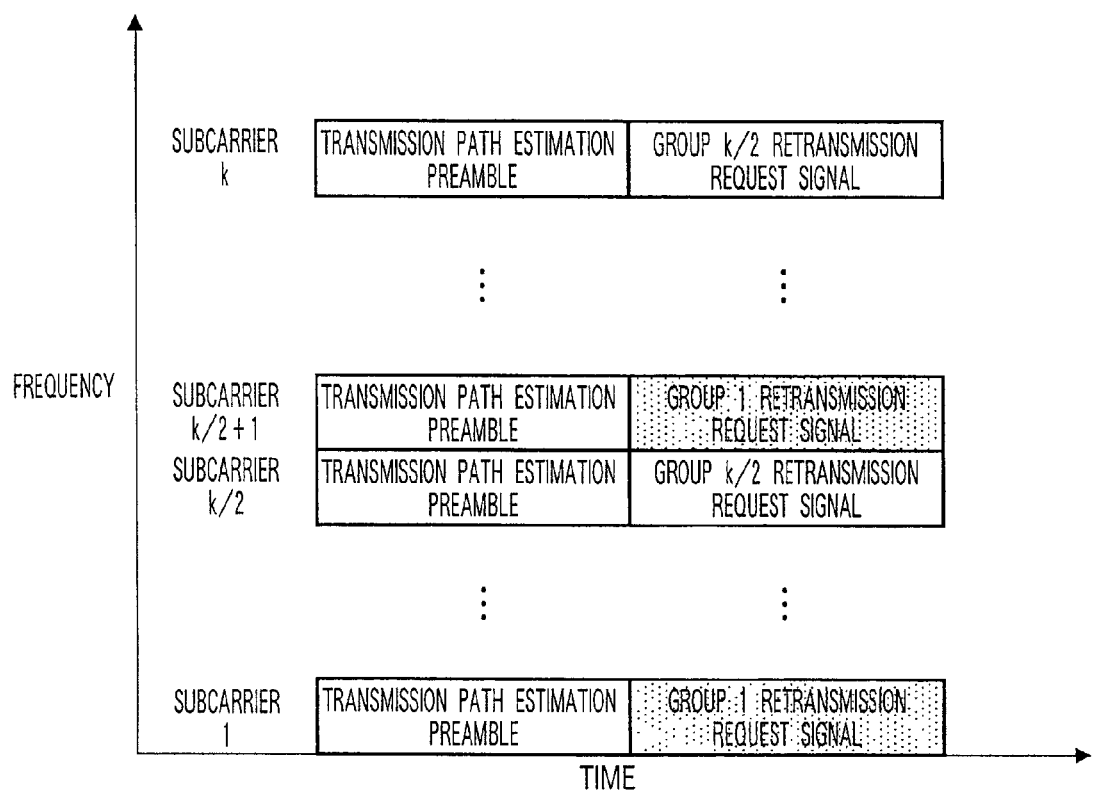
FIG. 2 is a schematic diagram showing an example of the subcarrier arrangement in a retransmission request burst used by an OFDM communication apparatus according to Embodiment 1 of the present invention.

If an error occurs in the demodulated signal for a multicast burst, all receiving-side apparatuses transmit a burst unit signal containing a retransmission request signal (hereinafter referred to as "retransmission request burst") to the transmitting-side apparatus at the same time. Specifically, each receiving-side apparatus transmits a retransmission request burst in which a retransmission request signal is superimposed on a subcarrier specific to the multicast burst for which retransmission is requested to the transmitting-side apparatus at the same time (at a time common to all receiving-side apparatuses). A retransmission request burst will now be described in detail with reference to FIG. 2. FIG. 2 is a schematic diagram showing an example of the subcarrier arrangement in a retransmission request burst used by an OFDM communication apparatus according to Embodiment 1 of the present invention.

As shown in FIG. 2, there are assigned to each multicast burst (each group) a plurality of (in this embodiment, two) subcarriers specific to that multicast burst (group). Specifically, if the total number of subcarriers is designated k, two subcarriers, subcarrier 1 and subcarrier k/2+1, are assigned to multicast burst 1 (that is, the multicast burst transmitted to group 1), and two subcarriers, subcarrier k/2 and subcarrier k, are assigned to multicast burst k/2 (that is, the multicast burst transmitted to group k/2).

According to the subcarrier arrangement shown in FIG. 2, each receiving-side apparatus generates a retransmission request burst by superimposing a retransmission request signal for a subcarrier assigned specifically to a multicast burst in which an error occurs. When a plurality of multicast bursts are received, each receiving-side apparatus generates a retransmission request burst by superimposing a retransmission request signal on subcarriers assigned specifically to all multicast bursts in which an error occurs. An arbitrary signal, such as "1" or "0", for example, can be used as the retransmission request signal superimposed on a subcarrier.

A receiving-side apparatus transmits a retransmission request burst as described above to the transmitting-side apparatus at a time common to all receiving-side apparatuses (that is, at a time identical to the time of transmission of a retransmission request burst by all receiving-side apparatuses). That is to say, the transmitting-side apparatus can receive a signal for recognizing retransmission requests from all receiving-side apparatuses (more specifically, which multicast bursts among all multicast bursts should be retransmitted) within the time corresponding to one retransmission burst.

Specifically, the transmitting-side apparatus first extracts the signal transmitted by each subcarrier by performing FFT processing using retransmission request bursts transmitted by all receiving-side apparatuses at the same time. Then, using the reception level of the signal transmitted by each subcarrier, the transmitting-side apparatus can recognize the receiving-side apparatus by which the retransmission request for each multicast burst was issued. That is to say, when, for example, the reception levels of signals transmitted by subcarrier 1 and subcarrier k/2+1 are greater than or equal to a threshold value for multicast burst 1, the transmitting-side apparatus can recognize the fact that are transmission request for multicast burst 1 has been issued by one of the receiving-side apparatuses. To give a more detailed explanation, for multicast burst 1, the transmitting-side apparatus selects, from subcarrier 1 and subcarrier k/2+1, the subcarrier whose transmitted signal reception level is higher, and furthermore, if the reception level of the signal transmitted by the selected subcarrier is greater than or equal to a threshold value, can recognize the fact that a retransmission request for multicast burst 1 has been issued by one of the receiving-side apparatuses.

It is theoretically possible to use a retransmission request burst in which a retransmission request signal is superimposed on one subcarrier or three or more subcarriers assigned to each multicast burst. However, due to the factors indicated below, it is desirable to use a retransmission request burst in which a retransmission request signal is superimposed on two subcarriers assigned to each multicast burst.

Figure 3:
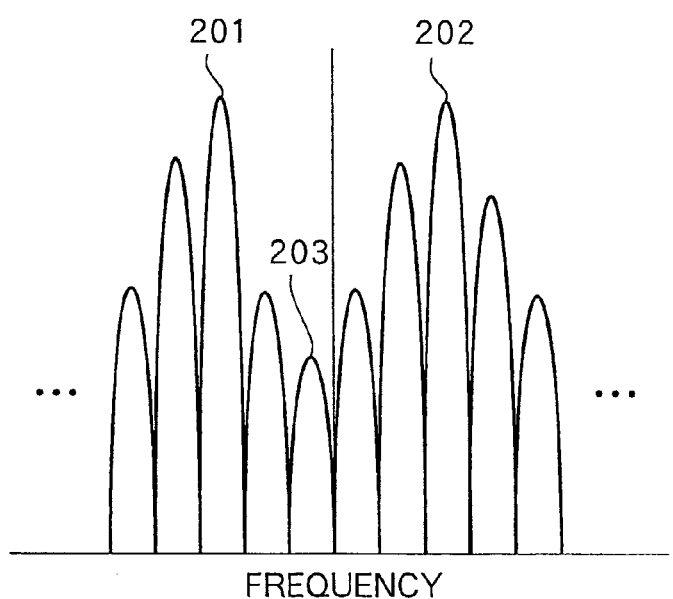
FIG. 3 is a schematic diagram showing an example of reception levels of signals transmitted by individual subcarriers in OFDM communication.

FIG. 3 is a schematic diagram showing an example of reception levels of signals transmitted by individual subcarriers in OFDM communication. In a multipath environment, as shown in FIG. 3, the reception levels of signals transmitted by all subcarriers are not identical, and the reception level of the signal transmitted by a particular subcarrier (subcarrier 203) may fall significantly below the reception levels of signals transmitted by other subcarriers (subcarrier 201 and subcarrier 202).

In such a multipath environment, when a retransmission request burst is used in which a retransmission request signal is superimposed on one subcarrier assigned to each multicast burst, the reception level of the signal transmitted by that subcarrier may fall significantly. In this case, there is a possibility that the transmitting-side apparatus will erroneously determine that a retransmission request for a predetermined multicast burst has not been issued by any receiving-side apparatus despite the fact that are transmission request for that predetermined multicast burst has been issued by one of the receiving-side apparatuses.

A possible way to prevent such a situation arising is to use a retransmission request burst with a retransmission request signal superimposed on three or more subcarriers assigned to each multicast burst. In this case, for a predetermined multicast burst, the transmitting-side apparatus selects, from three or more subcarriers assigned to that multicast burst, the subcarrier whose transmitted signal reception level is highest, and using the reception level of the signal transmitted by the selected subcarrier, can recognize whether or not a retransmission request for the above-mentioned multicast burst has been issued by any of the receiving-side apparatuses.

However, as the number of subcarriers is limited, the larger the number of subcarriers on which a retransmission request signal is superimposed on one multicast burst, the smaller is the number of multicast bursts for which retransmission can be requested by one retransmission request burst. Therefore, in this embodiment, a retransmission burst is used whereby a retransmission request signal is superimposed on two subcarriers assigned each multicast burst. By this means, the transmitting-side apparatus can reliably recognize a retransmission request for a predetermined multicast burst issued by any receiving-side apparatus without affecting the number of multicast bursts for which retransmission can be requested by one retransmission request burst.

Figure 4:
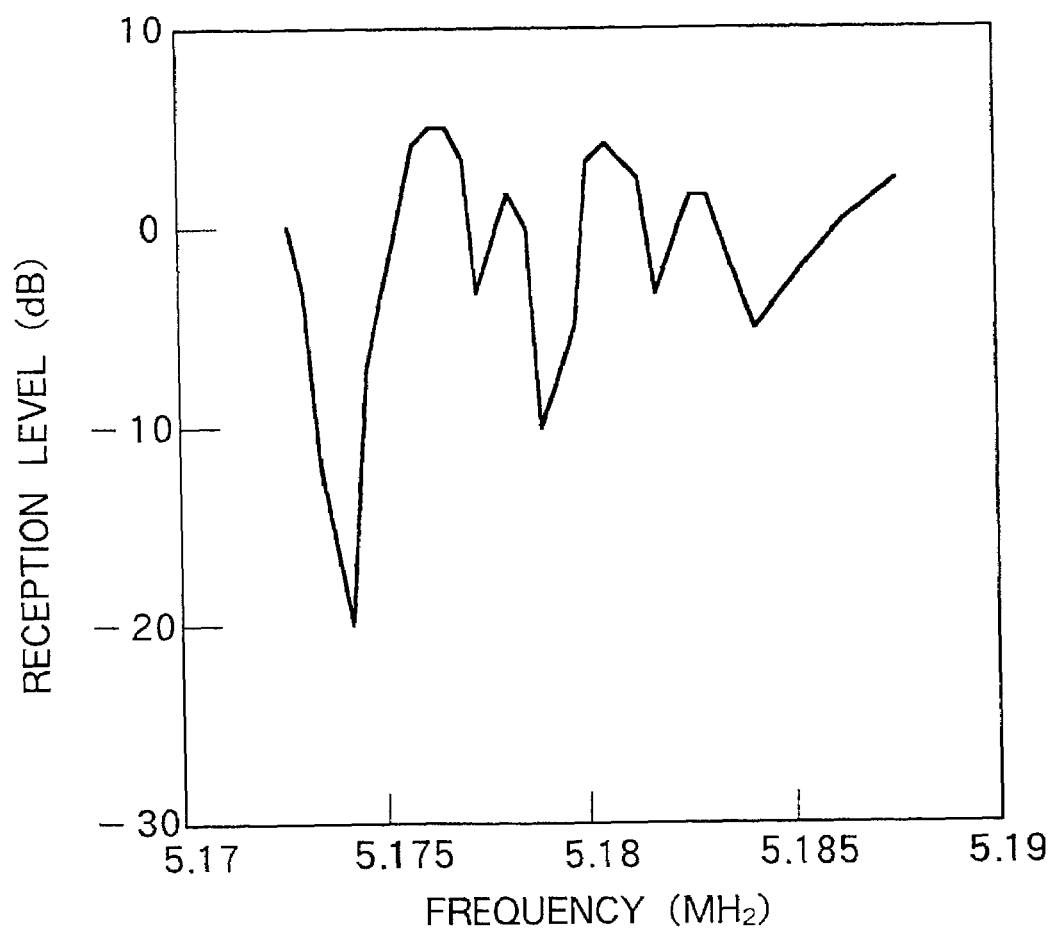
FIG. 4 is a schematic diagram showing an example of a frequency characteristic in a multipath environment in OFDM communication.

Next, the method of determining two subcarriers that are assigned specifically to a predetermined multicast burst will be described with reference to FIG. 4. FIG. 4 is a schematic diagram showing an example of a frequency characteristic in a multicast environment in OFDM communication. In FIG. 4, it is assumed that the multipath delay variance (that is, the difference in arrival times of the principal wave and a desired wave) is 150 ns, and the signal bandwidth is 16.2 MHz.

In order to isolate variance due to fading in the signals transmitted by the two subcarriers, the interval shown in the following equation must be left between the two subcarriers.

Necessary subcarrier interval=1/(2×delay variance)  (1)

Even in a multipath environment, there will not be a fall in the reception level of either of the signals transmitted by two subcarriers separated by the interval shown in Equation (1). Therefore, by assigning two subcarriers separated by an interval that satisfies Equation (1) to a predetermined multicast burst, it is possible to prevent the phenomenon whereby the transmitting-side apparatus erroneously determines that a retransmission request for a predetermined multicast burst has not been issued by any receiving-side apparatus despite the fact that a retransmission request for that predetermined multicast burst has been issued by one of the receiving-side apparatuses.

In the kind of multipath environment shown in FIG. 4, for example, since the multipath delay variance is 150 ns, it is possible to prevent a fall in the reception level of either of the two subcarriers as long as a frequency interval of 3.3 MHz or more is left between those two subcarriers. This completes the overview of this embodiment.

Figure 5:
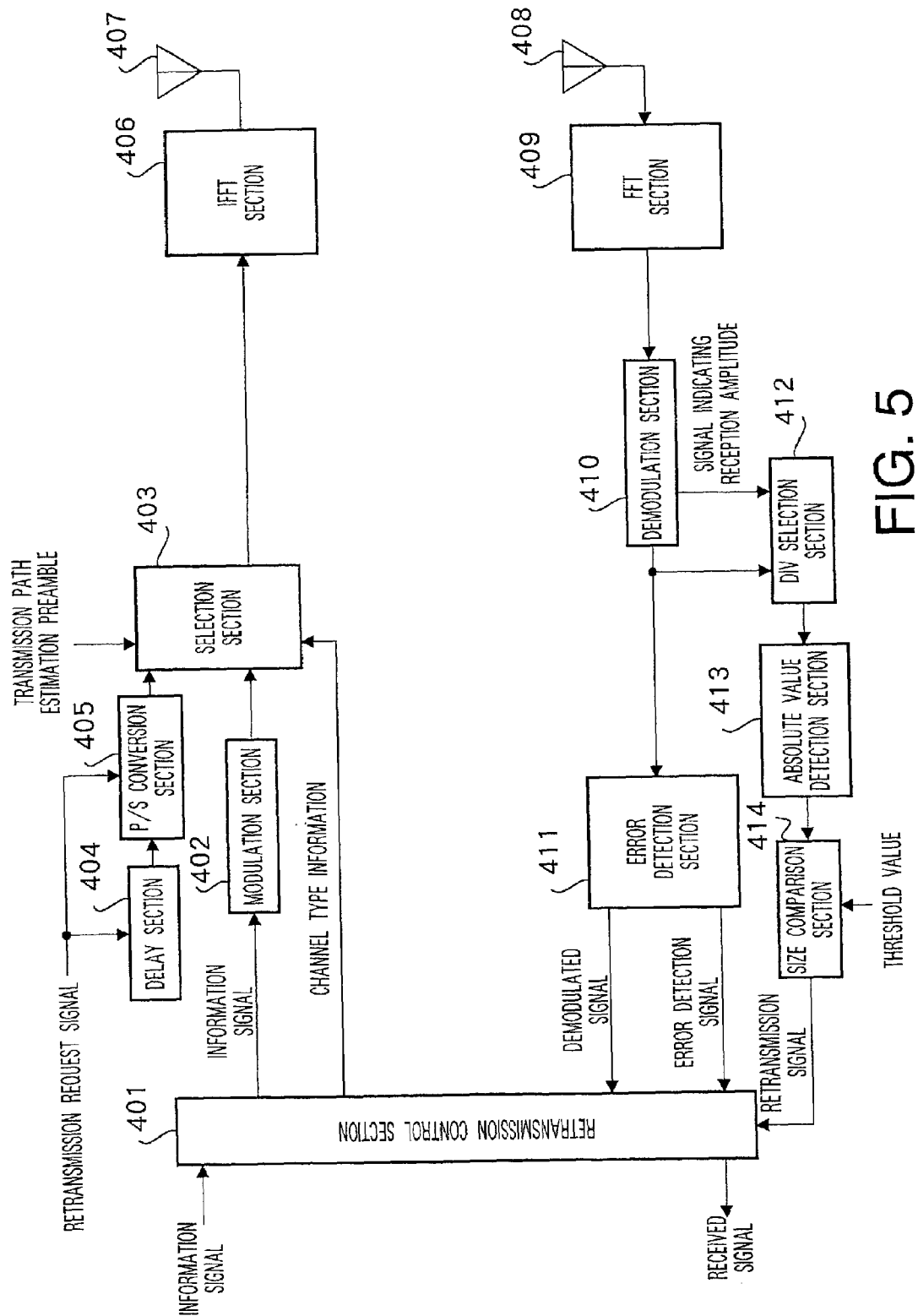
FIG. 5 is a block diagram showing the configuration of an OFDM communication apparatus according to Embodiment 1 of the present invention.

Next, the configuration of an OFDM communication apparatus according to this embodiment will be described with reference to FIG. 5. FIG. 5 is a block diagram showing the configuration of an OFDM communication apparatus according to Embodiment 1 of the present invention. An OFDM communication apparatus according to this embodiment comprises a transmitting system and a receiving system.

In the transmitting system, a retransmission control section 401 outputs a new information signal or a retransmission information signal to a modulation section 402, and also outputs channel type information, indicating whether this OFDM communication apparatus is to transmit a multicast burst (a multicast burst containing a new information signal or a multicast burst containing a retransmission information signal) or a retransmission request burst, to a selection section 403. The modulation section 402 performs modulation processing on the information signal from the retransmission control section 401, and outputs the information signal that has undergone modulation processing to the selection section 403.

A delay section 404 delays a retransmission request signal by a predetermined time, and outputs the delayed retransmission request signal to a parallel/serial (hereinafter referred to as "P/S") conversion section 405. The P/S conversion section 405 performs P/S conversion processing on the retransmission request signal and the retransmission request signal that has been delayed for a predetermined time, and outputs the retransmission request signal obtained by P/S conversion processing to the selection section 403.

Based on the channel type information, the selection section 403 outputs a transmission path estimation preamble (a known signal used for transmission path estimation by a communicating party), an information signal that has undergone modulation processing by the modulation section 402, or a retransmission request signal from the P/S conversion section 405 to an IFFT section 406.

The IFFT section 406 generates an OFDM signal by performing IFFT processing using the information signal, retransmission request signal, or transmission path estimation preamble from the selection section 403. Then the IFFT section 406 generates a burst unit signal (hereinafter referred to simply as "burst")—that is, a multicast burst or retransmission request burst-by performing predetermined transmission processing and so forth on the generated OFDM signal. The generated burst is transmitted to the communicating party via an antenna 407.

Meanwhile, in the receiving system, an FFT section 409 performs predetermined reception processing on a signal received by an antenna 408 (received signal), and extracts the signal transmitted by each subcarrier by performing FFT processing using the received signal that has undergone predetermined reception processing.

A demodulation section 410 first generates a single-sequence signal by performing P/S conversion processing on the signal transmitted by each subcarrier (plurality of sequences of signals). The retransmission control section 401 then generates a signal indicating the reception amplitude of the signal transmitted by each subcarrier by performing absolute value computation and so forth on the generated single-sequence signal, and outputs the generated signal to a diversity (hereinafter referred to as "DIV") selection section 412. The demodulation section 410 also generates a demodulated signal by performing demodulation processing including transmission path compensation processing on the generated single-sequence signal, and outputs this demodulated signal to the DIV selection section 412 and an error detection section 411.

The DIV selection section 412 selects from the subcarriers a subcarrier whose transmitted signal level is higher, and outputs the demodulated signal for the signal transmitted by the selected subcarrier to an absolute value detection section 413. The absolute value detection section 413 detects the absolute value of the demodulated signal from the DIV selection section 412. A size comparison section 414 compares the absolute value detected by the absolute value detection section 413 with a threshold value, and based on the result of the comparison, outputs a signal requesting retransmission of the multicast burst received by the OFDM communication apparatus (hereinafter referred to as "retransmission signal") to the retransmission control section 401.

The error detection section 411 performs error detection processing on the generated demodulated signal, and outputs the demodulated signal that has undergone error detection processing and a signal indicating the error detection result (hereinafter referred to as "error detection signal") to the retransmission control section 401.

Based on the error detection signal from the error detection section 411, the retransmission control section 401 first outputs only a demodulated signal in which an error did not occur as a received signal. The retransmission control section 401 also executes retransmission control in order to request the communicating party to retransmit a multicast burst corresponding to a demodulated signal in which an error occurred. Furthermore, based on the retransmission signal from the size comparison section 414, the retransmission control section 401 executes retransmission control for performing retransmission of a multicast burst for which retransmission has been requested by a communicating party.

Figure 6:
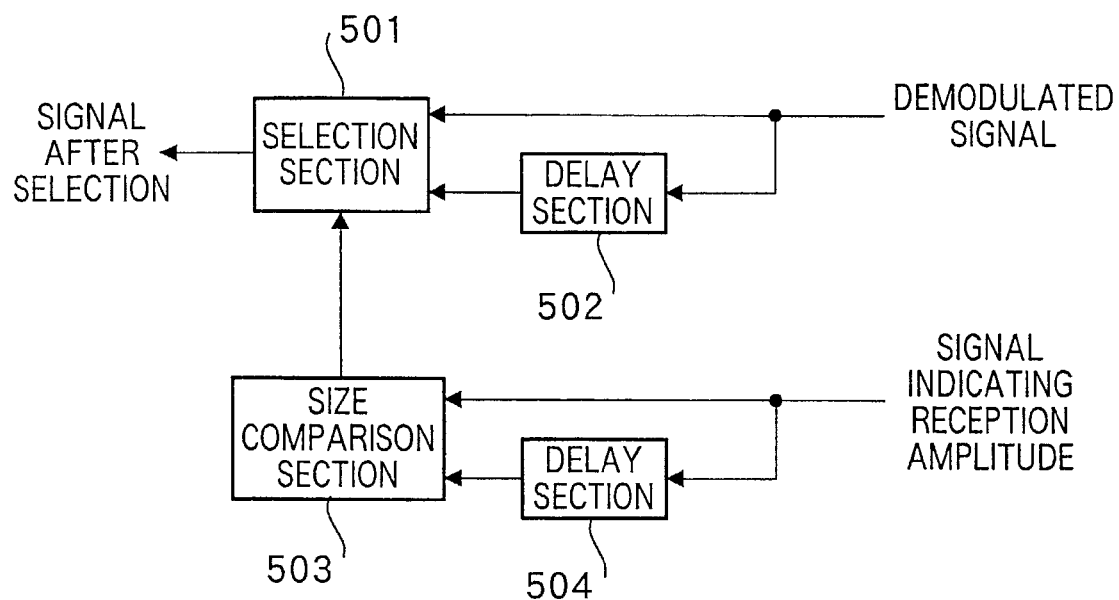
FIG. 6 is a block diagram showing the configuration of the DIV selection section in an OFDM communication apparatus according to Embodiment 1 of the present invention.
Figure 7:
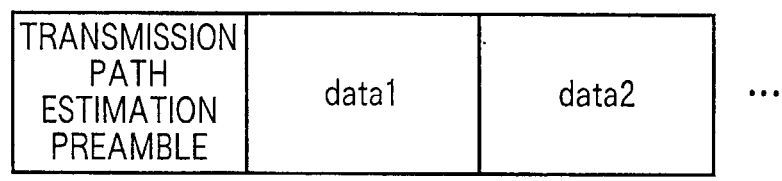
FIG. 7 is a schematic diagram showing the burst format used in an OFDM communication apparatus according to Embodiment 1 of the present invention.

The operation of an OFDM communication apparatus that has the above configuration will now be described with additional reference to FIG. 6 and FIG. 7. FIG. 6 is a block diagram showing the configuration of the DIV selection section 412 in an OFDM communication apparatus according to Embodiment 1 of the present invention, and FIG. 7 is a schematic diagram showing the burst format used in an OFDM communication apparatus according to Embodiment 1 of the present invention. To simplify the explanation, it will hereinafter be assumed that a receiving-side apparatus receives only one multicast burst (here, multicast burst 1) transmitted by the transmitting-side apparatus. The transmitting-side apparatus and receiving-side apparatuses are each provided with an OFDM communication apparatus as shown in FIG. 5.

<Operation of Transmitting System in Transmitting-side Apparatus>

In FIG. 5, firstly, in the transmitting system in the transmitting-side apparatus, an information signal output by the retransmission control section 401 undergoes predetermined modulation processing by the modulation section 402 and is then output to the selection section 403. Also, channel type information indicating that this OFDM communication apparatus is to transmit a multicast burst (a multicast burst containing a new information signal) is output from the retransmission control section 401 to the selection section 403.

Based on the above-mentioned channel type information, a transmission path estimation preamble is output from the selection section 403 to the IFFT section 406, followed by an information signal that has undergone modulation processing by the modulation section 402.

In the IFFT section 406, IFFT processing is performed on the transmission path estimation preamble and the information signal that has undergone modulation processing output from the selection section 403. Specifically, the transmission path estimation preamble and the information signal that has undergone modulation processing are first converted from a single-sequence signal to a plurality of sequences of signals. Moreover, by having IFFT processing performed on the signal of each sequence, an OFDM signal is generated in which the signal of each sequence is superimposed on a sequence-specific subcarrier. Following this, a multicast burst is generated by having predetermined transmission processing performed on the generated OFDM signal. Specifically, as shown in FIG. 7, a multicast burst containing a transmission path estimation preamble of a predetermined number of symbols and an information signal of a predetermined number of symbols (here, data 1 and data 2) is generated. The multicast burst generated in this way (here, multicast burst 1), is transmitted to the plurality of receiving-side apparatuses corresponding to this multicast burst 1 (here, receiving-side apparatus through receiving-side apparatus 10) via antenna 407. By performing the same kind of processing as described above, a plurality of multicast bursts are transmitted sequentially via antenna 407.

<Operation of Receiving System in Receiving-side Apparatus>

In the receiving system of a receiving-side apparatus that receives this multicast burst 1, the received signal from antenna 408 first undergoes predetermined reception processing in the FFT section 409. Then the signal transmitted by each subcarrier is extracted by performing FFT processing on the received signal that has undergone predetermined reception processing. The signal transmitted by each subcarrier is output to the demodulation section 410.

In the demodulation section 410, a demodulated signal is generated by performing demodulation processing on the signals transmitted by the subcarriers. Specifically, the signals transmitted by the subcarriers are converted from a plurality of sequences of signals to a single-sequence received signal. Following this, transmission path estimation is performed using the signal corresponding to a transmission path estimation preamble in the single-sequence received signal. Using the transmission path estimation result, a demodulated signal is then obtained by performing transmission path compensation on the signal corresponding to an information signal in the single-sequence received signal. The obtained demodulated signal is output to the error detection section 411.

In the error detection section 411, error correction processing (such as CRC, for example) is executed on the demodulated signal generated by the demodulation section 410. An error detection signal indicating the result of this error detection processing is output to the retransmission control section 401 together with the demodulated signal generated by the demodulation section 410.

In the retransmission control section 401, it is first determined whether or not an error has occurred in the demodulated signal, based on the error detection signal. If an error has not occurred in the demodulated signal, this demodulated signal is output to latter-stage circuitry (not shown) as a received signal. If an error has occurred in the demodulated signal, this demodulated signal is discarded and retransmission control is performed in order to request the transmitting-side apparatus to retransmit the multicast burst corresponding to this demodulated signal. Details of the retransmission control are as follows.

<Operation of Transmitting System in Receiving-side Apparatus>

In the transmitting system of the receiving-side apparatus, channel type information indicating transmission of a retransmission request burst is output from the retransmission control section 401 to the selection section 403. In addition, a retransmission request signal is output from the delay section 404 to the P/S conversion section 405. A retransmission request signal delayed by a predetermined time by the delay section 404 is output to the P/S conversion section 405. The retransmission request signal used when requesting retransmission of the same multicast burst is the same signal not only in this receiving-side apparatus but among all receiving-side apparatuses that request retransmission of the above-mentioned same multicast burst.

In the P/S conversion section 405, P/S conversion processing is performed on the retransmission request signal and the retransmission request signal delayed by a predetermined time so that a retransmission request signal is superimposed appropriately on two subcarriers specific to a multicast burst received by this OFDM communication apparatus in IFFT processing by the IFFT section 406. A retransmission request signal that has undergone P/S conversion processing is output to the selection section 403.

Based on channel type information from the retransmission control section 401, a transmission path estimation preamble is output from the selection section 403 to the IFFT section 406, and then the retransmission request signal from the P/S conversion section 405 is output.

In the IFFT section 406, IFFT processing is performed on the transmission path estimation preamble and retransmission request signal from the selection section 403, and an OFDM signal is generated. By this means a retransmission request burst is generated. The IFFT processing here is similar to the above-described IFFT processing in the transmitting system, except for the following point. Namely, in the IFFT section 406, a transmission path estimation preamble and retransmission request signal converted to a plurality of sequences of signals are superimposed on only two subcarriers assigned specifically to a multicast burst received by this OFDM communication apparatus (subcarrier 1 and subcarrier k/2+1 in FIG. 2). No signals whatever are superimposed on subcarriers other than these two subcarriers. It goes without saying that a frequency interval set in accordance with Equation (1) above is provided between these two subcarriers. It also goes without saying here that not only in this receiving-side apparatus but in all receiving-side apparatuses that receive the same multicast burst, when requesting retransmission of the above-mentioned same multicast burst, a retransmission request signal is superimposed on a subcarrier specific to the above-mentioned same multicast burst in all receiving-side apparatuses.

The retransmission request burst generated by this IFFT section 406 is transmitted to the transmitting-side apparatus via antenna 407. As shown in FIG. 7, this retransmission request burst contains a transmission path estimation preamble of a predetermined number of symbols and a retransmission request signal of a predetermined number of symbols (here, data1 and data2). This retransmission request burst is transmitted at a time common to all receiving-side apparatuses performing communication with the transmitting-side apparatus. In other words, all receiving-side apparatuses performing communication with the transmitting-side apparatus transmit a retransmission request burst at the same time.

<Operation of Receiving System in Transmitting-side Apparatus>

In the receiving system of the transmitting-side apparatus that receives a retransmission request burst, the same kind of processing as in the receiving system of a receiving-side apparatus described above is carried out on the received signal from antenna 408, and the signal transmitted by each subcarrier is extracted and output to the demodulation section 410. As a case is here being described in which the transmitting-side apparatus transmits only multicast burst 1 to a plurality of receiving-side apparatuses, the subcarriers on which a retransmission request signal has been superimposed by a receiving-side apparatus are only subcarrier 1 and subcarrier k/2+1 corresponding to multicast burst 1. Therefore, only the signals transmitted by subcarrier 1 and subcarrier k/2+1 are output from the FFT section 409 to the demodulation section 410.

In the demodulation section 410, in the same way as in the receiving system of a receiving-side apparatus described above, the signals transmitted by the above-mentioned subcarriers are converted from a plurality of sequences of signals to a single-sequence signal and undergo transmission path compensation processing, as a result of which a demodulated signal is obtained. This demodulated signal is output to the DIV selection section 412. The reception amplitude of the generated single-sequence signal is also detected by the demodulation section 410. A signal indicating this reception amplitude is also output to the DIV selection section 412.

In the DIV selection section 412, a subcarrier whose transmitted signal level is higher is selected from the above-mentioned subcarriers, and only the demodulated signal for the signal transmitted by the selected subcarrier is output to the absolute value detection section 413.

Specifically, referring to FIG. 6, the demodulated signal is output directly to a selection section 501, and is also output to the selection section 501 after being delayed by a predetermined time by a delay section 502. By this means, the demodulated signal for the signal transmitted by subcarrier 1 and the demodulated signal for the signal transmitted by subcarrier k/2+1 are output to the selection section 501. Meanwhile, the signal indicating the reception amplitude is output directly to a size comparison section 503, and is also output to the size comparison section 503 after being delayed by a predetermined time by a delay section 504. By this means, a signal indicating the reception amplitude of the signal transmitted by subcarrier 1 and a signal indicating the reception amplitude of the signal transmitted by subcarrier k/2+1 are output to the size comparison section 503.

In the size comparison section 503, the reception amplitude of the signal transmitted by subcarrier 1 and the reception amplitude of the signal transmitted by subcarrier k/2+1 are compared. The result of the comparison is output to the selection section 501. In the selection section 501, the subcarrier whose transmit signal has the higher reception amplitude is selected from subcarrier 1 and subcarrier k/2+1, using the result of the comparison by the size comparison section 503, and the demodulated signal for the signal transmitted by the selected subcarrier is output to the absolute value detection section 413.

The absolute value of the demodulated signal for the signal transmitted by the subcarrier selected by the DIV selection section 412 is detected by the absolute value detection section 413. The detected absolute value is notified to the size comparison section 414.

In the size comparison section 414 the absolute value detected by the absolute value detection section 413 is compared with a threshold value. If the detected absolute value is greater than or equal to the threshold value, it is recognized that retransmission of multicast burst 1 has been requested by one of the plurality of receiving-side apparatuses that received this multicast burst 1. Conversely, if the detected absolute value is less than the threshold value, it is recognized that retransmission of this multicast burst 1 has not been requested by any of the above-mentioned receiving-side apparatuses. A retransmission signal is output to the retransmission control section 401 only when the detected absolute value is greater than or equal to the threshold value.

All receiving-side apparatuses that receive the same multicast burst, when requesting retransmission of that same multicast burst, generate a retransmission request burst for that same multicast burst by superimposing a common (identical) retransmission request signal in all receiving-side apparatuses that receive that same multicast burst on a subcarrier specific to that same multicast burst in the above-mentioned plurality of receiving-side apparatuses. Thus, the absolute value detected by the absolute value detection section 413 is compared with the number of receiving-side apparatuses that have made a request to the transmitting-side apparatus for retransmission of multicast burst 1. Therefore, by using the absolute value detected by the absolute value detection section 413 in the size comparison section 414, it is possible to recognize simply and accurately how many receiving-side apparatuses have issued a retransmission request for multicast burst 1.

When this retransmission signal is output from the retransmission control section 401, retransmission control is performed in order to retransmit multicast burst 1 for which retransmission is requested by a receiving-side apparatus. Details of the retransmission control are as follows.

At the timing at which the OFDM communication apparatus transmits a multicast burst containing an information signal for retransmission, an information signal corresponding to multicast burst 1 (that is, an information signal for retransmission) is output from the retransmission control section 401 to the modulation section 402. Also, channel type information indicating that the OFDM communication apparatus is to transmit a multicast burst (a multicast burst containing an information signal for retransmission) is output from the retransmission control section 401 to the selection section 403. Thereafter, the same kind of processing is performed as in transmission of the above-described multicast burst (that is, a multicast burst containing a new information signal), and multicast burst 1 is transmitted to a plurality of receiving-side apparatuses via antenna 407.

A case has been described above in which a receiving-side apparatus receives only one multicast burst (here, multicast burst 1) transmitted by the transmitting-side apparatus. In actuality, a receiving-side apparatus receives a plurality of multicast bursts transmitted by the transmitting-side apparatus. Therefore, a case is described below in which a receiving-side apparatus receives a plurality of multicast bursts (here, multicast burst 1 through multicast burst k/2) transmitted by the transmitting-side apparatus, considering only points of difference from the case described above.

In the transmitting system of a receiving-side apparatus, a retransmission request burst is generated by having the following kind of OFDM signal generation performed by the IFFT section 406. Namely, in the IFFT section 406, a transmission path estimation preamble and retransmission request signal converted to a plurality of sequences of signals are superimposed on only two subcarriers assigned specifically to a multicast burst for which an error was detected in the demodulated signal, and an OFDM signal is generated.

Specifically, if an error is detected in the demodulated signal for multicast burst 1 and multicast burst k/2 among multicast bursts 1 through k/2 received by a receiving-side apparatus, in the IFFT section 406, referring to FIG. 2, a transmission path estimation preamble and retransmission request signal converted to a plurality of sequences of signals are superimposed only on the two subcarriers assigned specifically to multicast burst 1 (that is, subcarrier 1 and subcarrier k/2) and the two subcarriers assigned specifically to multicast burst k/2 (that is, subcarrier k/2 and subcarrier k), and an OFDM signal is generated. At this time, no signals whatever are superimposed on subcarriers other than the above-mentioned subcarriers. Using the OFDM signal generated in this way, a retransmission request burst is generated and transmitted to the transmitting-side apparatus.

In the receiving system in the transmitting-side apparatus, signals transmitted by all subcarriers are output from the FFT section 409 to the demodulation section 410. Here, the same kind of processing as described in the above example (that is, the case where a receiving-side apparatus receives only multicast burst 1) is performed by the demodulation section 410, DIV selection section 412, absolute value detection section 413, and size comparison section 414 for each signal transmitted by a subcarrier corresponding to a multicast burst. By this means, the multicast burst among multicast bursts 1 through k/2 for which a retransmission request has been issued by a receiving-side apparatus is recognized by the size comparison section 414.

As a result, the multicast burst for which retransmission was requested is transmitted by the transmitting system of the transmitting-side apparatus to the plurality of receiving-side apparatuses corresponding to that multicast burst.

The actual effect of the above embodiment will now be briefly illustrated, taking as an example a case where the transmitting-side apparatus transmits 10 multicast bursts to 10 receiving-side apparatuses corresponding to these multicast bursts. With the conventional method, if errors occur in the demodulated signals for all multicast bursts in all the receiving-side apparatuses, the transmitting-side apparatus can recognize retransmission requests from all the receiving-side apparatuses by receiving 100 retransmission bursts. In this embodiment, on the other hand, if the total number of subcarriers is 20 or more (that is, the total number of multicast bursts is (total number of subcarriers/2) or less), the transmitting-side apparatus can recognize retransmission requests from all the receiving-side apparatuses by receiving one retransmission burst.

Figure 8:
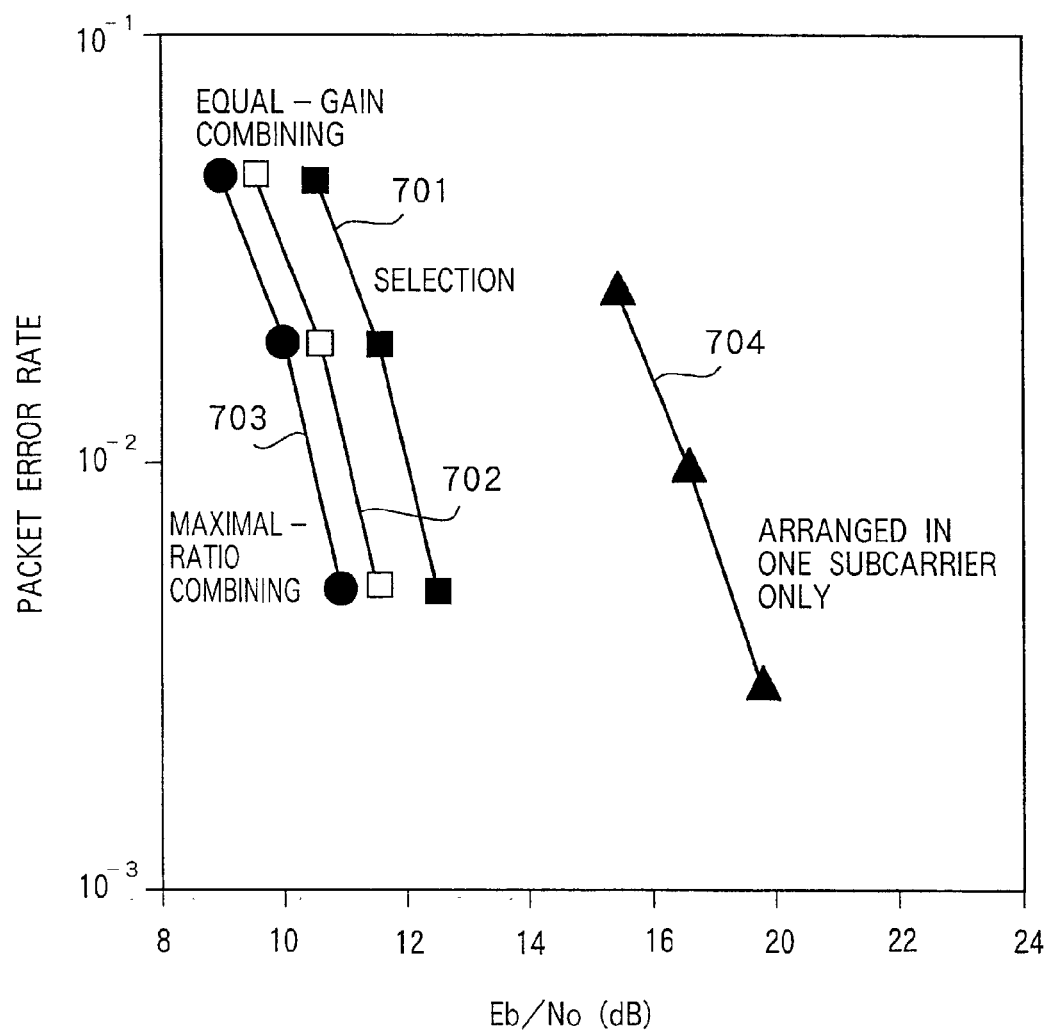
FIG. 8 is a schematic diagram showing reception quality for a retransmission request burst received by an OFDM communication apparatus according to an embodiment of the present invention.

The effect in the case where two subcarriers are assigned on a specific basis to a predetermined multicast burst (hereinafter referred to as "selective diversity case") will be described, with reference to FIG. 8, in contrast to the case where one subcarrier is assigned on a specific basis to a predetermined multicast burst (hereinafter referred to as "single carrier case"). FIG. 8 is a schematic diagram showing reception quality for a retransmission request burst received by an OFDM communication apparatus according to an embodiment of the present invention.

As shown in FIG. 8, compared with single carrier case characteristic 704, selective diversity case characteristic 701 shows an improvement of approximately 5 dB in the signal to thermal noise power ratio (Eb/No) for a retransmission request burst. As a result, it is possible to prevent a situation where a retransmission request is made by a receiving-side apparatus for a predetermined multicast burst but the transmitting-side apparatus erroneously determines that no such request has been made.

Thus, in this embodiment, when retransmission is requested for a predetermined OFDM signal transmitted in common to a plurality of receiving-side apparatuses by the same transmitting-side apparatus, each receiving-side apparatus transmits to that transmitting-side apparatus are transmission OFDM signal in which predetermined signals are multiplexed for only subcarriers assigned specifically to that predetermined OFDM signal, at a time identical to the time of transmission of a retransmission OFDM signal by other receiving-side apparatuses.

By this means, even if there are many receiving-side apparatuses for which an error occurs in the demodulated signal for the above-mentioned predetermined OFDM signal, these receiving-side apparatuses can issue a retransmission request for the predetermined OFDM signal to the above-mentioned transmitting-side apparatus by means of one retransmission OFDM signal. Moreover, as these receiving-side apparatuses all transmit a retransmission OFDM signal at a time identical to the time of transmission of a retransmission OFDM signal by all receiving-side apparatuses, the transmitting-side apparatus can recognize retransmission requests from all the receiving-side apparatuses by receiving one retransmission OFDM signal.

Also, in this embodiment, a subcarrier is assigned specifically to a predetermined OFDM signal, and therefore the transmitting-side apparatus can recognize for which of predetermined OFDM signals a retransmission request has been issued by using the level of the signal transmitted by each subcarrier.

Therefore, in this embodiment, the time occupied by a retransmission OFDM signal in the same frame does not vary even if the number of receiving-side apparatuses for which an error occurs in the demodulated signal for the above-described OFDM signal increases. In other words, the transmitting-side apparatus can recognize retransmission requests for a predetermined OFDM signal by all the receiving-side apparatuses by receiving one retransmission OFDM signal. As described above, according to this embodiment, it is possible to achieve both an improvement in information signal transmission efficiency and an improvement in demodulated signal error rate characteristics.

(Embodiment 2)

Figure 9:
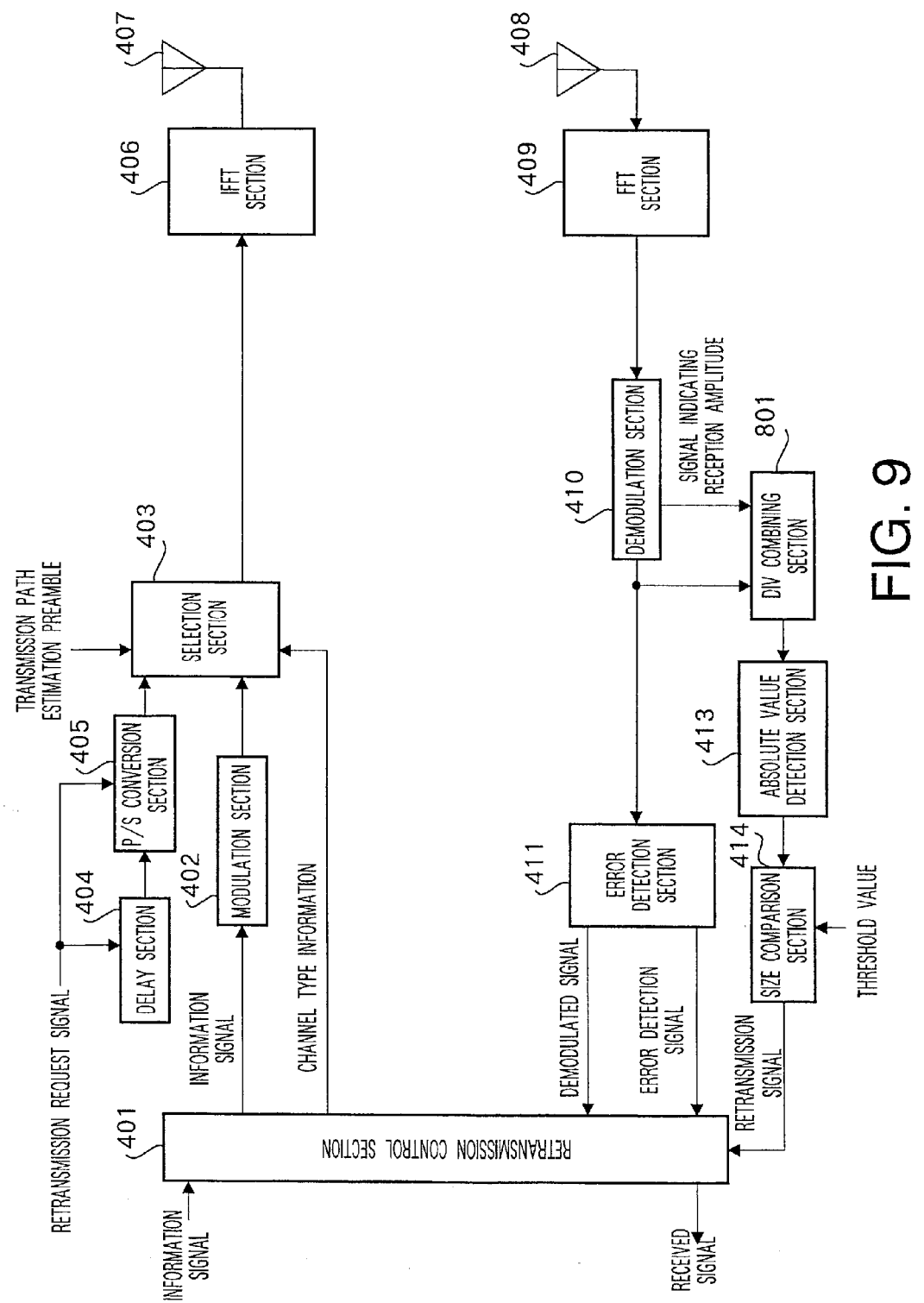
FIG. 9 is a block diagram showing the configuration of an OFDM communication apparatus according to Embodiment 2 of the present invention.

In this embodiment, a case is described, with reference to FIG. 9, in which a retransmission request for a predetermined multicast burst is recognized using a signal obtained by equal-gain combining of signals transmitted by subcarriers specific to that predetermined multicast burst in Embodiment 1. FIG. 9 is a block diagram showing the configuration of an OFDM communication apparatus according to Embodiment 2 of the present invention. Parts in FIG. 9 identical to those in Embodiment 1 (FIG. 5) are assigned the same codes as in FIG. 5 and their detailed explanations are omitted.

An OFDM communication apparatus according to this embodiment has a configuration wherein DIV selection section 412 in an OFDM communication apparatus according to Embodiment 1 is replaced by a DIV combining section 801.

The operation of an OFDM communication apparatus that has the above configuration will now be described, considering only points of difference from Embodiment 1. To simplify the explanation, it will hereinafter be assumed that a receiving-side apparatus receives only one multicast burst (here, multicast burst 1) transmitted by the transmitting-side apparatus. The transmitting-side apparatus and receiving-side apparatuses are each provided with an OFDM communication apparatus as shown in FIG. 9.

<Operation of Receiving System in Transmitting-side Apparatus>

In a demodulation section 410, as in Embodiment 1, the signals transmitted by the above-mentioned subcarriers are converted from a plurality of sequences of signals to a single-sequence signal and undergo transmission path compensation processing, as a result of which a demodulated signal is obtained. This demodulated signal is output to the DIV combining section 801. The reception amplitude of the generated single-sequence signal is also detected by the demodulation section 410. A signal indicating this reception amplitude is also output to the DIV combining section 801.

In the DIV combining section 801, the demodulated signal for the signal transmitted by each subcarrier is first multiplied by the reception amplitude of the signal transmitted by the respective subcarrier. The demodulated signals multiplied by reception amplitudes are then added. The demodulated signal obtained by means of this addition is output to an absolute value detection section 413.

Figure 10:
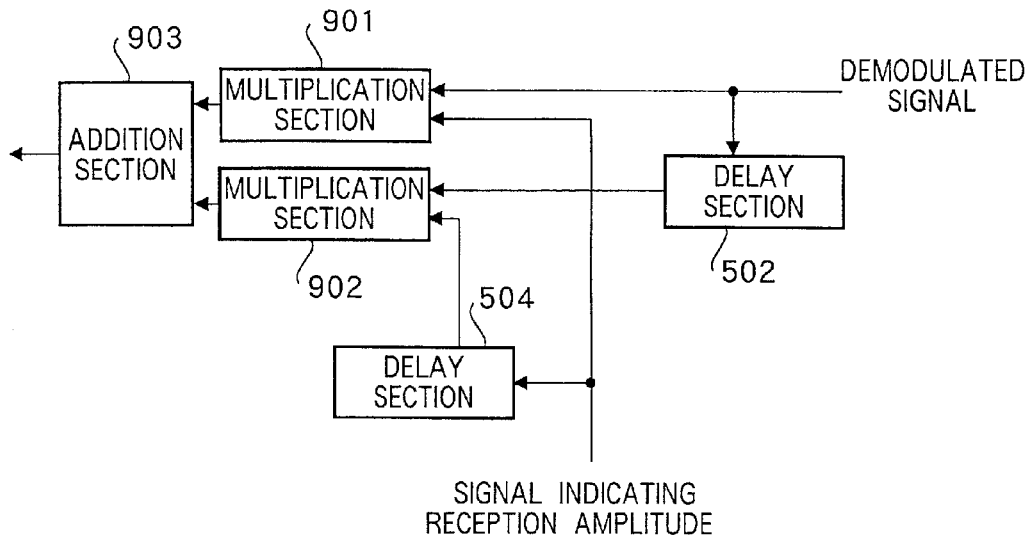
FIG. 10 is a block diagram showing the configuration of the DIV combining section in an OFDM communication apparatus according to Embodiment 2 of the present invention.

The DIV combining section 801 will now be described in detail with reference to FIG. 10. FIG. 10 is a block diagram showing the configuration of the DIV combining section 801 in an OFDM communication apparatus according to Embodiment 2 of the present invention. Parts in FIG. 10 identical to those in Embodiment 1 (FIG. 6) are assigned the same codes as in FIG. 6 and their detailed explanations are omitted.

In FIG. 10, a demodulated signal is output directly to a multiplication section 901, and is also output to a multiplication section 902 after being delayed by a predetermined time by a delay section 502. Also, a signal indicating reception amplitude is output directly to multiplication section 901, and is also output to multiplication section 902 after being delayed by a predetermined time by a delay section 504.

By this means, a demodulated signal for the signal transmitted by subcarrier 1 and a signal indicating the reception amplitude of the signal transmitted by subcarrier 1 are output to multiplication section 901. In this multiplication section 901, the above-mentioned demodulated signal is multiplied by the above-mentioned signal indicating reception amplitude. The demodulated signal multiplied by the reception amplitude in multiplication section 901 is output to an addition section 903. Also, a demodulated signal for the signal transmitted by subcarrier k/2+1 and a signal indicating the reception amplitude of the signal transmitted by subcarrier k/2+1 are output to multiplication section 902. In this multiplication section 902, the above-mentioned demodulated signal is multiplied by the above-mentioned signal indicating reception amplitude. The demodulated signal multiplied by the reception amplitude in multiplication section 902 is output to the addition section 903. In the addition section 903, the demodulated signals multiplied by reception amplitudes are added. The demodulated signal obtained by means of this addition (equal-gain combined signal) is output to the absolute value detection section 413.

A case has been described above in which a receiving-side apparatus receives only one multicast burst (here, multicast burst 1) transmitted by the transmitting-side apparatus. In actuality, a receiving-side apparatus receives a plurality of multicast bursts transmitted by the transmitting-side apparatus. Therefore, a case is described below in which a receiving-side apparatus receives a plurality of multicast bursts (here, multicast burst 1 through multicast burst k/2) transmitted by the transmitting-side apparatus, considering only points of difference from the case described above.

In the receiving system in the transmitting-side apparatus, signals transmitted by all subcarriers are output from an FFT section 409 to the demodulation section 410. Here, the same kind of processing as described in the above example (that is, the case where a receiving-side apparatus receives only multicast burst 1) is performed by the demodulation section 410, DIV combining section 801, absolute value detection section 413, and size comparison section 414 for each signal transmitted by a subcarrier corresponding to a multicast burst. By this means, the multicast burst among multicast bursts 1 through k/2 for which a retransmission request has been issued by a receiving-side apparatus is recognized by the size comparison section 414.

The effect in this embodiment will be described in contrast to Embodiment 1, with reference to FIG. 8. As shown in FIG. 8, compared with Embodiment 1 (selective diversity case characteristic 701), characteristic 702 in this embodiment shows a further improvement of approximately 1 dB in the signal to thermal noise power ratio for a retransmission request burst. As a result, in this embodiment it is possible to prevent a situation where a retransmission request is made by a receiving-side apparatus for a predetermined multicast burst but the transmitting-side apparatus erroneously determines that no such request has been made, even though the retransmission request burst reception level in the transmitting-side apparatus is approximately 1 dB lower than in Embodiment 1.

Thus, in this embodiment, a retransmission request for a predetermined multicast burst is recognized using a signal obtained by equal-gain combining of signals transmitted by subcarriers specific to that predetermined multicast burst. By this means, the transmitting-side apparatus can recognize a retransmission request for a predetermined multicast burst more reliably than in Embodiment 1.

In this embodiment, a case has been described, as an example, in which the number of specific subcarriers assigned to a predetermined multicast burst is two, and a retransmission request is recognized using a signal obtained by equal-gain combining of the signals transmitted by those subcarriers, but it is also possible for the number of specific subcarriers assigned to a predetermined multicast burst to be three or more. In this case, the signal to thermal noise power ratio for a retransmission request burst can be further improved.

(Embodiment 3)

In this embodiment, a case is described in which a retransmission request for a predetermined multicast burst is recognized using a signal obtained by maximal-ratio combining of signals transmitted by subcarriers specific to that predetermined multicast burst in Embodiment 1.

The configuration of an OFDM communication apparatus according to this embodiment is similar to that of an OFDM communication apparatus according to Embodiment 1, except for the DIV combining section 801, and therefore a detailed description of the configuration is omitted here.

The operation of an OFDM communication apparatus that has the above configuration will now be described, considering only points of difference from Embodiment 1. To simplify the explanation, it will hereinafter be assumed that a receiving-side apparatus receives only one multicast burst (here, multicast burst 1) transmitted by the transmitting-side apparatus. The transmitting-side apparatus and receiving-side apparatuses are each provided with an OFDM communication apparatus as shown in FIG. 9.

<Operation of Receiving System in Transmitting-side Apparatus>

In a demodulation section 410, as in Embodiment 1, the signals transmitted by the above-mentioned subcarriers are converted from a plurality of sequences of signals to a single-sequence signal and undergo transmission path compensation processing, as a result of which a demodulated signal is obtained. This demodulated signal is output to a DIV combining section 801. The reception amplitude of the generated single-sequence signal is also detected by the demodulation section 410. A signal indicating this reception amplitude is also output to the DIV combining section 801.

In the DIV combining section 801, the demodulated signal for the signal transmitted by each subcarrier is first multiplied by the reception amplitude of the signal transmitted by the respective subcarrier. The demodulated signals multiplied by reception amplitudes are then added. The demodulated signal obtained by means of this addition is output to an absolute value detection section 413.

Figure 11:
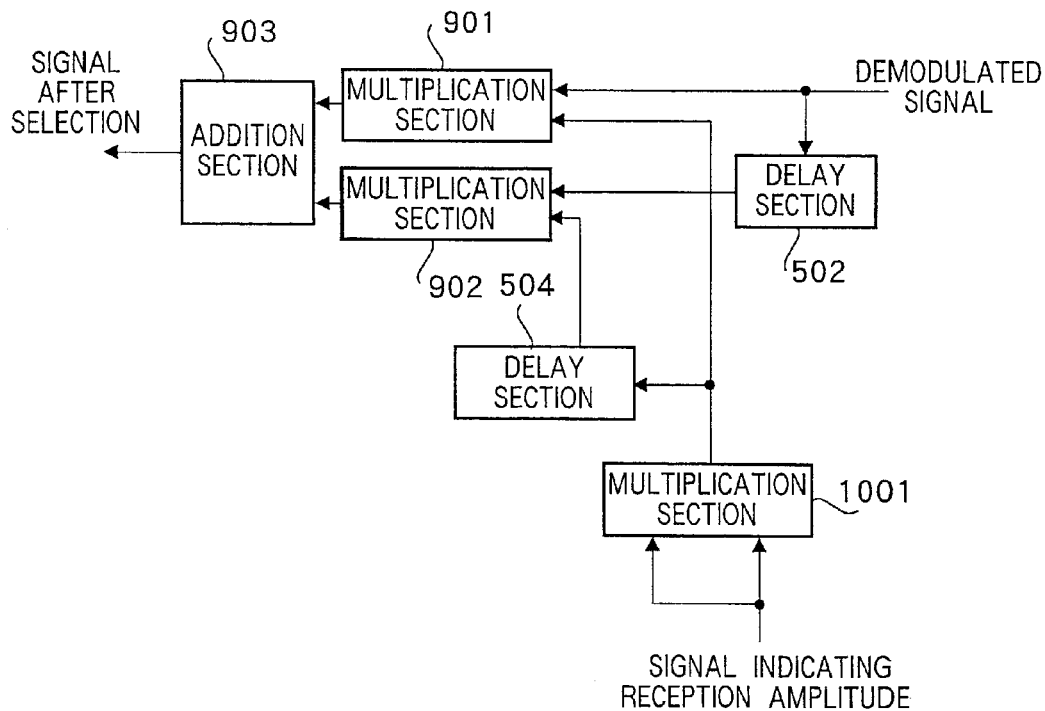
FIG. 11 is a block diagram showing the configuration of the DIV combining section in an OFDM communication apparatus according to Embodiment 3 of the present invention.

The DIV combining section 801 will now be described in detail with reference to FIG. 11. FIG. 11 is a block diagram showing the configuration of the DIV combining section 801 in an OFDM communication apparatus according to Embodiment 3 of the present invention. Parts in FIG. 11 identical to those in Embodiment 2 (FIG. 10) are assigned the same codes as in FIG. 10 and their detailed explanations are omitted.

In FIG. 11, a demodulated signal is output directly to a multiplication section 901, and is also output to a multiplication section 902 after being delayed by a predetermined time by a delay section 502. Also, a signal indicating reception amplitude is converted to two sequences and then output to a multiplication section 1001. The signals of the two sequences are multiplied by multiplication section 1001. By this means, a signal in which the above-mentioned reception amplitude is squared (that is, a signal indicating the power of the signals transmitted by the subcarriers) is generated. This signal indicating power is output directly to multiplication section 901, and is also output to multiplication section 902 after being delayed by a predetermined time by a delay section 504.

By this means, a demodulated signal for the signal transmitted by subcarrier 1 and a signal indicating the power of the signal transmitted by subcarrier 1 are output to multiplication section 901. In this multiplication section 901, the above-mentioned demodulated signal is multiplied by the above-mentioned signal indicating power. The demodulated signal multiplied by power in multiplication section 901 is output to an addition section 903. Also, a demodulated signal for the signal transmitted by subcarrier k/2+1 and a signal indicating the power of the signal transmitted by subcarrier k/2+1 are output to multiplication section 902. In this multiplication section 902, the above-mentioned demodulated signal is multiplied by the above-mentioned signal indicating power. The demodulated signal multiplied by power in multiplication section 902 is output to the addition section 903. In the addition section 903, the demodulated signals multiplied by power are added. The demodulated signal obtained by means of this addition (maximal-ratio combined signal) is output to the absolute value detection section 413.

A case has been described above in which a receiving-side apparatus receives only one multicast burst (here, multicast burst 1) transmitted by the transmitting-side apparatus. In actuality, a receiving-side apparatus receives a plurality of multicast bursts transmitted by the transmitting-side apparatus. Therefore, a case is described below in which a receiving-side apparatus receives a plurality of multicast bursts (here, multicast burst 1 through multicast burst k/2) transmitted by the transmitting-side apparatus, considering only points of difference from the case described above.

In the receiving system in the transmitting-side apparatus, signals transmitted by all subcarriers are output from an FFT section 409 to the demodulation section 410. Here, the same kind of processing as described in the above example (that is, the case where a receiving-side apparatus receives only multicast burst 1) is performed by the demodulation section 410, DIV combining section 801, absolute value detection section 413, and size comparison section 414 for each signal transmitted by a subcarrier corresponding to a multicast burst. By this means, the multicast burst among multicast bursts 1 through k/2 for which a retransmission request has been issued by a receiving-side apparatus is recognized by the size comparison section 414.

The effect in this embodiment will be described in contrast to Embodiment 2, again with reference to FIG. 8. As shown in FIG. 8, compared with characteristic 702 in Embodiment 2, characteristic 703 in this embodiment shows a further improvement of approximately 0.5 dB in the signal to thermal noise power ratio for a retransmission request burst. As a result, in this embodiment it is possible to prevent a situation where a retransmission request is made by a receiving-side apparatus for a predetermined multicast burst but the transmitting-side apparatus erroneously determines that no such request has been made, even though the retransmission request burst reception level in the transmitting-side apparatus is approximately 0.5 dB lower than in Embodiment 2.

Thus, in this embodiment, a retransmission request for a predetermined multicast burst is recognized using a signal obtained by maximal-ratio combining of signals transmitted by subcarriers specific to that predetermined multicast burst. By this means, the transmitting-side apparatus can recognize a retransmission request for a predetermined multicast burst more reliably than in Embodiment 1 or Embodiment 2.

In this embodiment, a case has been described, as an example, in which the number of specific subcarriers assigned to a predetermined multicast burst is two, and a retransmission request is recognized using a signal obtained by maximal-ratio combining of the signals transmitted by those subcarriers, but it is also possible for the number of specific subcarriers assigned to a predetermined multicast burst to be three or more. In this case, the signal to thermal noise power ratio for a retransmission request burst can be further improved.

(Embodiment 4)

In this embodiment, a case is described in which the signal level (amplitude) of a retransmission request signal inserted in a retransmission request burst is made higher than the information signal level in Embodiment 1 through Embodiment 3.

In Embodiment 1 through Embodiment 3, when the signal to thermal noise ratio for a retransmission request burst is low due to poor channel quality or the like, the quality of a demodulated signal for that retransmission request burst deteriorates, and therefore the possibility increases of the transmitting-side apparatus erroneously determining that a request has not been made when a retransmission request is made by a receiving-side apparatus for a predetermined multicast burst. In this embodiment, therefore, in a receiving-side apparatus the signal level of a retransmission request signal inserted in a retransmission request burst is made higher than the signal level of an information signal, transmission path estimation preamble, or the like, inserted in a multicast burst. By this means, it is possible to improve the signal to thermal noise ratio for a retransmission request burst in the transmitting-side apparatus.

Figure 12:
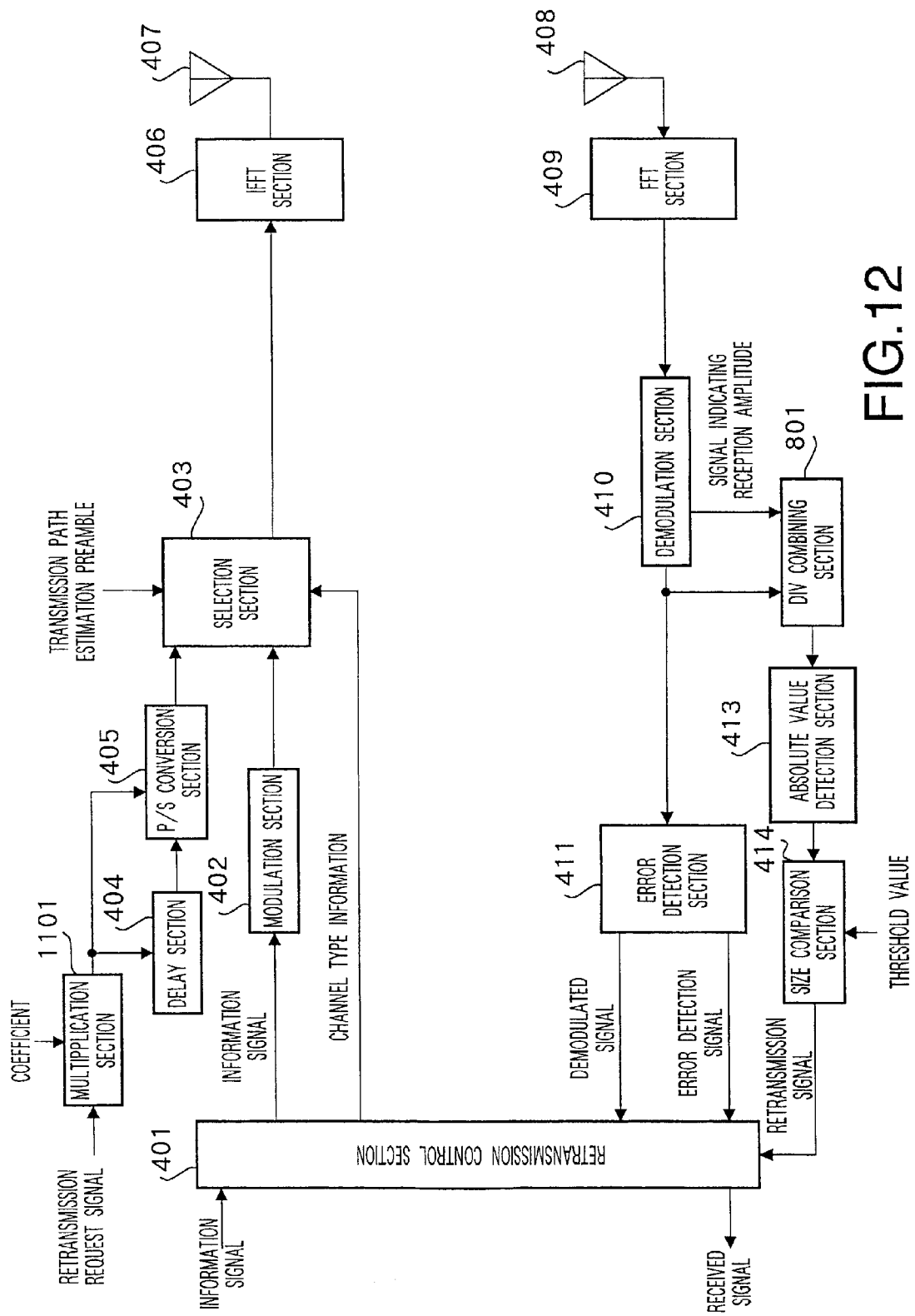
FIG. 12 is a block diagram showing the configuration of an OFDM communication apparatus according to Embodiment 4 of the present invention.

The configuration of an OFDM communication apparatus according to Embodiment 4 of the present invention is described below. A case is here described, with reference to FIG. 12, in which making the signal level of a retransmission request signal inserted in a retransmission request burst higher than the signal level of an information signal is applied to Embodiment 3 (though this can also be applied to both Embodiment 1 and Embodiment 2). FIG. 12 is a block diagram showing the configuration of an OFDM communication apparatus according to Embodiment 4 of the present invention. Parts in FIG. 12 identical to those in Embodiment 3 (FIG. 9) are assigned the same codes as in FIG. 9 and their detailed explanations are omitted.

A multiplication section 1101 increases the signal level of a retransmission request signal by multiplying that retransmission request signal by a coefficient. This coefficient is determined as appropriate so that the transmitting-side apparatus can reliably recognize a retransmission request for a predetermined multicast burst in a predetermined communication environment.

When the signal level of a retransmission request signal inserted in a retransmission request burst is made larger than the signal level of an information signal by means of the multiplication section 1101 in this way, for a subcarrier on which a retransmission request signal is superimposed, only, when a retransmission request burst is received by the transmitting-side apparatus, the level of the signal transmitted by that subcarrier (and thus the level of the demodulated signal for the signal transmitted by that subcarrier) is higher than in Embodiment 1 through Embodiment 3. Therefore, in this embodiment, the transmitting-side apparatus can recognize a retransmission request for a predetermined multicast burst more reliably than in Embodiment 1 through Embodiment 3.

Thus, according to this embodiment, making the signal level (amplitude) of a retransmission request signal inserted in a retransmission request burst higher than the information signal level enables the transmitting-side apparatus to recognize a retransmission request for a predetermined multicast burst more reliably.

(Embodiment 5)

In this embodiment, retransmission control in the OFDM-CDMA method is described. First, an overview of this embodiment will be given. A transmitting-side apparatus transmits a multicast burst to a plurality of receiving-side apparatuses. Specifically, the transmitting-side apparatus first performs spreading processing on an information signal for a group (a collection of receiving-side apparatuses that receive the same information signal) using a spreading code assigned specifically to that group, and generates a multiplex signal by multiplexing information signals for each group that have undergone spreading processing. The transmitting-side apparatus then transmits a multicast burst in which the multiplex signal is inserted to the plurality of receiving-side apparatuses.

For example, the transmitting-side apparatus performs spreading processing on group 1 (receiving-side apparatus 1 through receiving-side apparatus 10) using a spreading code specific to group 1, and performs spreading processing on group 2 (receiving-side apparatus 11 through receiving-side apparatus 20) using a spreading code specific to group 2, and generates a multiplex signal by multiplexing information signals for each group that have undergone spreading processing. The transmitting-side apparatus then transmits a multicast burst in which the multiplex signal is inserted to receiving-side apparatus 1 through receiving-side apparatus 20.

Each receiving-side apparatus first performs Fourier transform processing on the received signal for the multicast burst transmitted by the transmitting-side apparatus, and extracts the signal transmitted by each subcarrier. Each receiving-side apparatus generates a demodulated signal by performing despreading processing on the extracted signals using a spreading code specific to the group corresponding to that receiving-side apparatus (the group to which that receiving-side apparatus belongs). Also, if an error occurs in a generated demodulated signal, each receiving-side apparatus performs spreading processing on a retransmission request signal using a spreading code specific to the group corresponding to that receiving-side apparatus, and generates a multiplex signal by multiplexing there transmission request signals that have undergone spreading processing. Following this, each receiving-side apparatus transmits a retransmission request burst in which the multiplex signal is superimposed on subcarriers to the transmitting-side apparatus at the same time (a time common to all receiving-side apparatuses).

That is to say, when an error occurs in an information signal for the group to which a receiving-side apparatus belongs, that receiving-side apparatus generates a retransmission request burst containing a retransmission request signal that has undergone spreading processing by means of a spreading code specific to that group. An arbitrary signal such as "1" or "0", for example, can be used as a retransmission request signal.

A receiving-side apparatus transmits a retransmission request burst as described above to the transmitting-side apparatus at a time common to all receiving-side apparatuses. That is to say, the transmitting-side apparatus can receive a signal for recognizing retransmission requests from all receiving-side apparatuses (more specifically, which information signal for a group among information signals for all groups should be retransmitted) within the time corresponding to one retransmission burst.

Specifically, the transmitting-side apparatus first extracts the signal transmitted by each subcarrier by performing FFT processing using retransmission request bursts transmitted by all receiving-side apparatuses at the same time. Following this, the transmitting-side apparatus generates a demodulated signal for each group by performing despreading processing on the signal transmitted by each subcarrier using a spreading code specific to that group. Furthermore, using the reception level of the demodulated signal for each group, the transmitting-side apparatus can recognize whether or not a retransmission request for the information signal corresponding to each group was issued by a receiving-side apparatus. That is to say, when, for example, the demodulated signal for group 1 is greater than or equal to a threshold value, the transmitting-side apparatus can recognize the fact that a retransmission request for the information signal corresponding to group 1 has been issued by one of the receiving-side apparatuses (more specifically, by one of the receiving-side apparatuses corresponding to group 1). This completes the overview of this embodiment.

Figure 13:
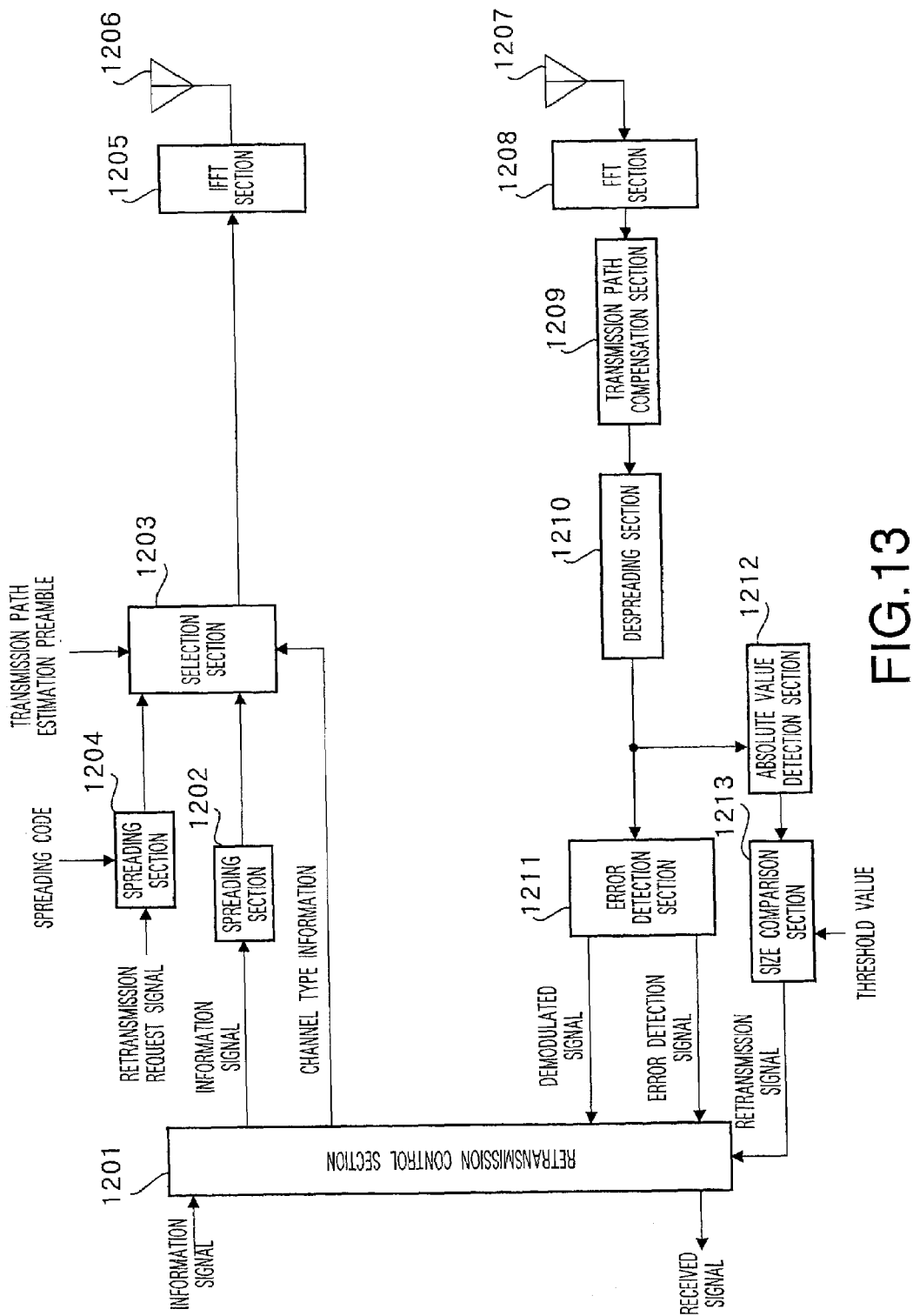
FIG. 13 is a block diagram showing the configuration of an OFDM communication apparatus according to Embodiment 5 of the present invention.

Next, the configuration of an OFDM communication apparatus according to this embodiment will be described with reference to FIG. 13. FIG. 13 is a block diagram showing the configuration of an OFDM communication apparatus according to Embodiment 5 of the present invention. An OFDM communication apparatus according to this embodiment comprises a transmitting system and a receiving system.

In the transmitting system, a retransmission control section 1201 outputs a new information signal or a retransmission information signal to a spreading section 1202, and also outputs channel type information, indicating whether this OFDM communication apparatus is to transmit a multicast burst (a multicast burst containing a new information signal or a multicast burst containing a retransmission information signal) or a retransmission request burst, to a selection section 1203.

Spreading section 1202 performs spreading processing on the information signal for each group using a group-specific spreading code, and generates a multiplex signal by multiplexing information signals that have undergone spreading processing. This spreading section 1202 outputs the generated multiplex signal to the selection section 1203.

A spreading section 1204 performs spreading processing on a retransmission request signal using a spreading code specific to the group corresponding to this OFDM communication apparatus, and generates a multiplex signal by multiplexing retransmission request signals that have undergone spreading processing. This spreading section 1204 outputs the generated multiplex signal to the selection section 1203.

Based on the channel type information, the selection section 1203 outputs a transmission path estimation preamble (known signal used by a communicating party for transmission path estimation), the multiplex signal from spreading section 1202, or the multiplex signal from spreading section 1204.

An IFFT section 1205 generates an OFDM signal by performing IFFT processing using the transmission path estimation preamble or multiplex signal from the selection section 1203. The IFFT section 1205 then generates a multicast burst or retransmission request burst by performing predetermined transmission processing and so forth on the generated OFDM signal. The generated burst is transmitted to communicating parties via an antenna 1206.

Meanwhile, in the receiving system, an FFT section 1208 performs predetermined reception processing on a signal received by an antenna 1207 (received signal), and extracts the signal transmitted by each subcarrier by performing FFT processing using the received signal that has undergone predetermined reception processing.

A transmission path compensation section 1209 first generates a single-sequence signal by performing P/S conversion processing on the signal transmitted by each subcarrier (plurality of sequences of signals). The transmission path compensation section 1209 also generates a post-transmission-path-compensation-processing signal by performing transmission path compensation processing on the generated single-sequence signal. A despreading section 1210 generates a demodulated signal for each group by performing despreading processing on the post-transmission-path-compensation-processing signal using a spreading code specific to a group corresponding to this OFDM communication apparatus. This despreading section 1210 outputs the generated demodulated signal for each group to an error detection section 1211 and absolute value detection section 1212.

The absolute value detection section 1212 detects the absolute value of the demodulated signal for each group, and outputs the detected absolute value to a size comparison section 1213. The size comparison section 1213 compares the absolute value detected by the absolute value detection section 1212 with a threshold value, and based on the result of the comparison, outputs a signal requesting retransmission of the group-related information signal received by this OFDM communication apparatus (hereinafter referred to as "retransmission signal") to a retransmission control section 1201.

The error detection section 1211 performs error detection processing on each generated demodulated signal, and outputs the demodulated signal that has undergone error detection processing and a signal indicating the error detection result (hereinafter referred to as "error detection signal") to the retransmission control section 1201.

Based on the error detection signal from the error detection section 1211, the retransmission control section 1201 first outputs only a demodulated signal in which an error did not occur as a received signal. The retransmission control section 1201 also executes retransmission control in order to request the communicating party to retransmit an information signal corresponding to a demodulated signal in which an error occurred. Also, based on the retransmission signal from the size comparison section 1213, the retransmission control section 1201 executes retransmission control for performing retransmission of the information signal for which retransmission has been requested by a communicating party.

The operation of an OFDM communication apparatus that has the above configuration will now be described. The transmitting-side apparatus and receiving-side apparatuses are each provided with an OFDM communication apparatus as shown in FIG. 13.

<Operation of Transmitting System in Transmitting-side Apparatus>

In FIG. 13, firstly, in the transmitting system in the transmitting-side apparatus, information signals for each group (here, as an example, information signals for group 1 through group 10) are output by the retransmission control section 1201 to spreading section 1202. Also, channel type information indicating that this OFDM communication apparatus is to transmit a multicast burst (a multicast burst containing a new information signal) is output from the retransmission control section 1201 to the selection section 1203.

In spreading section 1202, information signals for group 1 through group 10 undergo spreading processing by means of a group-specific spreading code (information signal spreading code) (spreading ratio: k). Also, a multiplex signal is generated by multiplexing information signals for each group that have undergone spreading processing. The generated multiplex signal is output to the selection section 1203.

Based on the above-mentioned channel type information, a transmission path estimation preamble is output from the selection section 1203 to the IFFT section 1205, followed by the multiplex signal from spreading section 1202.

Figure 14:
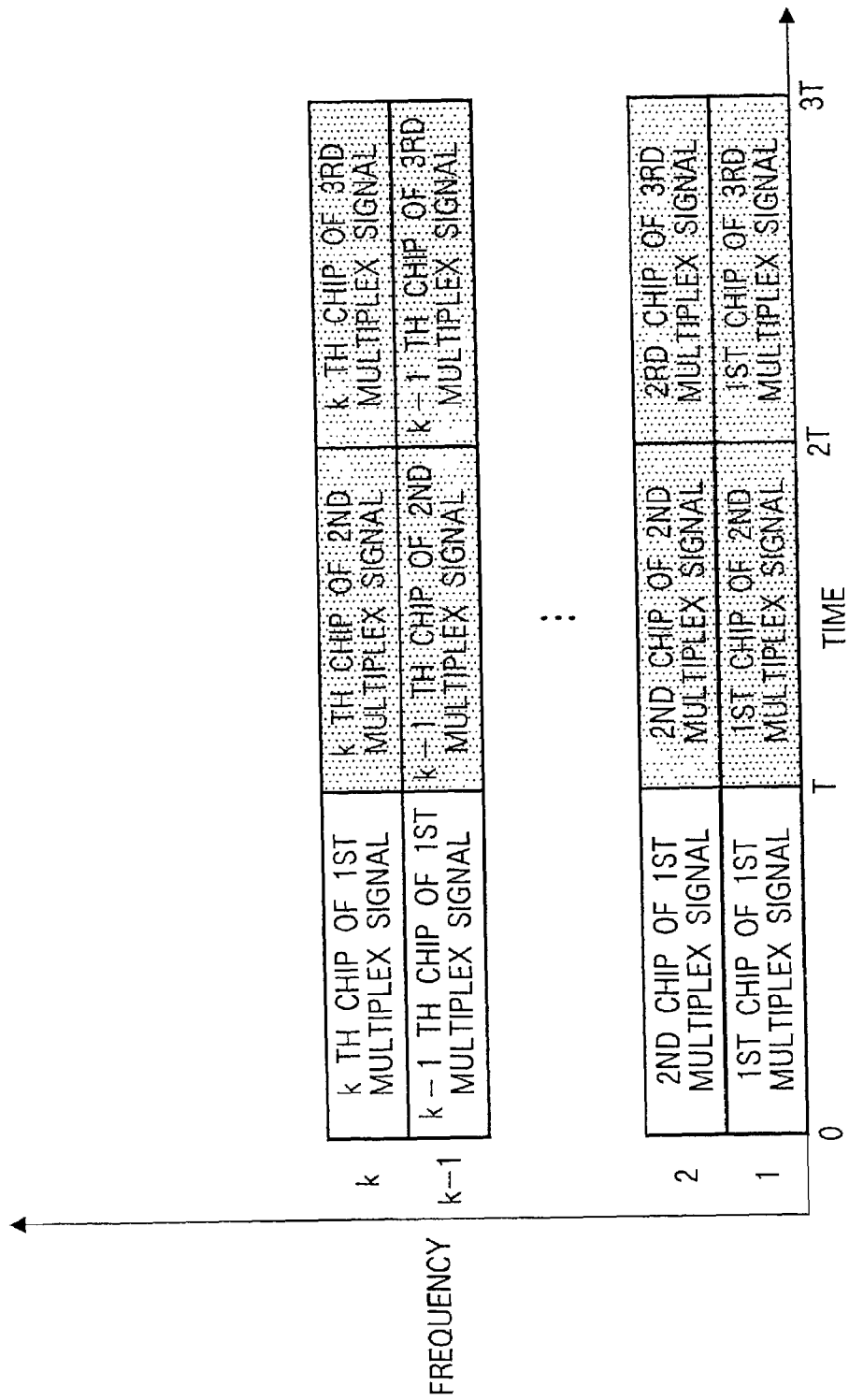
FIG. 14 is a schematic diagram showing an example of the subcarrier arrangement at the time of multicast burst generation in an OFDM communication apparatus according to Embodiment 5 of the present invention.

In the IFFT section 1205, IFFT processing is performed on the transmission path estimation preamble and multiplex signal from the selection section 1203. Specifically, the transmission path estimation preamble and multiplex signal are first decomposed on a spreading-code-by-spreading-code (chip-by-chip) basis and converted to a number of sequences of signals equivalent to the spreading ratio (k). That is to say, the transmission path estimation preamble and multiplex signal are converted to a first chip through k th chip. Also, an OFDM signal in which each signal sequence is superimposed on a sequence-specific subcarrier is generated by performing IFFT processing on each signal sequence. The IFFT processing will now be described in detail with reference to FIG. 14. FIG. 14 is a schematic diagram showing an example of the subcarrier arrangement at the time of multicast burst generation in an OFDM communication apparatus according to Embodiment 5 of the present invention. As shown in FIG. 14, an OFDM signal is generated by superimposing the first chip through k th chip in the multiplex signal on subcarrier 1 through subcarrier k, respectively.

Following this, a multicast burst is generated by performing predetermined transmission processing on the generated OFDM signal. Specifically, as shown in FIG. 7, a multicast burst is generated that contains a transmission path estimation preamble of a predetermined number of symbols and a multiplex signal of a predetermined number of symbols (here, data1 and data2). The multicast burst generated in this way is transmitted to a plurality of receiving-side apparatuses corresponding to the multicast burst (here, receiving-side apparatuses corresponding to group 1 through group 10) via antenna 1206.

<Operation of Receiving System in Receiving-side Apparatus>

In the receiving system of a receiving-side apparatus that receives this multicast burst, the received signal from antenna 1207 first undergoes predetermined reception processing in the FFT section 1208. Then the signal transmitted by each subcarrier is extracted by performing FFT processing on the received signal that has undergone predetermined reception processing. The signal transmitted by each subcarrier is output to the transmission path compensation section 1209.

In the transmission path compensation section 1209, a post-transmission-path-compensation-processing signal is generated by performing transmission path compensation processing on the signals transmitted by each subcarrier. Specifically, the signals transmitted by each subcarrier are converted from a plurality of sequences of signals to a single-sequence signal. Then transmission path estimation is performed using the signal corresponding to the transmission path estimation preamble in the single-sequence signal. Also, a post-transmission-path-compensation-processing signal is obtained by performing transmission path estimation on the signal corresponding to the multiplex signal in the single-sequence signal, using the transmission path estimation result. The obtained post-transmission-path-compensation-processing signal is output to the despreading section 1210.

In the despreading section 1210, despreading processing is performed on the post-transmission-path-compensation-processing signal using a spreading code specific to a group corresponding to this OFDM communication apparatus (information signal spreading code) (spreading ratio: k). By this means, demodulated signals for groups corresponding to this OFDM communication apparatus are generated.

For example, if this OFDM communication apparatus corresponds to group 1 and group 10, despreading processing is performed on the post-transmission-path-compensation-processing signal using a spreading code specific to group 1 and a spreading code specific to group 10. By this means, demodulated signals aregenerated for group 1 and group 10 respectively. The demodulated signals for each group generated by the despreading section 1210 are output to the error detection section 1211.

In the error detection section 1211, error detection processing (such as CRC, for example) is performed on each demodulated signal generated by the despreading section 1210. An error detection signal indicating the error detection result is output to the retransmission control section 1201 together with the demodulated signals generated by the despreading section 1210.

In the retransmission control section 1201, it is first determined whether or not an error occurred in the demodulated signals for each group based on the error detection signal. If an error did not occur in a demodulated signal, that demodulated signal is output to latter-stage circuitry (not shown) as a received signal. If an error did occur in a demodulated signal, that demodulated signal is discarded, and retransmission control is executed in order to request the transmitting-side apparatus to retransmit the information signal corresponding to that demodulated signal. Details of the retransmission control are as follows.

<Operation of Transmitting System in Receiving-side Apparatus>

Channel type information indicating transmission of a retransmission request burst is output from the retransmission control section 1201 to the selection section 1203 in the transmitting system of a receiving-side apparatus. In addition, a retransmission request signal is output to spreading section 1204.

In spreading section 1204, spreading processing is performed on the retransmission request signal using a spreading code assigned specifically to a predetermined group (information signal spreading code) (spreading ratio: k). A predetermined group here is a group corresponding to a demodulated signal in which an error was detected by the error detection section 1211 in the receiving system. For example, if an error is detected by the error detection section 1211 in the demodulated signals for group 1 and group 10, spreading processing is performed on the retransmission request signal using the spreading code (retransmission request spreading code) specific to group 1 and the spreading code (retransmission request spreading code) specific to group 10. By this means, a first multiplex signal for group 1 and a first multiplex signal for group 10 are generated. Also, a multiplex signal (second multiplex signal) is generated by multiplexing the retransmission request signals (first multiplex signals) that have undergone spreading processing. This multiplex signal is output to the selection section 1203.

Based on channel type information from the retransmission control section 1201, a transmission path estimation preamble is output from the selection section 1203 to the IFFT section 1205, followed by the multiplex signal from spreading section 1204.

Figure 15:
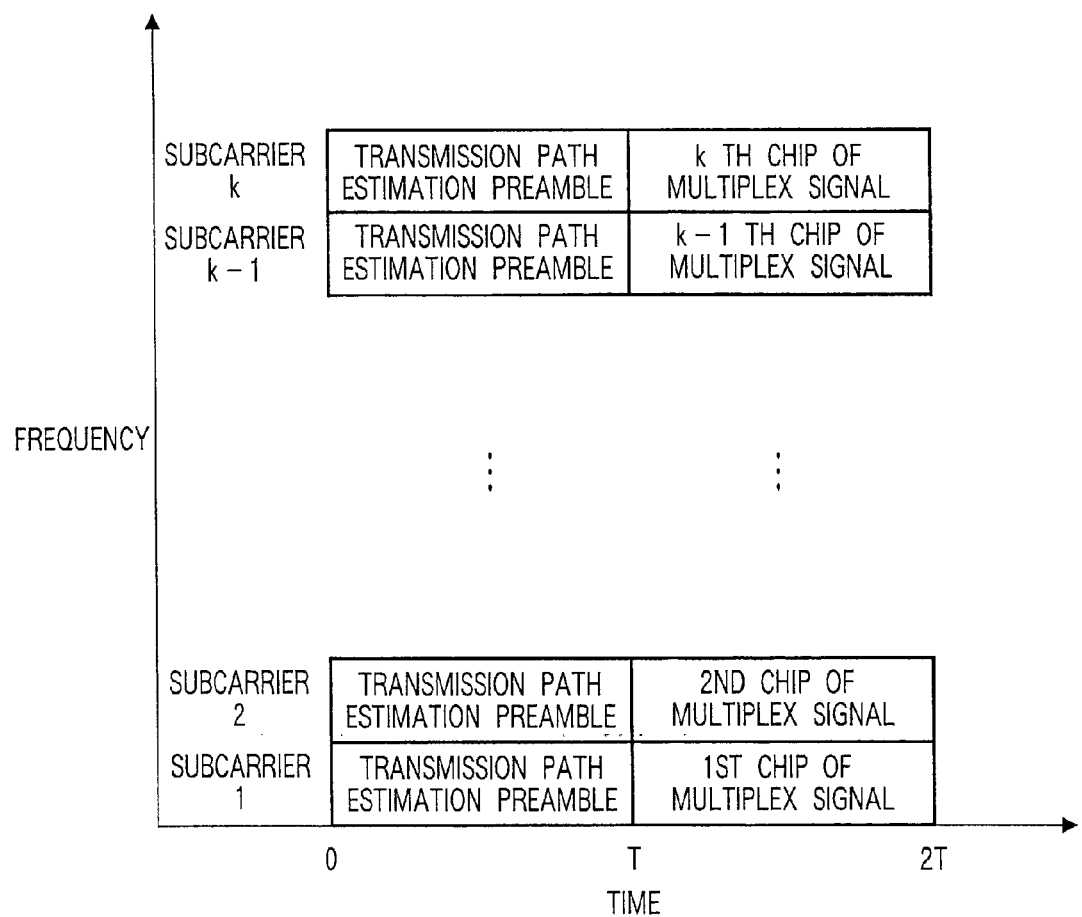
FIG. 15 is a schematic diagram showing an example of the subcarrier arrangement at the time of retransmission request burst generation in an OFDM communication apparatus according to Embodiment 5 of the present invention.

In the IFFT section 1205, IFFT processing is performed on the transmission path estimation preamble and multiplex signal from the selection section 1203, and an OFDM signal is generated. By this means, a retransmission request burst is generated. This IFFT processing is similar to the IFFT processing in the transmitting-side apparatus described above. That is to say, as shown in FIG. 15, from time 0 to time T the transmission path estimation preamble first sequence through k th sequence are superimposed on subcarrier 1 through subcarrier k respectively, and from time T to time 2T the first chip through k th chip of the multiplex signal are superimposed on subcarrier 1 through subcarrier k respectively. The number of subcarriers used in IFFT processing by the IFFT section 1205 (in this embodiment, k) corresponds to the spreading ratio (in this embodiment, k) of a spreading code (retransmission request spreading code) used by spreading section 1204.

This retransmission request burst generated by the IFFT section 1205 is transmitted to the transmitting-side apparatus via antenna 1206. This retransmission request burst contains at least one transmission path estimation preamble symbol and one multiplex signal symbol. This retransmission request burst is transmitted at a time common to all receiving-side apparatuses performing communication with the transmitting-side apparatus. In other words, all receiving-side apparatuses performing communication with the transmitting-side apparatus transmit a retransmission request burst at the same time.

<Operation of Receiving System in Transmitting-side Apparatus>

In the receiving system of a transmitting-side apparatus that receives a retransmission request burst, the received signal from antenna 1207 first undergoes the same kind of processing as in the receiving system of a receiving-side apparatus described above, and is output to the transmission path compensation section 1209.

In the transmission path compensation section 1209, a post-transmission-path-compensation-processing signal is generated by converting the plurality of sequences of signals to a single-sequence signal and performing transmission path compensation processing in the same way as in the receiving system of a receiving-side apparatus described above. This post-transmission-path-compensation-processing signal is output to the despreading section 1210.

In the despreading section 1210, despreading processing is performed on the post-transmission-path-compensation-processing signal using a spreading code (retransmission request spreading code) specific to each group (here, group 1 through group 10). By this means, demodulated signals for each group are generated. Absolute values are detected for the demodulated signals for each group by the absolute value detection section 1212. The detected absolute values of the demodulated signals for each group are output to the size comparison section 1213.

In the size comparison section 1213, the absolute values of demodulated signals for each group are compared with a threshold value. Here, the absolute value of a demodulated signal for a predetermined group is equivalent to the sum of the signal levels of retransmission request signals inserted in a retransmission request burst by receiving-side apparatuses corresponding to that group. Therefore, according to the absolute value of a demodulated signal for a predetermined group, it is possible to recognize how many receiving-side apparatuses among the receiving-side apparatuses corresponding to that predetermined group have requested retransmission of an information signal corresponding to that predetermined group.

In this embodiment, when the absolute value of a demodulated signal for a predetermined group is greater than or equal to a threshold value, it is recognized that one of the receiving-side apparatuses corresponding to that predetermined group has requested retransmission for that demodulated signal. Conversely, when the absolute value of a demodulated signal for a predetermined group is less than the threshold value, it is recognized that none of the receiving-side apparatuses corresponding to that predetermined group has requested retransmission for that demodulated signal.

Only when the absolute value of a demodulated signal for a predetermined group is greater than or equal to the threshold value, a retransmission signal for that predetermined group is output to the retransmission control section 1201 by the size comparison section 1213.

When a retransmission signal for a predetermined group is output to the retransmission control section 1201, retransmission control is executed in order to perform retransmission of the information signal corresponding to that predetermined group. Details of the retransmission control are as follows.

At the timing at which the OFDM communication apparatus transmits a multicast burst containing an information signal for retransmission, an information signal for a predetermined group (that is, an information signal for retransmission) is output from the retransmission control section 1201 to spreading section 1202. A predetermined group here is equivalent to a group corresponding to a demodulated signal in which an error was detected by the size comparison section 1213 in the receiving system.

Also, channel type information indicating that the OFDM communication apparatus is to transmit a multicast burst (a multicast burst containing an information signal for retransmission) is output from the retransmission control section 1201 to the selection section 1203. Thereafter, the same kind of processing is performed as in transmission of the above-described multicast burst (that is, a multicast burst containing a new information signal), and a multicast burst is transmitted to a plurality of receiving-side apparatuses via antenna 1206.

The actual effect of the above embodiment will now be briefly illustrated, taking as an example a case where the transmitting-side apparatus transmits a multicast burst containing a multiplex signal in which 10 kinds of information signals for groups are code-division-multiplexed to 100 receiving-side apparatuses corresponding to that multicast burst. With the conventional method, if errors occur in all the demodulated signals in all the receiving-side apparatuses, the transmitting-side apparatus can recognize retransmission requests from all the receiving-side apparatuses by receiving 100 retransmission bursts. In this embodiment, on the other hand, the transmitting-side apparatus can recognize retransmission requests from all the receiving-side apparatuses by receiving one retransmission burst.

Moreover, even when the transmitting-side apparatus is affected by interference from another system or the like at the time when the transmitting-side apparatus receives a retransmission request burst transmitted by a receiving-side apparatus, the effect of interference on the received signal for that retransmission request is greatly reduced by despreading processing on the received signal. As a result, it is possible to prevent a situation where a retransmission request is made by a receiving-side apparatus for a predetermined information signal but the transmitting-side apparatus erroneously determines that no such request has been made.

On the other hand, in ordinary OFDM communications, it is difficult to discriminate between individual bursts when different simultaneously transmitted bursts are received. Thus, in ordinary OFDM communications, when a burst comprising a desired signal is affected by interference from another system or the like, it is difficult to prevent a situation where a retransmission request is made by a receiving-side apparatus but the transmitting-side apparatus erroneously determines that no such request has been made.

Thus, in this embodiment, when retransmission is requested for a predetermined OFDM signal transmitted in common to a plurality of receiving-side apparatuses by the same transmitting-side apparatus, each receiving-side apparatus performs spreading processing on a predetermined signal using a spreading code specific to an information signal inserted in the above-mentioned predetermined OFDM signal, and then transmits to that transmitting-side apparatus a retransmission OFDM signal containing a predetermined signal that has undergone spreading processing, at a time identical to the time of transmission of a retransmission OFDM signal by other receiving-side apparatuses.

By this means, even if there are many receiving-side apparatuses for which an error occurs in a demodulated signal for an information signal inserted in the above-mentioned predetermined OFDM signal, these receiving-side apparatuses can issue a retransmission request for an information signal inserted in the predetermined OFDM signal to the above-mentioned transmitting-side apparatus by means of one retransmission OFDM signal. Moreover, as these receiving-side apparatuses all transmit a retransmission OFDM signal at a time identical to the time of transmission of a retransmission OFDM signal by all receiving-side apparatuses, the transmitting-side apparatus can recognize retransmission requests from all the receiving-side apparatuses by receiving one retransmission OFDM signal.

Also, in this embodiment, a group-specific spreading code is assigned to a group of receiving-side apparatuses that receive the same information signal, and furthermore, when requesting retransmission for a predetermined information signal continued in an OFDM signal, a receiving-side apparatus performs spreading processing on a predetermined signal using a spreading code specific to a group corresponding to the above-mentioned predetermined information signal, and generates a retransmission OFDM signal that contains a predetermined signal that has undergone spreading processing. Therefore, the transmitting-side apparatus can recognize for which of information signals contained in a predetermined OFDM signal a retransmission request has been issued by performing despreading processing using each spreading code on a received signal for a retransmission request OFDM signal and generating a demodulated signal for each group, and using the level of the generated demodulated signals for each group.

As described above, in this embodiment, the time occupied by a retransmission OFDM signal in the same frame does not vary even if the number of receiving-side apparatuses for which an error occurs in the demodulated signal for an information signal inserted in an above-described OFDM signal increases. In other words, the transmitting-side apparatus can recognize retransmission requests for a predetermined OFDM signal by all the receiving-side apparatuses for an information signal inserted in a predetermined OFDM signal by receiving one retransmission OFDM signal. Thus, according to this embodiment, it is possible to achieve both an improvement in information signal transmission efficiency and an improvement in demodulated signal error rate characteristics.

(Embodiment 6)

In this embodiment, a case is described in which the signal level (amplitude) of a multiplex signal inserted in a retransmission request burst is made higher than the information signal level in Embodiment 5.

When the signal to thermal noise ratio for a retransmission request burst is low due to poor channel quality or the like, the quality of a demodulated signal for that retransmission request burst deteriorates, and therefore the possibility increases of the transmitting-side apparatus erroneously determining that a retransmission request has not been made (has been made) by a receiving-side apparatus for a predetermined information signal when such a retransmission request has been made (has not been made). In this embodiment, therefore, in a receiving-side apparatus the signal level of a multiplex signal inserted in a retransmission request burst (that is, a signal in which retransmission request signals spread by means of spreading codes specific to each group are multiplexed) is made higher than the signal level of an information signal, transmission path estimation preamble, or the like, inserted in a multicast burst. By this means, it is possible to improve the signal to thermal noise ratio for a retransmission request burst in the transmitting-side apparatus.

Figure 16:
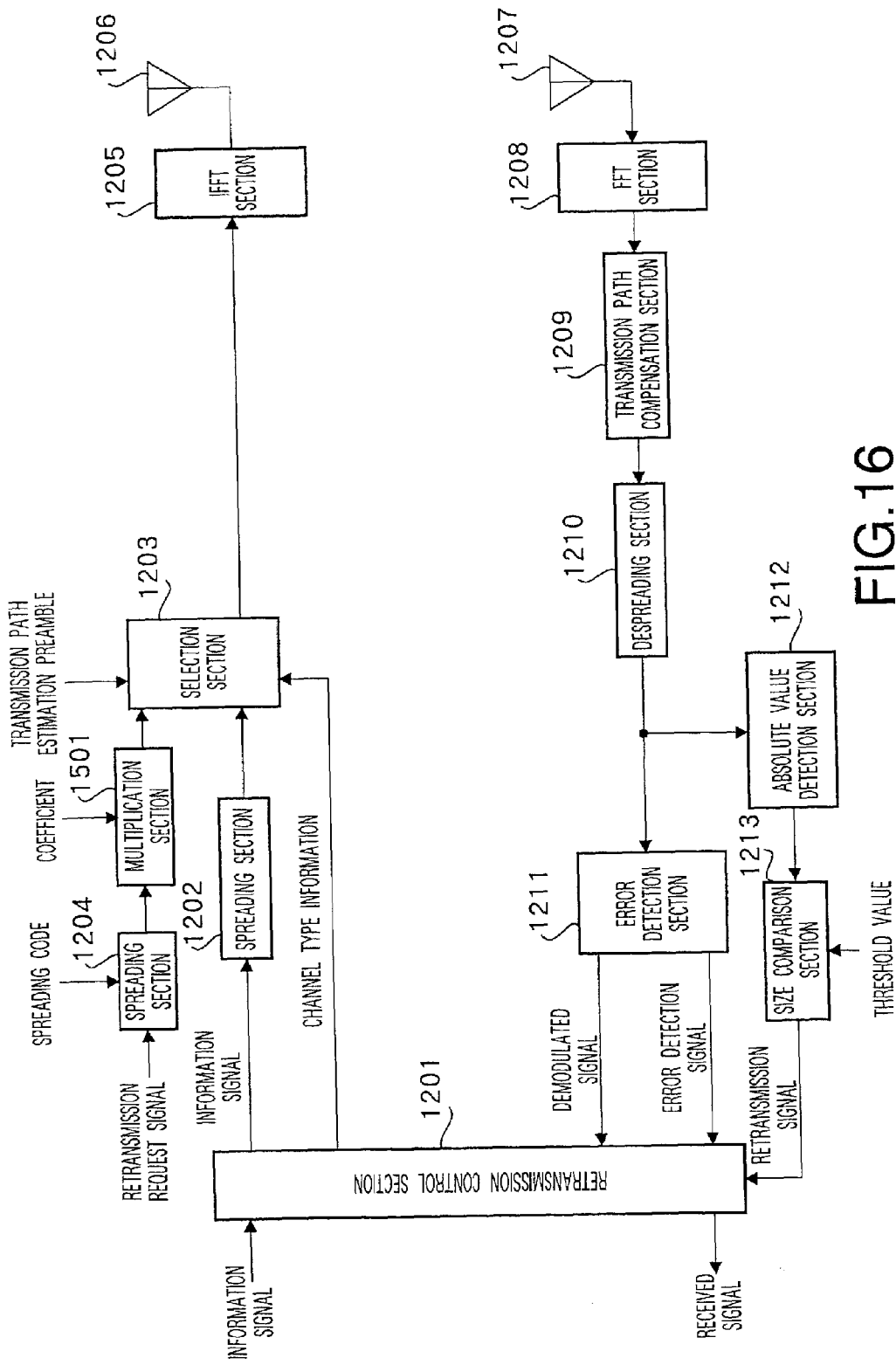
FIG. 16 is a block diagram showing the configuration of an OFDM communication apparatus according to Embodiment 6 of the present invention.

The configuration of an OFDM communication apparatus according to Embodiment 6 of the present invention is described below with reference to FIG. 16. FIG. 16 is a block diagram showing the configuration of an OFDM communication apparatus according to Embodiment 6 of the present invention. Parts in FIG. 16 identical to those in Embodiment 5 (FIG. 13) are assigned the same codes as in FIG. 13 and their detailed explanations are omitted. An OFDM communication apparatus according to this embodiment has a configuration wherein a multiplication section 1501 is added to the configuration of an OFDM communication apparatus according to Embodiment 5.

The multiplication section 1501 increases the signal level of a multiplex signal from a spreading section 1204 by multiplying this multiplex signal by a coefficient. Increasing the signal level of the multiplex signal is equivalent to increasing the level of each retransmission request signal that undergoes spreading processing by spreading section 1204. This coefficient is determined as appropriate so that the transmitting-side apparatus can reliably recognize a retransmission request for an information signal for a predetermined group in a predetermined communication environment. In this embodiment a multiplex signal generated by spreading section 1204 is multiplied by a coefficient, but it is also possible for each retransmission request signal that undergoes spreading processing by spreading section 1204 to be multiplied by a coefficient, and for a multiplex signal in which the retransmission request signals that have undergone spreading processing and have been multiplied by the coefficient are multiplexed to be sent to a selection section 1203.

Thus, according to this embodiment, the signal to thermal noise ratio for a retransmission request burst in a transmitting-side apparatus can be improved by making the signal level (amplitude) of a multiplex signal inserted in the retransmission request burst higher than the information signal level. By this means, the transmitting-side apparatus can recognize a retransmission request for a predetermined information signal more reliably.

(Embodiment 7)

In this embodiment a case is described in which, when retransmission of an information signal for a predetermined group is requested in Embodiment 5, spreading processing is performed on a retransmission request signal using a plurality of spreading codes specific to the above-mentioned predetermined group, and a multiplex signal to be inserted in a retransmission request burst is generated.

In a multipath environment, inter-code interference may occur between a signal corresponding to a multiplex signal in a received signal for a retransmission request burst and a signal corresponding to a transmission path estimation preamble in that received signal. In a multipath environment, also, as shown in FIG. 3, the reception levels of signals transmitted by all subcarriers are not identical, and the reception level of the signal transmitted by a particular subcarrier (subcarrier 203) may fall significantly below the reception levels of signals transmitted by other subcarriers (subcarrier 201 and subcarrier 202).

The occurrence of this kind of deviation in level between signals transmitted by different subcarriers is equivalent to the occurrence of deviation in level between chips in a received signal (more specifically, a post-transmission-path-compensation-processing signal). As a result, orthogonality between spreading codes is lost in the received signal, and the mutual correlation level between spreading codes increases. As the mutual correlation level between spreading codes in a received signal increases, so does the possibility that the transmitting-side apparatus will erroneously determine that retransmission of an information signal for a predetermined group has been requested by a receiving-side apparatus when no such request has been made, and will transmit this information signal to receiving-side apparatuses corresponding to that group.

The extent to which orthogonality between spreading codes is lost differs according to the spreading codes. For example, to take the example of two spreading codes, spreading code 1 and spreading code 2, the mutual correlation level between the spreading codes will be greater or smaller according to the types of spreading code 1 and spreading code 2.

In this embodiment, therefore, when requesting retransmission of an information signal for a predetermined group, a receiving-side apparatus generates a multiplex signal to be inserted in a retransmission request burst by performing spreading processing on a retransmission request signal using a plurality of spreading codes (in this embodiment, two spreading codes) specific to that predetermined group. The transmitting-side apparatus generates a demodulated signal for the above-mentioned group for each spreading code by performing despreading processing using the spreading codes corresponding to the received signal for a retransmission request burst. Following this, the transmitting-side apparatus retransmits an information signal for the above-mentioned predetermined group only if the levels of demodulated signals for a predetermined number of spreading codes (in this embodiment, two spreading codes) from among all spreading codes (in this embodiment, two spreading codes) are greater than or equal to a threshold value.

By this means, it is possible to prevent a situation where the transmitting-side apparatus erroneously determines that retransmission of an information signal for a predetermined group has been requested by a receiving-side apparatus when no such request has been made, and transmits this information signal to receiving-side apparatuses corresponding to that group.

Figure 17:
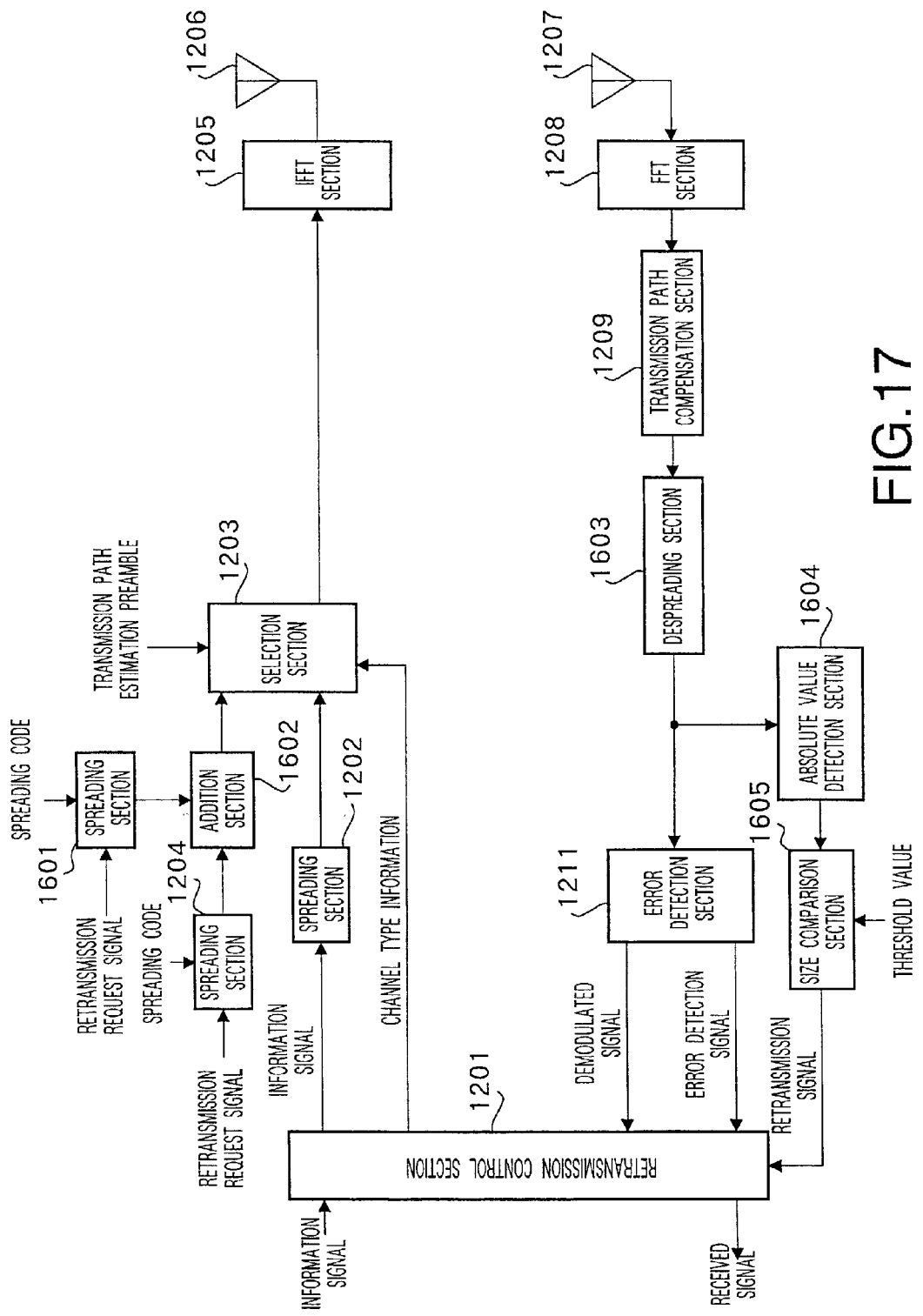
FIG. 17 is a block diagram showing the configuration of an OFDM communication apparatus according to Embodiment 7 of the present invention.

FIG. 17 is a block diagram showing the configuration of an OFDM communication apparatus according to Embodiment 7 of the present invention. Parts in FIG. 17 identical to those in Embodiment 5 (FIG. 13) are assigned the same codes as in FIG. 13 and their detailed explanations are omitted.

An OFDM communication apparatus according to this embodiment has a configuration wherein a spreading section 1601 and addition section 1602 are added to the configuration of an OFDM communication apparatus according to Embodiment 5, and despreading section 1210, absolute value detection section 1212, and size comparison section 1213 are replaced respectively by a despreading section 1603, absolute value detection section 1604, and size comparison section 1605.

<Operation of Transmitting System in Receiving-side Apparatus>

Spreading processing is performed on a retransmission request signal using spreading codes specific to a predetermined group.

In spreading section 1601, spreading processing is first performed on a retransmission request signal using spreading codes (spreading ratio: k) specific to each group. The spreading codes used here are different from those used in spreading section 1204. Also, a multiplex signal is generated by multiplexing retransmission request signals for each group that have undergone spreading processing. The generated multiplex signal is added to a multiplex signal generated by spreading section 1204. By this means, a new multiplex signal (second multiplex signal) is generated and output to a selection section 1203.

If a "first multiplex signal" is assumed to be a multiplex signal for one group, the "second multiplex signal" generated by the addition section 1602 is equivalent to a signal obtained by multiplexing first multiplex signals for all groups. A first multiplex signal for one group is equivalent to a signal generated by multiplexing retransmission request signals spread by means of spreading codes specific to that group.

<Operation of Receiving System in Transmitting-side Apparatus>

In the despreading section 1603, despreading processing is performed on a post-transmission-path-compensation-processing signal using a plurality of spreading codes specific to each group. By this means, a demodulated signal for each group is obtained for each spreading code. Absolute values are detected by the absolute value detection section 1604 for the demodulated signals for each group obtained for each spreading code. In the size comparison section 1605, a comparison of the absolute values of demodulated signals for each group with a threshold value is performed for each spreading code. That is to say, to consider a predetermined group, a retransmission signal for that predetermined group is output to a retransmission control section 1201 only if the absolute values of demodulated signals for each spreading code are all greater than or equal to the threshold value.

In this embodiment, a case has been described in which a receiving-side apparatus performs spreading processing on a retransmission request signal using two spreading codes specific to each group, and the transmitting-side apparatus performs despreading processing using two spreading codes specific to each group, and retransmits an information signal for a predetermined group only when the absolute values of demodulated signals for two spreading codes are greater than or equal to a threshold value for that predetermined group. If a receiving-side apparatus here performs spreading processing on a retransmission request signal using three or more spreading codes specific to each group, the transmitting-side apparatus may retransmit an information signal for a predetermined group only when the absolute values of demodulated signals for a predetermined number of spreading codes among demodulated signals for all spreading codes are all greater than or equal to a threshold value for that predetermined group.

Thus, in this embodiment, when retransmission of an information signal for a predetermined group is requested, spreading processing is performed on a retransmission request signal using a plurality of spreading codes specific to that predetermined group, and a multiplex signal to be inserted in a retransmission request burst is generated. By this means, the transmitting-side apparatus can recognize a retransmission request for a predetermined information signal by a receiving-side apparatus reliably even in a multipath environment.

(Embodiment 8)

In this embodiment a case is described in which, in Embodiment 5, the spreading ratio of a spreading code used for multiplex signal generation in a retransmission request burst is made smaller than the spreading ratio of a spreading code used for multiplex signal generation in a multicast burst.

As spreading codes that can be used are limited, when an extremely large number of users are performing communication it may become difficult to assign a sufficient number of spreading codes for multiplex signal generation in a retransmission request burst.

In this embodiment, therefore, the spreading ratio of a spreading code used for multiplex signal generation in a retransmission request burst is made smaller than the spreading ratio of a spreading code used for multiplex signal generation in a multicast burst. That is to say, if the spreading ratio of a spreading code used for multiplex signal generation in a retransmission request burst is 64, the spreading ratio of a spreading code used for multiplex signal generation in a multicast burst may be made 32, for example.

By this means, it is possible to improve error rate characteristics for a retransmission request burst with scarcely any fall in information signal transmission efficiency even when spreading codes used for multiplex signal generation in a retransmission request burst cannot be adequately secured for a reason such as an extremely large number of communicating users.

Figure 18:
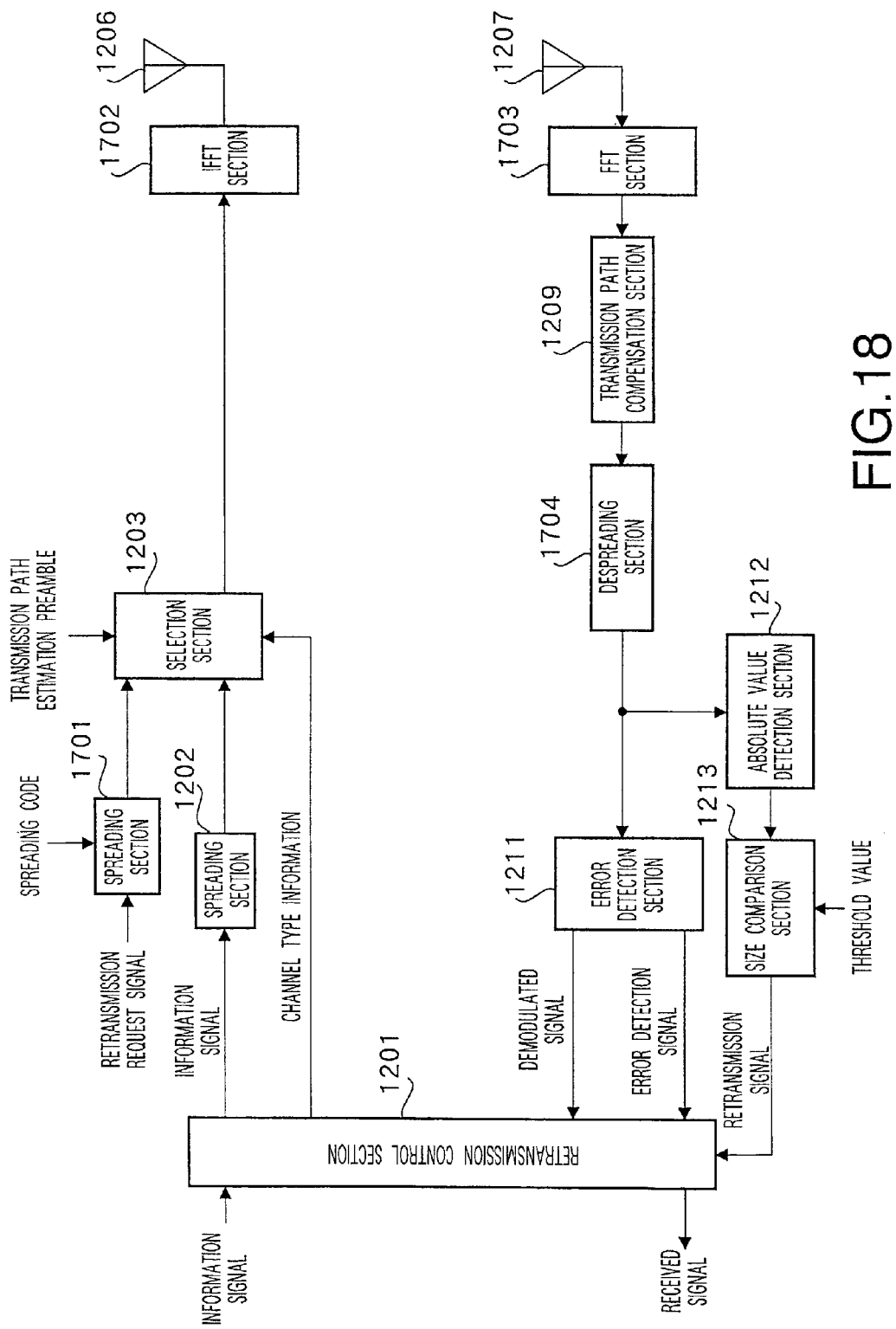
FIG. 18 is a block diagram showing the configuration of an OFDM communication apparatus according to Embodiment 8 of the present invention.

FIG. 18 is a block diagram showing the configuration of an OFDM communication apparatus according to Embodiment 8 of the present invention. Parts in FIG. 18 identical to those in Embodiment 5 (FIG. 13) are assigned the same codes as in FIG. 13 and their detailed explanations are omitted.

An OFDM communication apparatus according to this embodiment has a configuration wherein spreading section 1204, IFFT section 1205, FFT section 1208, and despreading section 1210 in an OFDM communication apparatus according to Embodiment 5 are replaced respectively by a spreading section 1701, IFFT section 1702, FFT section 1703, and despreading section 1704.

<Operation of Transmitting System in Receiving-side Apparatus>

In spreading section 1701, spreading processing is performed on a retransmission request signal using a spreading code specific to each group. The spreading code used here (here assumed to be k/2, but any setting is possible) has a smaller spreading ratio than the spreading code in spreading section 1202. Apart from this, the same kind of processing is performed as in spreading section 1204 in Embodiment 5.

Figure 19:
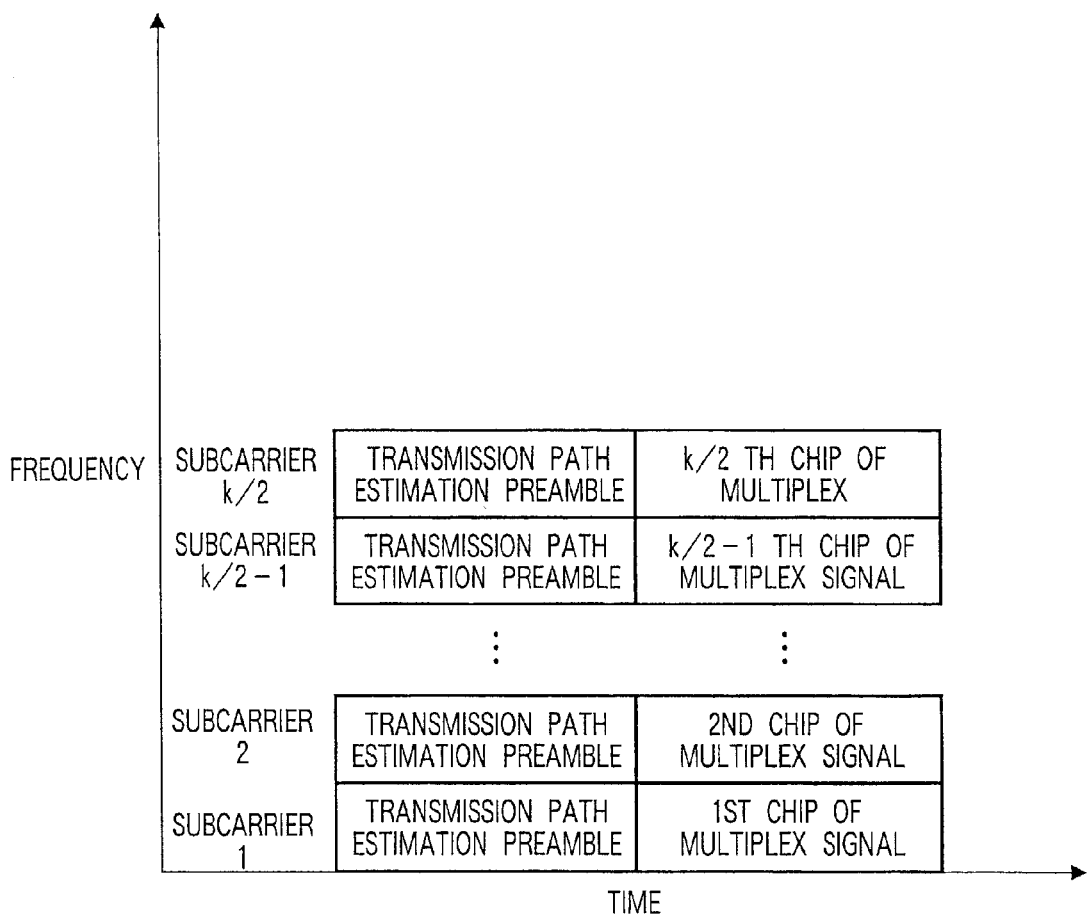
FIG. 19 is a schematic diagram showing an example of the subcarrier arrangement at the time of retransmission request burst generation in an OFDM communication apparatus according to Embodiment 8 of the present invention.

In the IFFT section 1702, the same kind of processing is performed as in the IFFT section 1205 in Embodiment 5, except for the following point. Namely, in the IFFT section 1702, a transmission path estimation preamble and multiplex signal from a selection section 1203 are first converted from a single-sequence signal to a number of sequences of signals equivalent to the spreading ratio (k/2). That is to say, the transmission path estimation preamble and multiplex signal are converted to a first chip through k/2 th chip. Also, as shown in FIG. 19, an OFDM signal is generated by superimposing the first chip through k/2 th chip in the transmission path estimation preamble and multiplex signal on subcarrier 1 through subcarrier k/2, respectively.

<Operation of Receiving System in Transmitting-side Apparatus>

In the FFT section 1703, the same kind of processing is performed as in the FFT section 1208 in Embodiment 5, except for the following point. Namely, in the FFT section 1703, signals transmitted by subcarrier 1 through subcarrier k/2 are extracted by means of FFT processing using the received signal.

In the despreading section 1704, the same kind of processing is performed as in the despreading section 1210 in Embodiment 5, except for the following point. Namely, in the despreading section 1704, despreading processing is performed on a post-transmission-path-compensation-processing signal using a spreading code that has the same spreading ratio as in above-described spreading section 1701.

According to this embodiment as described above, since a spreading code used when generating a multiplex signal to be inserted in a retransmission request burst has a smaller spreading ratio than a spreading code used when generating a multiplex signal to be inserted in a multicast burst, the number of subcarriers in IFFT processing can be reduced. By this means, the transmission level of a retransmission request burst can be reduced, and thus peak power when transmitting a retransmission request burst can be reduced.

Also, by making the spreading ratio of a spreading code used in spreading processing smaller, it is possible to make the transmission level of a multiplex signal to be inserted in a retransmission request burst larger than the transmission level of a multiplex signal to be inserted in a multicast burst, since transmission power is constant. As a result, when the signal to thermal noise ratio for a retransmission request burst is low, the signal to thermal noise ratio for a retransmission request burst can be improved by increasing the transmission level of a multiplex signal to be inserted in the retransmission request burst.

Thus, according to this embodiment, by making the spreading ratio of a spreading code used for multiplex signal generation in a retransmission request burst smaller than the spreading ratio of a spreading code used for multiplex signal generation in a multicast burst, it is possible to improve error rate characteristics for a retransmission request burst with scarcely any fall in information signal transmission efficiency even when spreading codes used for multiplex signal generation in a retransmission request burst cannot be adequately secured for a reason such as an extremely large number of communicating users.

(Embodiment 9)

In this embodiment a case is described in which, in Embodiment 5, not only ordinary subcarriers on which a multiplex signal is superimposed but also specific subcarriers on which a null signal is superimposed are used as subcarriers in IFFT processing at the time of retransmission request burst generation.

When multipath delay time is short, the reception level of signals transmitted by subcarriers on which a multiplex signal is superimposed falls, and consequently the signal to thermal noise ratio for a retransmission request burst may become extremely low. As a result, the possibility increases of the transmitting-side apparatus erroneously determining that a retransmission request has not been made (has been made) by a receiving-side apparatus for a predetermined information signal when such a retransmission request has been made (has not been made).

Figure 20:
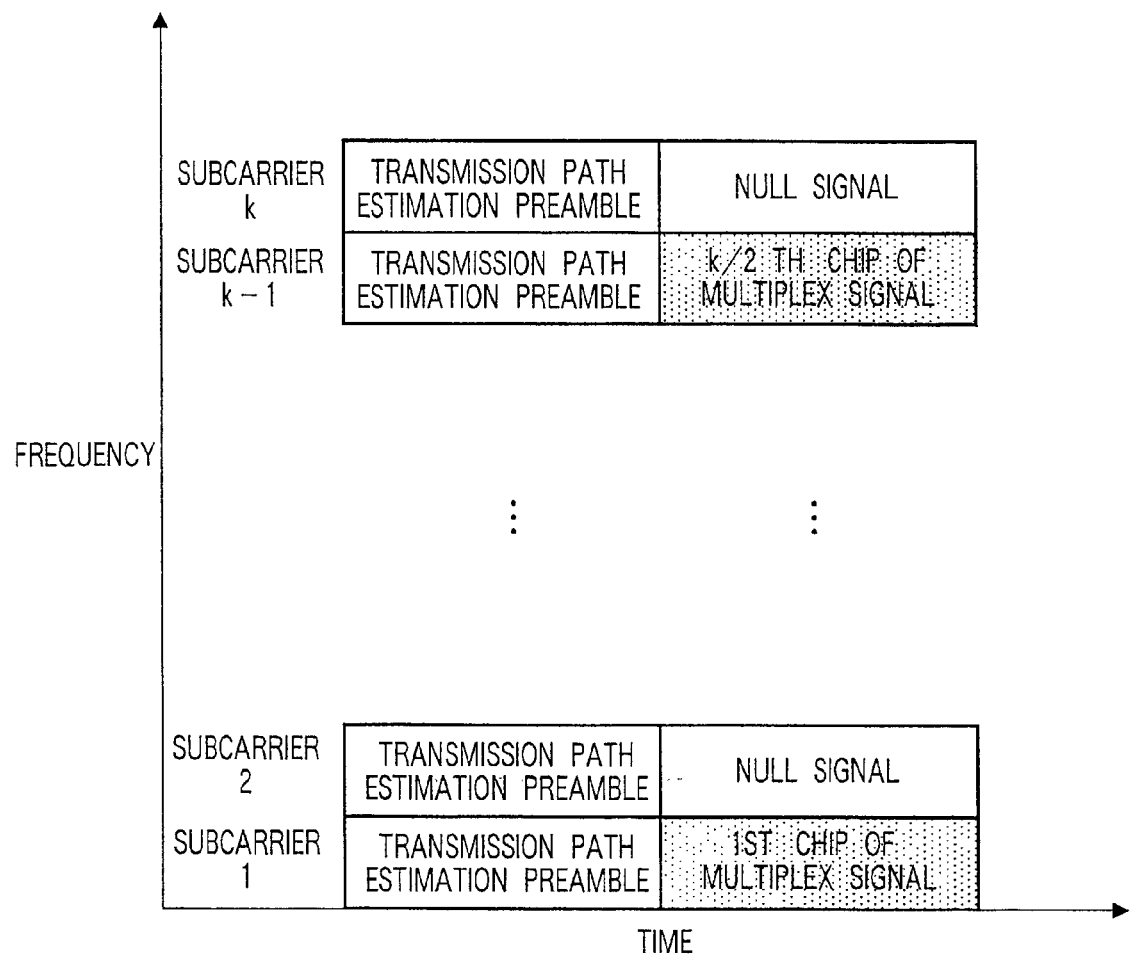
FIG. 20 is a schematic diagram showing an example of the subcarrier arrangement at the time of retransmission request burst generation in an OFDM communication apparatus according to Embodiment 9 of the present invention.

In this embodiment, therefore, a null signal is superimposed on specific subcarriers provided separately from ordinary subcarriers on which a multiplex signal is superimposed in inverse Fourier transform processing. Specifically, as shown in FIG. 20, specific subcarriers (in FIG. 20, subcarrier 2, subcarrier k, etc.) are first selected on an every-other-subcarrier basis from among subcarriers 1 through k. It goes without saying that any specific subcarriers can be selected from among all the subcarriers. Then a null signal is superimposed on the selected specific subcarriers, and a multiplex signal is superimposed on ordinary subcarriers (subcarriers excluding the specific subcarriers) from among all the subcarriers.

As a result, whereas the retransmission request burst frequency band when specific subcarriers are not provided is a frequency band corresponding to k/2 subcarriers (that is, a frequency band corresponding to k/2 ordinary subcarriers), the retransmission request burst frequency band in this embodiment is extended by a frequency band equivalent to the specific subcarriers (that is, a frequency band corresponding to k/2 specific subcarriers). As the frequency band of a retransmission request OFDM signal is increased in this way, it is possible to prevent the reception level of signals transmitted by all ordinary subcarriers from falling significantly in the transmitting-side apparatus due to the fact that the multipath delay time is short. It is thus possible to improve the signal to thermal noise ratio for a retransmission request burst in the transmitting-side apparatus.

Figure 21:
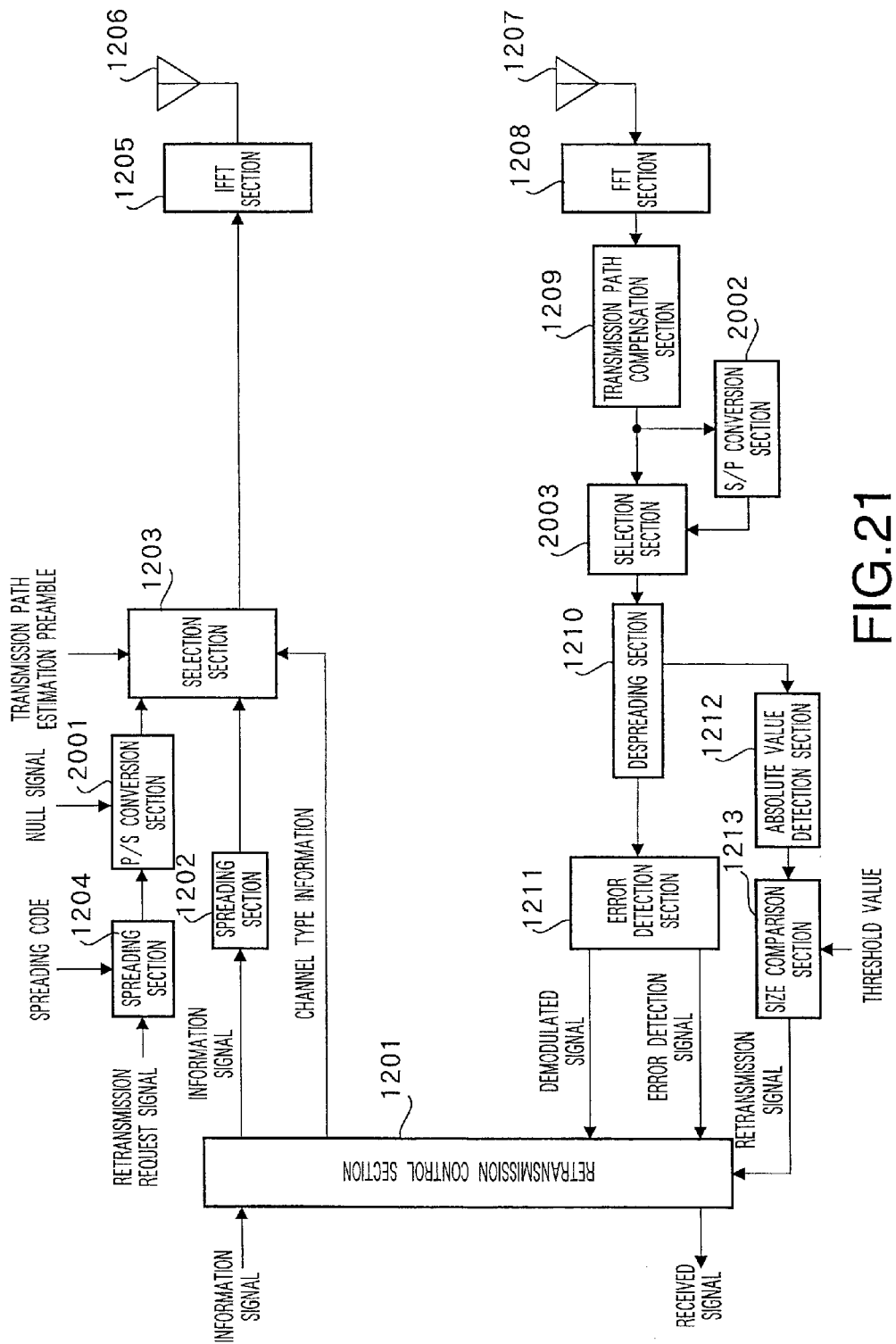
FIG. 21 is a block diagram showing the configuration of an OFDM communication apparatus according to Embodiment 9 of the present invention.

FIG. 21 is a block diagram showing the configuration of an OFDM communication apparatus according to Embodiment 9 of the present invention. Parts in FIG. 21 identical to those in Embodiment 5 (FIG. 13) are assigned the same codes as in FIG. 13 and their detailed explanations are omitted.

An OFDM communication apparatus according to this embodiment has a configuration wherein a P/S conversion section 2001, S/P conversion section 2002, and selection section 2003 are added to the configuration of an OFDM communication apparatus according to Embodiment 1.

<Operation of Transmitting System in Receiving-side Apparatus>

A null signal (for example, a signal whose amplitude is 0) and a multiplex signal from a spreading section 1204 are input to the P/S conversion section 2001. In the P/S conversion section 2001, P/S conversion processing is performed on the null signal and multiplex signal so that the multiplex signal is superimposed as appropriate on ordinary subcarriers, and the null signal is superimposed as appropriate on specific subcarriers, in IFFT processing by an IFFT section 1205. Signals that have undergone P/S conversion processing are output to a selection section 1203.

<Operation of Receiving System in Transmitting-side Apparatus>

A post-transmission-path-compensation-processing signal from transmission path compensation section 1209 is output directly to selection section 2003, and is also output to selection section 2003 after undergoing S/P conversion processing by the S/P conversion section 2002. In this way, a signal corresponding to a null signal in the post-transmission-path-compensation-processing signal and a signal corresponding to a multiplex signal in the post-transmission-path-compensation-processing signal are output to selection section 2003. A signal corresponding to a multiplex signal in the post-transmission-path-compensation-processing signal is selected by the selection section and output to a despreading section 1210.

Thus, according to this embodiment, the frequency band of a retransmission request OFDM signal is increased by superimposing a null signal instead of a multiplex signal on specific subcarriers from among all the subcarriers, thereby making it possible to prevent the reception level of signals transmitted by all ordinary subcarriers from falling significantly in the transmitting-side apparatus due to the fact that the multipath delay time is short. It is thus possible to improve the signal to thermal noise ratio for a retransmission request burst in the transmitting-side apparatus.

(Embodiment 10)

In this embodiment a case is described in which multiplex signals for different groups are superimposed on group-specific subcarriers in a retransmission request burst.

When there are a large number of groups, the number of spreading codes multiplexed in a multiplex signal may also be very large. In this case, loss of orthogonality between spreading codes increases, and so do mutual correlation components between spreading codes. There is therefore a greater possibility of the transmitting-side apparatus erroneously determining that a retransmission request has not been made (has been made) by a receiving-side apparatus for a predetermined information signal when such a retransmission request has been made (has not been made).

Figure 22:
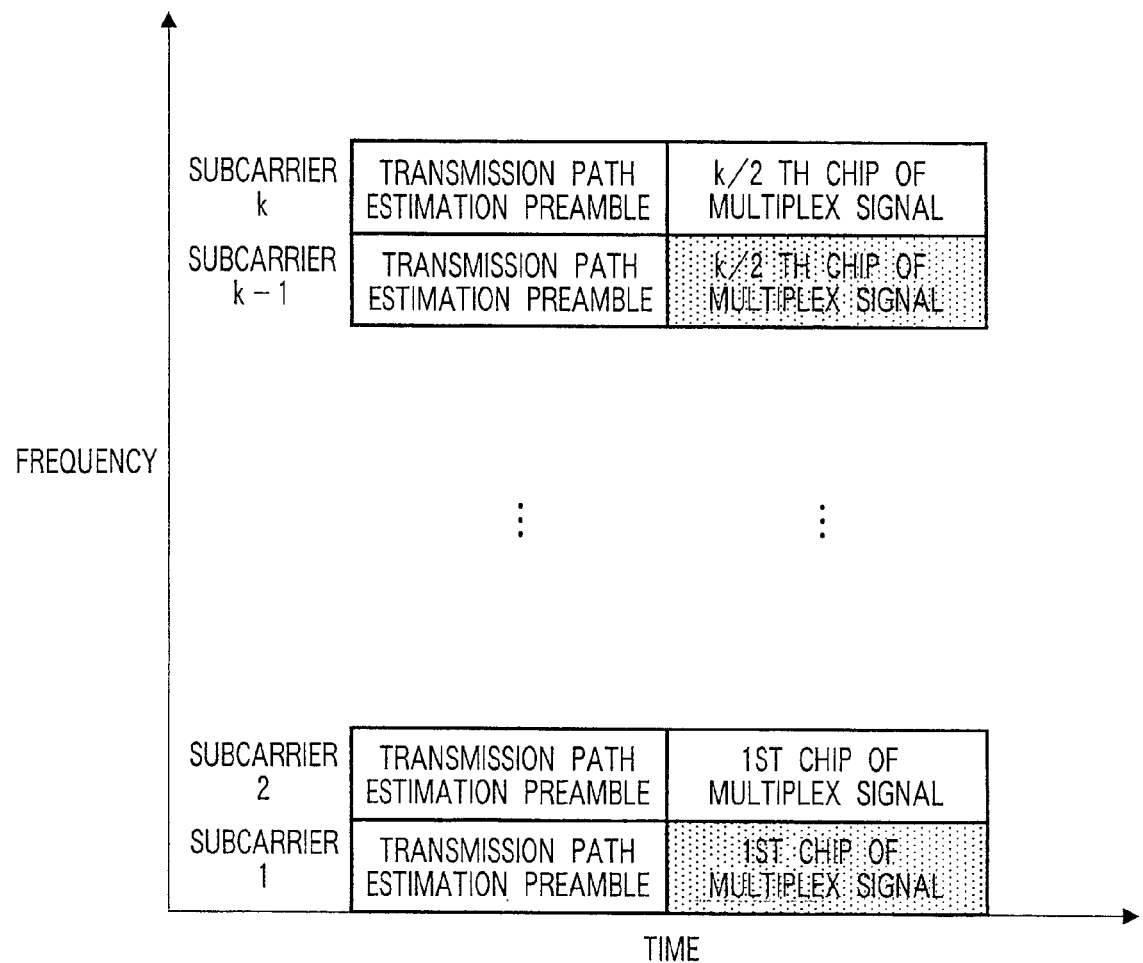
FIG. 22 is a schematic diagram showing an example of the subcarrier arrangement at the time of retransmission request burst generation in an OFDM communication apparatus according to Embodiment 10 of the present invention.

In this embodiment, therefore, instead of a multiplex signal for a specific information signal (that is, the first multiplex signal for a predetermined group) being superimposed on specific subcarriers from among all the subcarriers in inverse Fourier transform processing, a multiplex signal for an information signal other than that specific information signal (that is, the first multiplex signal for a group other than that predetermined group) is superimposed, as shown in FIG. 22. This is equivalent to superimposing the first multiplex signal for a predetermined group on subcarriers specific to the above-mentioned group.

Specifically, as shown in FIG. 22, specific subcarriers (in FIG. 22, subcarrier 2, subcarrier k, etc.) are first selected on an every-other-subcarrier basis from among subcarriers 1 through k. It goes without saying that any specific subcarriers can be selected from among all the subcarriers. Then a multiplex signal for a predetermined information signal (predetermined group) is superimposed on the selected specific subcarriers, and a multiplex signal for an information signal other than that predetermined information signal (a different group for that predetermined group) is superimposed on ordinary subcarriers (subcarriers excluding the specific subcarriers) from among all the subcarriers. That is to say, the first multiplex signal for the above-mentioned predetermined group is superimposed on subcarriers specific to that predetermined group (that is, specific subcarriers), and a multiplex signal for a different group from that predetermined group is superimposed on subcarriers specific to the above-mentioned different group (that is, ordinary subcarriers).

By this means, the number of multiplexings of a predetermined spreading code inserted in a retransmission request burst can be halved, and it is therefore possible to prevent a situation in which the transmitting-side apparatus erroneously determines that a retransmission request has not been made (has been made) by a receiving-side apparatus for a predetermined information signal when such a retransmission request has been made (has not been made).

Figure 23:
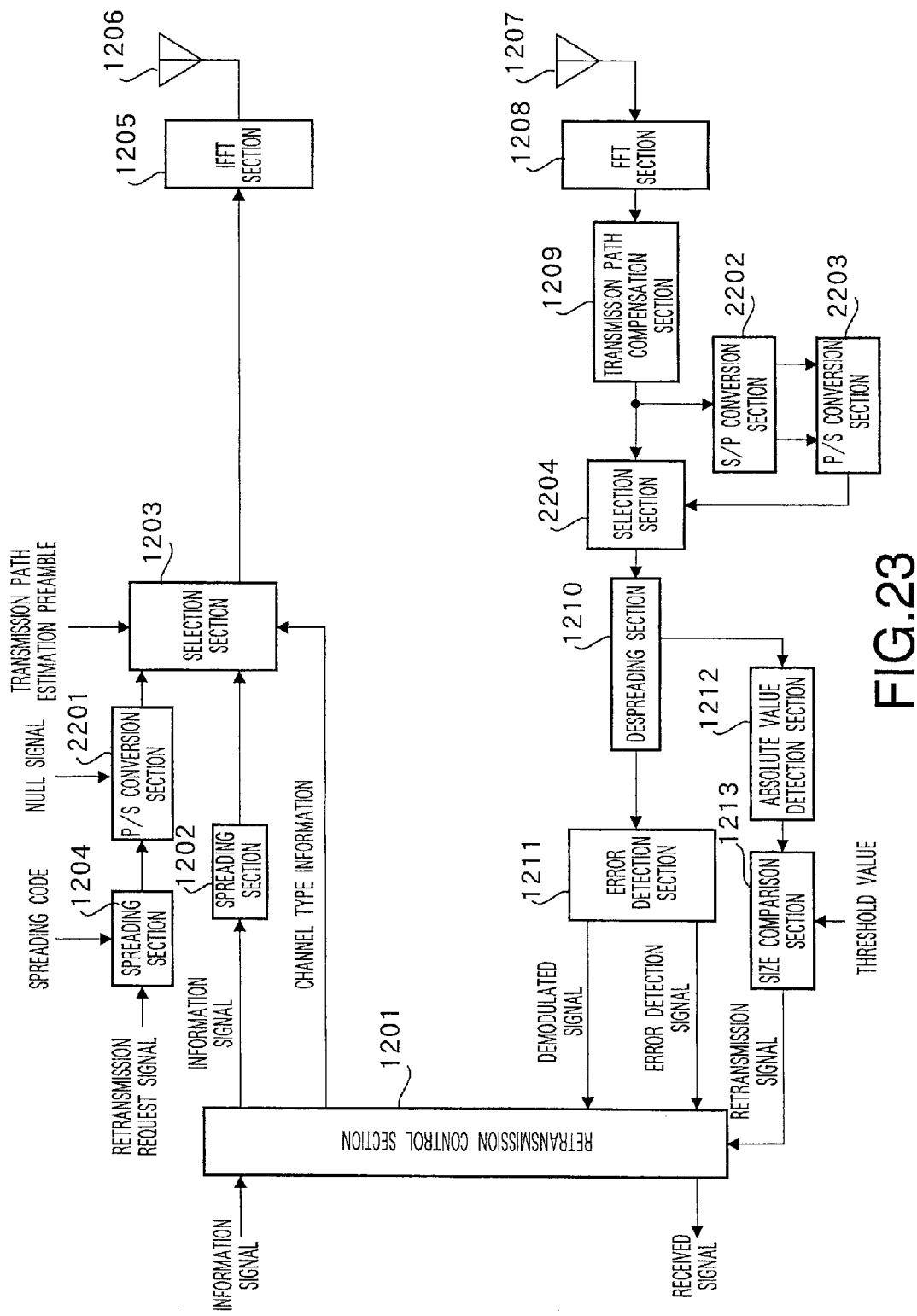
FIG. 23 is a block diagram showing the configuration of an OFDM communication apparatus according to Embodiment 10 of the present invention.

FIG. 23 is a block diagram showing the configuration of an OFDM communication apparatus according to Embodiment 10 of the present invention. Parts in FIG. 23 identical to those in Embodiment 5 (FIG. 13) are assigned the same codes as in FIG. 13 and their detailed explanations are omitted.

An OFDM communication apparatus according to this embodiment has a configuration wherein a P/S conversion section 2201, S/P conversion section 2202, P/S conversion section 2203, and selection section 2204 are added to the configuration of an OFDM communication apparatus according to Embodiment 1.

<Operation of Transmitting System in Receiving-side Apparatus>

A multiplex signal from a spreading section 1204 and a null signal (a signal whose amplitude is 0) are input to P/S conversion section 2201. The multiplex signal from spreading section 1204 and the null signal undergo P/S conversion processing by P/S conversion section 2201. In this conversion processing, a multiplex signal for a predetermined information signal (hereinafter referred to as "first multiplex signal") and a multiplex signal for an information signal other than that predetermined information signal (hereinafter referred to as "second multiplex signal") are superimposed as appropriate on ordinary subcarriers and specific subcarriers, as shown in FIG. 22.

<Operation of Receiving System in Transmitting-side Apparatus>

When this OFDM communication apparatus receives a retransmission request burst, a post-transmission-path-compensation-processing signal is output to the S/P conversion section 2202. The post-transmission-path-compensation-processing signal is converted from a single-sequence signal to a plurality of sequences of signals by the S/P conversion section 2202, then the plurality of sequences of signals are converted to a single-sequence signal by P/S conversion section 2203, and this signal is output to selection section 2204. In this way, a post-transmission-path-compensation-processing signal for a signal transmitted by ordinary subcarriers is output to selection section 2204, followed by a post-transmission-path-compensation-processing signal for a signal transmitted by specific subcarriers.

The signals after transmission path compensation processing for ordinary subcarriers and specific subcarriers, respectively, are then used in the above-described processing by a despreading section 1210, absolute value detection section 1212, and size comparison section 1213.

Thus, according to this embodiment, the number of multiplexings of a predetermined spreading code inserted in a retransmission request burst can be halved by superimposing the first multiplex signal for a predetermined group on subcarriers specific to that predetermined group (that is, superimposing the first multiplex signal for a different group on group-specific subcarriers in a retransmission request burst), thereby making it possible to prevent a situation in which the transmitting-side apparatus erroneously determines that a retransmission request has not been made (has been made) by a receiving-side apparatus for a predetermined information signal when such a retransmission request has been made (has not been made).

(Embodiment 11)

In this embodiment a case is described in which, in Embodiment 5, an identical spread signal (chip) in a multiplex signal is superimposed on a plurality of subcarriers specific to a spreading code.

In a multipath environment, as described in Embodiment 7, the occurrence of level deviation between chips in a received signal (more specifically, a post-transmission-path-compensation-processing signal) leads to loss of orthogonality between spreading codes in the received signal and an increase in the mutual correlation level between spreading codes. As the mutual correlation level between spreading codes in a received signal increases, so does the possibility that the transmitting-side apparatus will erroneously determine that retransmission of an information signal for a predetermined group has been requested by a receiving-side apparatus when no such request has been made, and will transmit this information signal to receiving-side apparatuses corresponding to that group.

Figure 24:
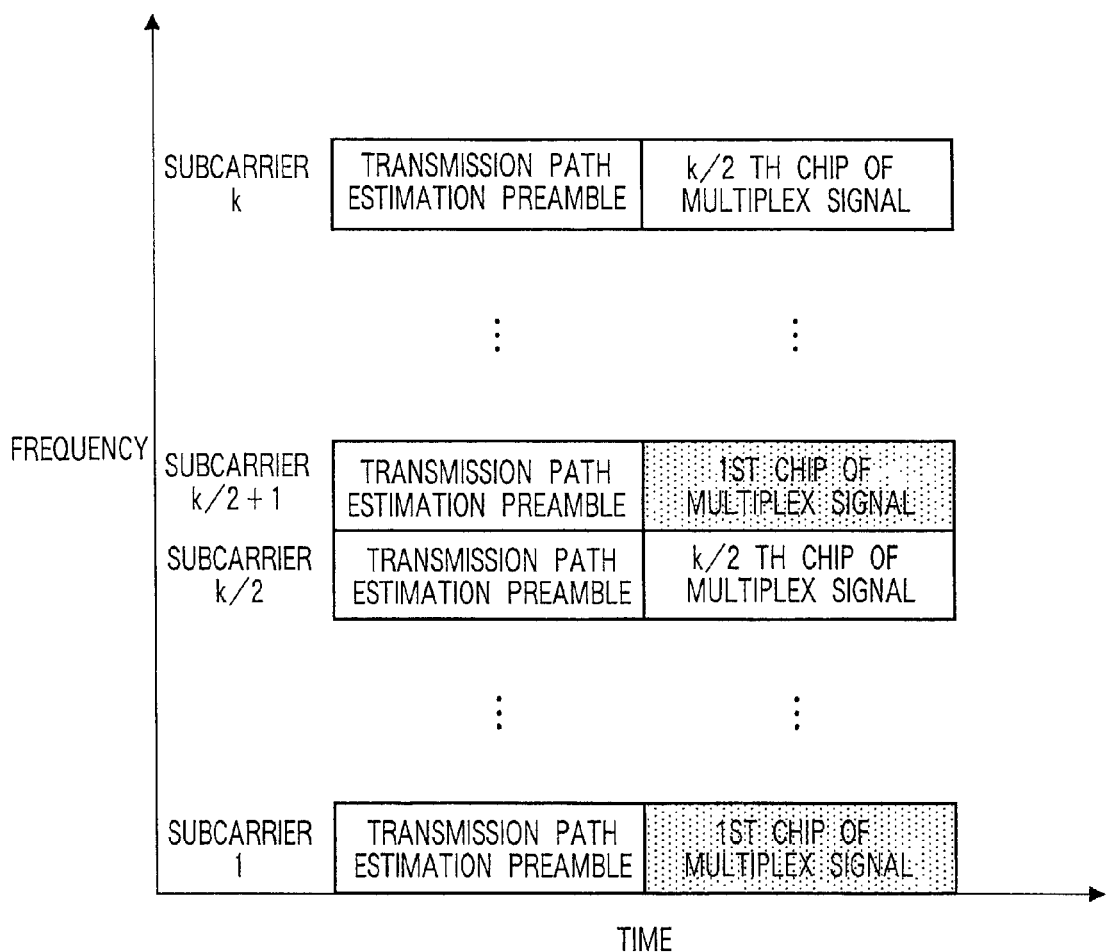
FIG. 24 is a schematic diagram showing an example of the subcarrier arrangement at the time of retransmission request burst generation in an OFDM communication apparatus according to Embodiment 11 of the present invention.

In this embodiment, therefore, an identical spread signal (chip) in a multiplex signal (second multiplex signal) is superimposed on a plurality of subcarriers specific to a spreading code. In this embodiment, an identical spread signal (chip) in a multiplex signal is superimposed on two subcarriers separated by a frequency interval corresponding to (total number of subcarriers/2), as shown in FIG. 24. As regards the subcarriers on which an identical spread signal is superimposed, it goes without saying that as long as the condition that a predetermined spread signal is superimposed on subcarriers specific to that predetermined spread signal is satisfied, any settings can be made for the number of subcarriers on which that predetermined spread signal is superimposed, the frequency interval between those subcarriers, and so forth.

By this means, it is possible to prevent the occurrence of level deviation between chips in a received signal due to the effects of multipath propagation, and so to prevent loss of orthogonality between spreading codes in the received signal. As a result, it is possible to reduce the possibility of the transmitting-side apparatus erroneously determining that retransmission of an information signal for a predetermined group has been requested by a receiving-side apparatus when no such request has been made, and transmitting this information signal to receiving-side apparatuses corresponding to that group.

Figure 25:
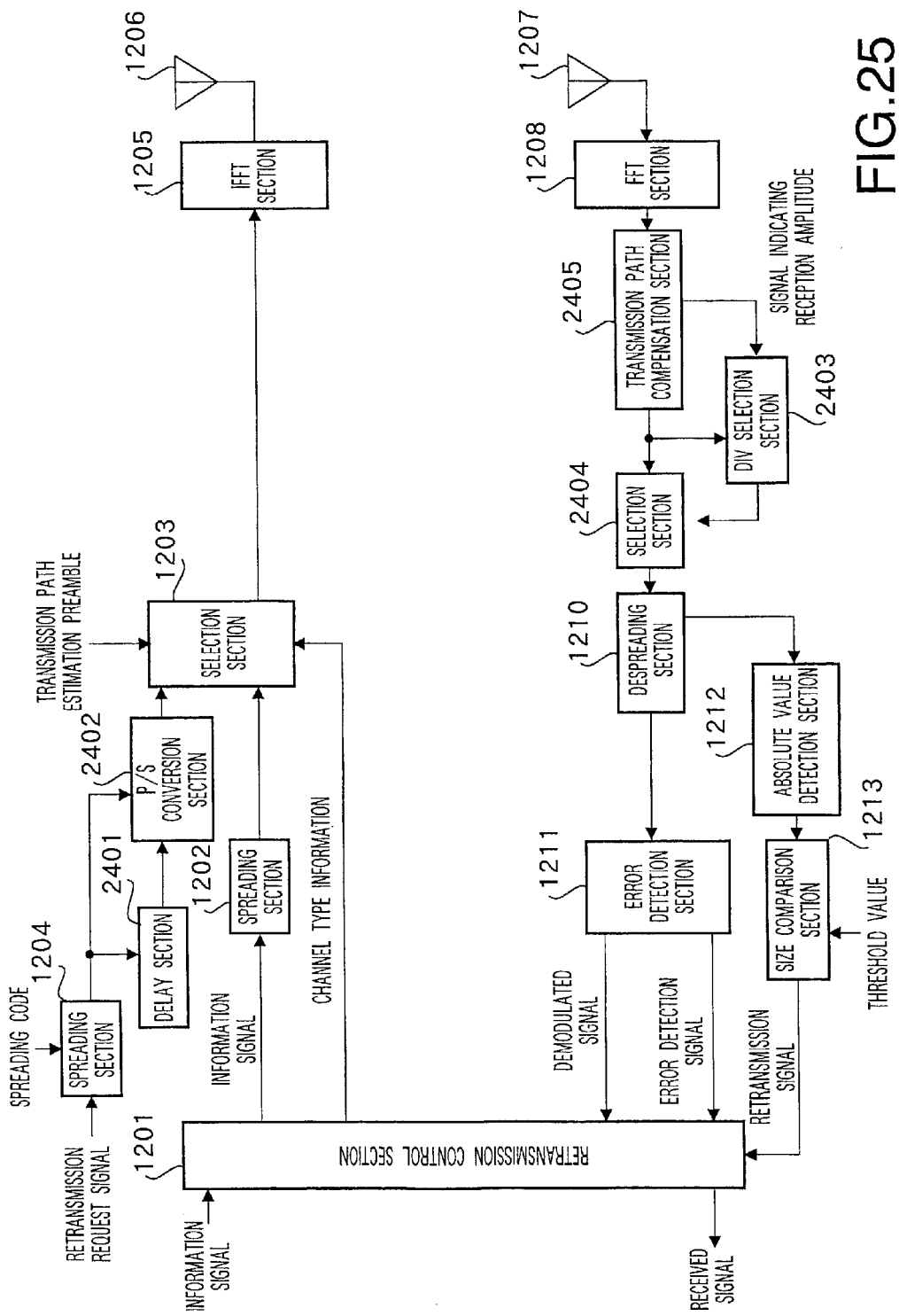
FIG. 25 is a block diagram showing the configuration of an OFDM communication apparatus according to Embodiment 11 of the present invention.

FIG. 25 is a block diagram showing the configuration of an OFDM communication apparatus according to Embodiment 11 of the present invention. Parts in FIG. 25 identical to those in Embodiment 5 (FIG. 13) are assigned the same codes as in FIG. 13 and their detailed explanations are omitted.

An OFDM communication apparatus according to this embodiment has a configuration wherein a delay section 2401, P/S conversion section 2402, DIV selection section 2403, and selection section 2404 are added to the configuration of an OFDM communication apparatus according to Embodiment 5, and a transmission path compensation section 2405 is used instead of transmission path compensation section 1209.

<Operation of Transmitting System in Receiving-side Apparatus>

A multiplex signal is output from a spreading section 1204 to the delay section 2401 and P/S conversion section 2402. A multiplex signal delayed by a predetermined time by the delay section 2401 is output to the P/S conversion section 2402.

In the P/S conversion section 2402, P/S conversion processing is performed on the multiplex signal and the multiplex signal delayed by a predetermined time so that an identical spread signal (chip) in the multiplex signal is superimposed as appropriate on two subcarriers, as shown in FIG. 24. A multiplex signal that has undergone P/S conversion is output to a selection section 1203.

<Operation of Receiving System in Transmitting-side Apparatus>

In the transmission path compensation section 2405, signals transmitted by the above-mentioned subcarriers are converted from a plurality of sequences of signals to a single-sequence signal and undergo transmission path compensation processing, thereby generating a post-transmission-path-compensation-processing signal. This post-transmission-path-compensation-processing signal is output to the DIV selection section 2403 and selection section 2404. The reception amplitude of the generated single-sequence signal is also detected by the transmission path compensation section 2405. A signal indicating this reception amplitude is also output to the DIV selection section 2403.

In the DIV selection section 2403, a subcarrier whose transmitted signal level is higher is selected from one and the other of the subcarriers on which the identical spread signal has been superimposed, and the post-transmission-path-compensation-processing signal for the signal transmitted by the selected subcarrier is output to selection section 2404.

Figure 26:
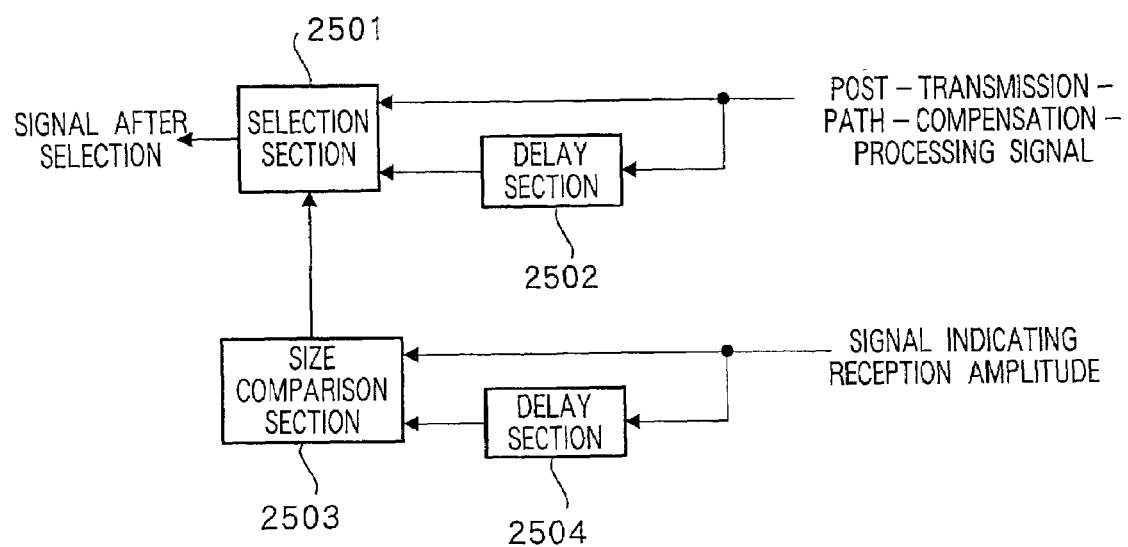
FIG. 26 is a block diagram showing the configuration of the DIV selection section in an OFDM communication apparatus according to Embodiment 11 of the present invention.

FIG. 26 is a block diagram showing the configuration of the DIV selection section 2403 in an OFDM communication apparatus according to Embodiment 11 of the present invention. In FIG. 26, the post-transmission-path-compensation-processing signal is output directly to a selection section 2501, and is also output to the selection section 2501 after being delayed by a predetermined time by a delay section 2502. By this means, a post-transmission-path-compensation-processing signal for the signal transmitted by one of the subcarriers on which an identical spread signal has been superimposed (hereinafter referred to as "first subcarrier") (for example, subcarrier 1 in FIG. 24) and a post-transmission-path-compensation-processing signal for the signal transmitted by the other of the above subcarriers (hereinafter referred to as "second subcarrier") (for example, subcarrier k/2+1 in FIG. 24) are output to the selection section 2501. Meanwhile, the signal indicating the reception amplitude is output directly to a size comparison section 2503, and is also output to the size comparison section 2503 after being delayed by a predetermined time by a delay section 2504. By this means, a signal indicating the reception amplitude of the signal transmitted by the first subcarrier and a signal indicating the reception amplitude of the signal transmitted by the second subcarrier are output to the size comparison section 2503.

In the size comparison section 2503, the reception amplitude of the signal transmitted by the first subcarrier and the reception amplitude of the signal transmitted by the second subcarrier are compared. The result of the comparison is output to the selection section 2501.

In the selection section 2501, the subcarrier whose transmit signal has the higher reception amplitude is selected from the first subcarrier and second subcarrier, using the result of the comparison by the size comparison section 2503, and the post-transmission-path-compensation-processing signal for the signal transmitted by the selected subcarrier is output to selection section 2404.

In selection section 2404, the post-transmission-path-compensation-processing signal from the DIV selection section 2403 (transmission path compensation section 2405) is selected as the signal to be output to a despreading section 1210 when this OFDM communication apparatus receives a retransmission request burst (multicast burst).

Thus, according to this embodiment, it is possible to prevent the occurrence of level deviation between chips in a received signal due to the effects of multipath propagation, and so to prevent loss of orthogonality between spreading codes in the received signal, by superimposing an identical spread signal (chip) in a multiplex signal on a plurality of subcarriers. As a result, it is possible to reduce the possibility of the transmitting-side apparatus erroneously determining that retransmission of an information signal for a predetermined group has been requested by a receiving-side apparatus when no such request has been made, and transmitting this information signal to receiving-side apparatuses corresponding to that group.

(Embodiment 12)

Figure 27:
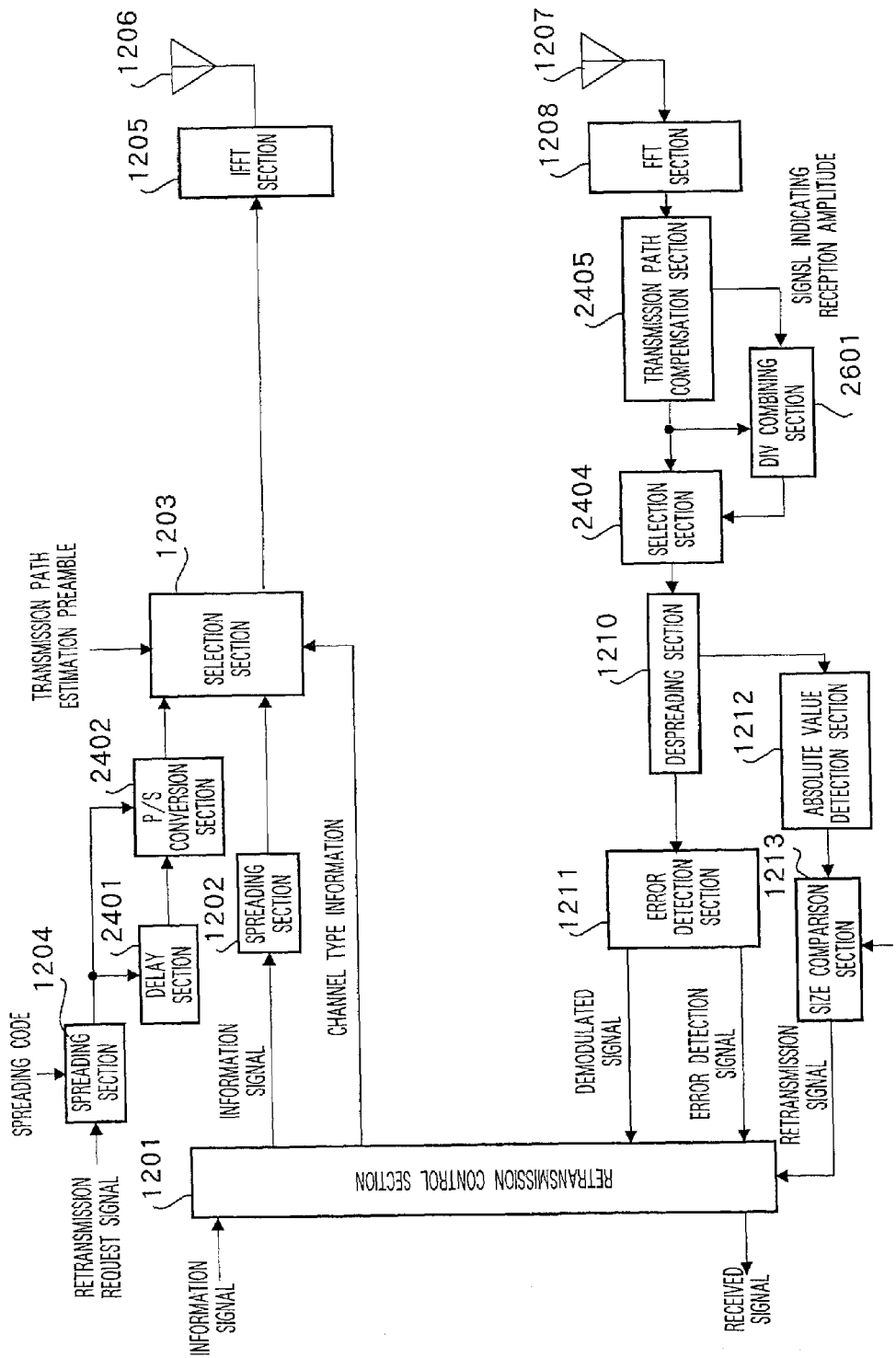
FIG. 27 is a block diagram showing the configuration of an OFDM communication apparatus according to Embodiment 12 of the present invention.

In this embodiment a case is described, with reference to FIG. 27, in which a retransmission request for a predetermined information signal is recognized using a signal obtained by equal-gain combining of the signals transmitted by the subcarriers on which an identical spread signal is superimposed in Embodiment 11. FIG. 27 is a block diagram showing the configuration of an OFDM communication apparatus according to Embodiment 12 of the present invention. Parts in FIG. 27 identical to those in Embodiment 11 (FIG. 25) are assigned the same codes as in FIG. 25 and their detailed explanations are omitted.

Figure 28:
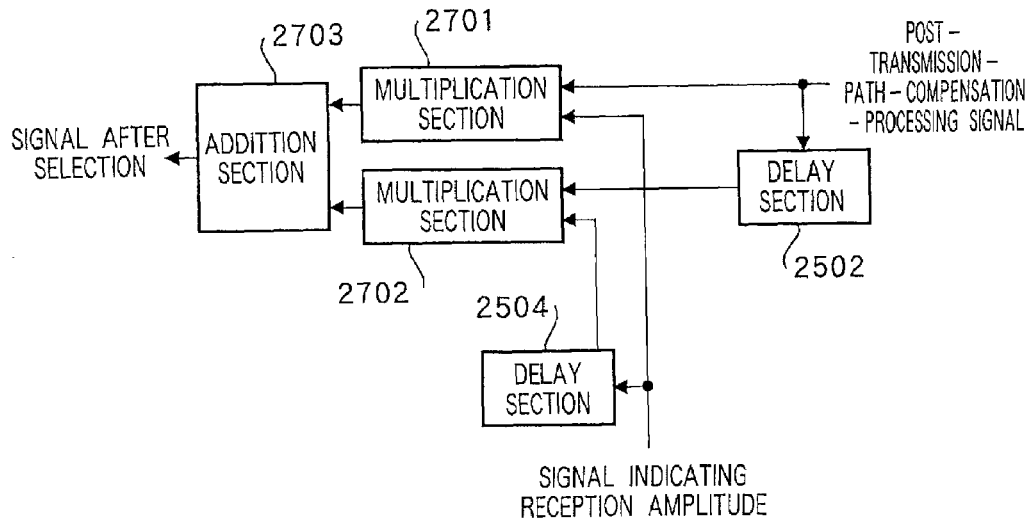
FIG. 28 is a block diagram showing the configuration of the DIV selection section in an OFDM communication apparatus according to Embodiment 12 of the present invention.

An OFDM communication apparatus according to this embodiment has a configuration wherein a DIV combining section 2601 is used instead of DIV selection section 2403 in an OFDM communication apparatus according to Embodiment 11. FIG. 28 is a block diagram showing the configuration of the DIV selection section in an OFDM communication apparatus according to Embodiment 12 of the present invention. Parts in FIG. 28 identical to those in Embodiment 11 (FIG. 26) are assigned the same codes as in FIG. 26 and their detailed explanations are omitted.

<Operation of Receiving System in Transmitting-side Apparatus>

In the DIV combining section 2601, post-transmission-path-compensation-processing signals for signals transmitted by a first subcarrier and second subcarrier are first multiplied by the reception amplitude of the signal transmitted by the first subcarrier and second subcarrier, respectively. These post-transmission-path-compensation-processing signals multiplied by the respective reception amplitudes are then added. The post-transmission-path-compensation-processing signal obtained by this addition is output to a selection section 2404.

More specifically, a post-transmission-path-compensation-processing signal is output directly to a multiplication section 2701, and is also output to a multiplication section 2702 after being delayed by a predetermined time by a delay section 2502. Also, a signal indicating the reception amplitude is output directly to multiplication section 2701, and is also output to multiplication section 2702 after being delayed by a predetermined time by a delay section 2504.

By this means, a post-transmission-path-compensation-processing signal for the signal transmitted by the first subcarrier and a signal indicating the reception amplitude of the signal transmitted by the first subcarrier are output to multiplication section 2701. In this multiplication section 2701, the above post-transmission-path-compensation-processing signal is multiplied by the above signal indicating the reception amplitude. The post-transmission-path-compensation-processing signal multiplied by the reception amplitude in multiplication section 2701 is output to an addition section 2703. Also, a post-transmission-path-compensation-processing signal for the signal transmitted by the second subcarrier and a signal indicating the reception amplitude of the signal transmitted by the second subcarrier are output to a multiplication section 2702. In this multiplication section 2702, the above demodulated signal is multiplied by the above signal indicating the reception amplitude. The post-transmission-path-compensation-processing signal multiplied by the reception amplitude in multiplication section 2702 is output to the addition section 2703. In the addition section 2703, the post-transmission-path-compensation-processing signals multiplied by the respective reception amplitudes are added. The demodulated signal obtained by this addition is output to selection section 2404.

Thus, according to this embodiment, a retransmission request for a predetermined information signal is recognized using a signal obtained by equal-gain combining of signals transmitted by subcarriers on which an identical spread signal is superimposed. By this means, the transmitting-side apparatus can recognize a retransmission request for an information signal more reliably than in the case of Embodiment 11.

(Embodiment 13)

In this embodiment a case is described in which a retransmission request for a predetermined information signal is recognized using a signal obtained by maximal-ratio combining of the signals transmitted by the subcarriers on which an identical spread signal is superimposed in Embodiment 11.

The configuration of an OFDM communication apparatus according to this embodiment is similar to the configuration of an OFDM communication apparatus according to Embodiment 11, except for the DIV combining section 2601, and therefore a detailed description of the configuration is omitted here.

Figure 29:
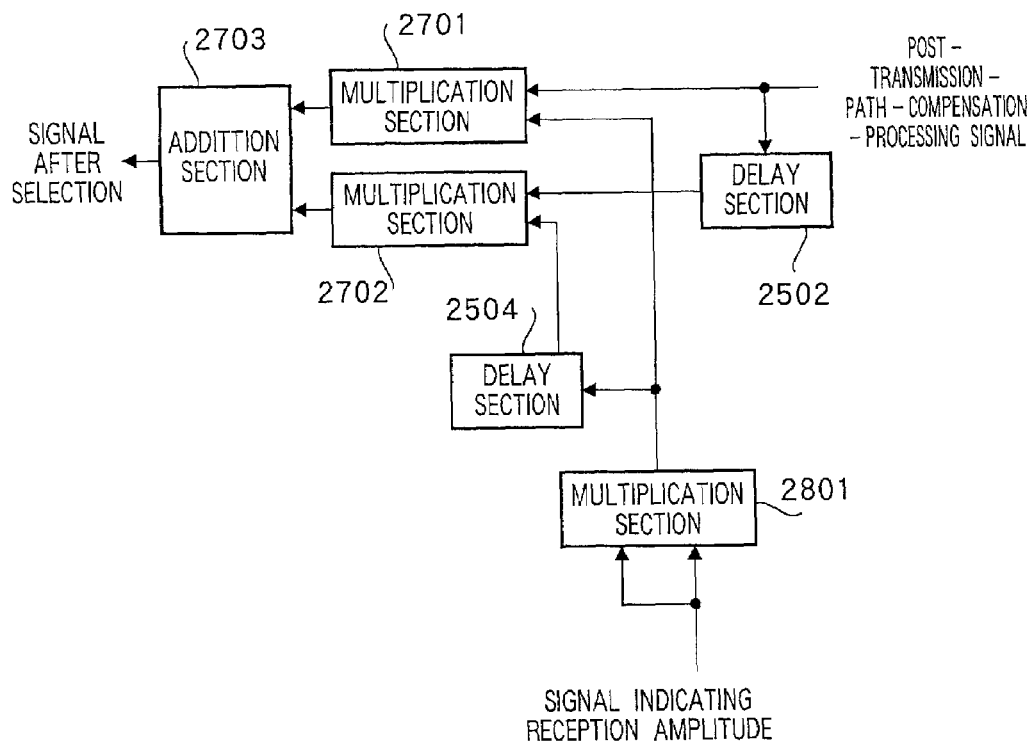
FIG. 29 is a block diagram showing the configuration of the DIV combining section in an OFDM communication apparatus according to Embodiment 13 of the present invention.

FIG. 29 is a block diagram showing the configuration of the DIV combining section 2601 in an OFDM communication apparatus according to Embodiment 13 of the present invention. Parts in FIG. 29 identical to those in Embodiment 12 (FIG. 28) are assigned the same codes as in FIG. 28 and their detailed explanations are omitted.

In the DIV combining section 2601, post-transmission-path-compensation-processing signals for signals transmitted by a first subcarrier and second subcarrier are first multiplied by the power of the signal transmitted by the first subcarrier and second subcarrier, respectively. The post-transmission-path-compensation-processing signals multiplied by the respective powers are then added. The posttransmission-path-compensation-processing signal obtained by this addition is output to a selection section 2404.

More specifically, a post-transmission-path-compensation-processing signal is output directly to a multiplication section 2701, and is also output to a multiplication section 2702 after being delayed by a predetermined time by a delay section 2502. Also, a signal indicating the reception amplitude is converted to two sequences and then output to a multiplication section 2801. The signals of the two sequences are multiplied by multiplication section 2801. By this means, a signal in which the above-mentioned reception amplitude is squared (that is, a signal indicating the power of the signals transmitted by the subcarriers) is generated. This signal indicating power is output directly to multiplication section 2701, and is also output to multiplication section 2702 after being delayed by a predetermined time by a delay section 2504.

By this means, a post-transmission-path-compensation-processing signal for the signal transmitted by the first subcarrier and a signal indicating the power of the signal transmitted by the first subcarrier are output to multiplication section 2701. In this multiplication section 2701, the above-mentioned post-transmission-path-compensation-processing signal is multiplied by the above-mentioned signal indicating power. The post-transmission-path-compensation-processing signal multiplied by power in multiplication section 2701 is output to an addition section 2703. Also, a post-transmission-path-compensation-processing signal for the signal transmitted by the second subcarrier and a signal indicating the power of the signal transmitted by the second subcarrier are output to multiplication section 2702. In this multiplication section 2702, the above-mentioned post-transmission-path-compensation-processing signal is multiplied by the above-mentioned signal indicating power. The post-transmission-path-compensation-processing signal multiplied by power in multiplication section 2702 is output to the addition section 2703. In the addition section 2703, the post-transmission-path-compensation-processing signals multiplied by the respective powers are added. The post-transmission-path-compensation-processing signal obtained by this addition is output to selection section 2404.

Thus, according to this embodiment, a retransmission request for a predetermined information signal is recognized using a signal obtained by maximal-ratio combining of signals transmitted by subcarriers on which an identical spread signal is superimposed. By this means, the transmitting-side apparatus can recognize a retransmission request for an information signal more reliably than in the case of Embodiment 12.

(Embodiment 14)

In this embodiment a case is described in which a retransmission request for a predetermined signal is recognized using a signal obtained by despreading processing on a received signal prior to Fourier transform processing for a retransmission request burst in Embodiment 5.

Figure 30:
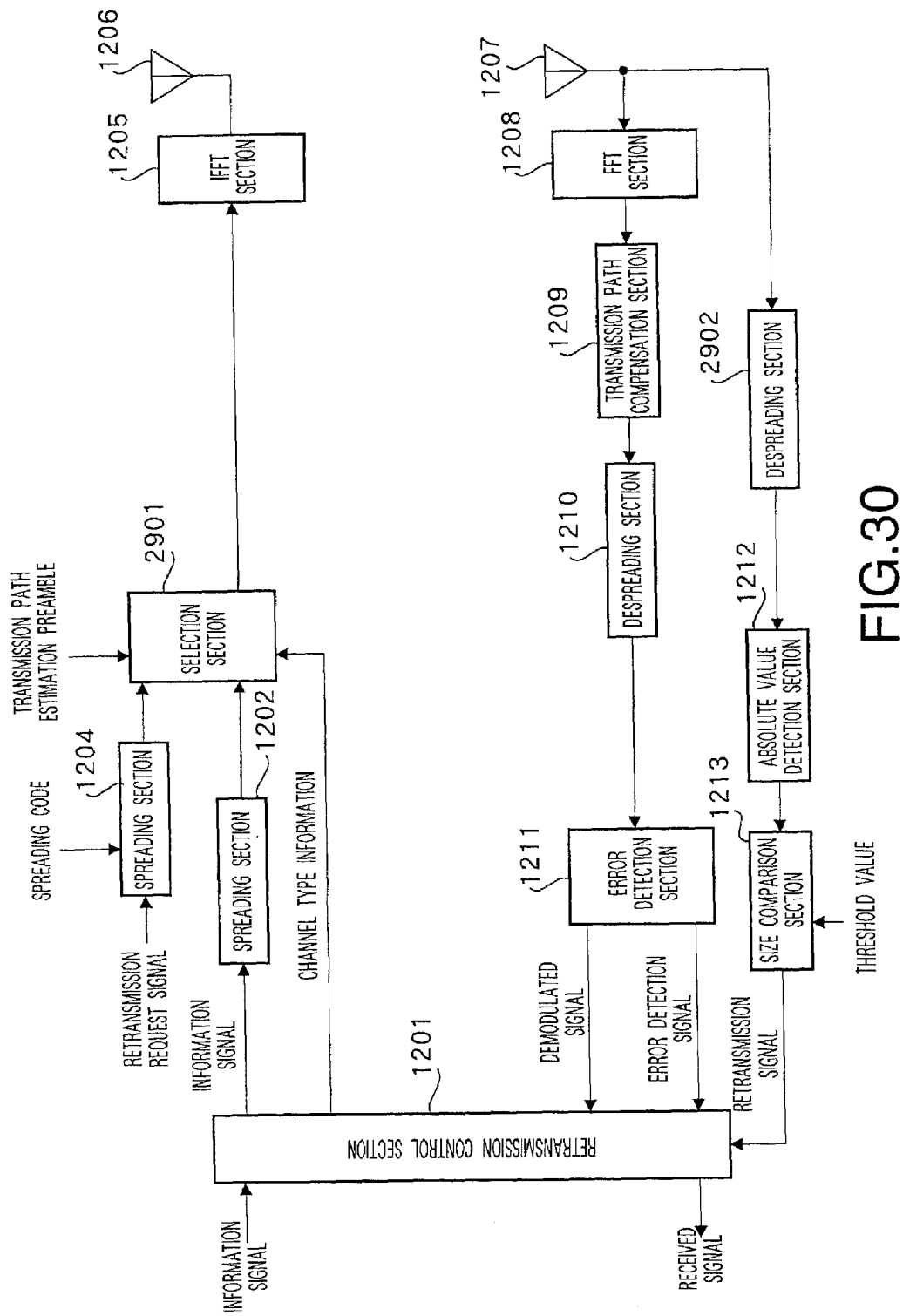
FIG. 30 is a block diagram showing the configuration of an OFDM communication apparatus according to Embodiment 14 of the present invention.

FIG. 30 is a block diagram showing the configuration of an OFDM communication apparatus according to Embodiment 14 of the present invention. Parts in FIG. 30 identical to those in Embodiment 5 (FIG. 13) are assigned the same codes as in FIG. 13 and their detailed explanations are omitted.

An OFDM communication apparatus according to this embodiment has a configuration wherein a selection section 2901 is used instead of selection section 1203 in an OFDM communication apparatus according to Embodiment 5, and a despreading section 2902 is provided.

<Operation of Transmitting System in Receiving-side Apparatus>

Figure 31:
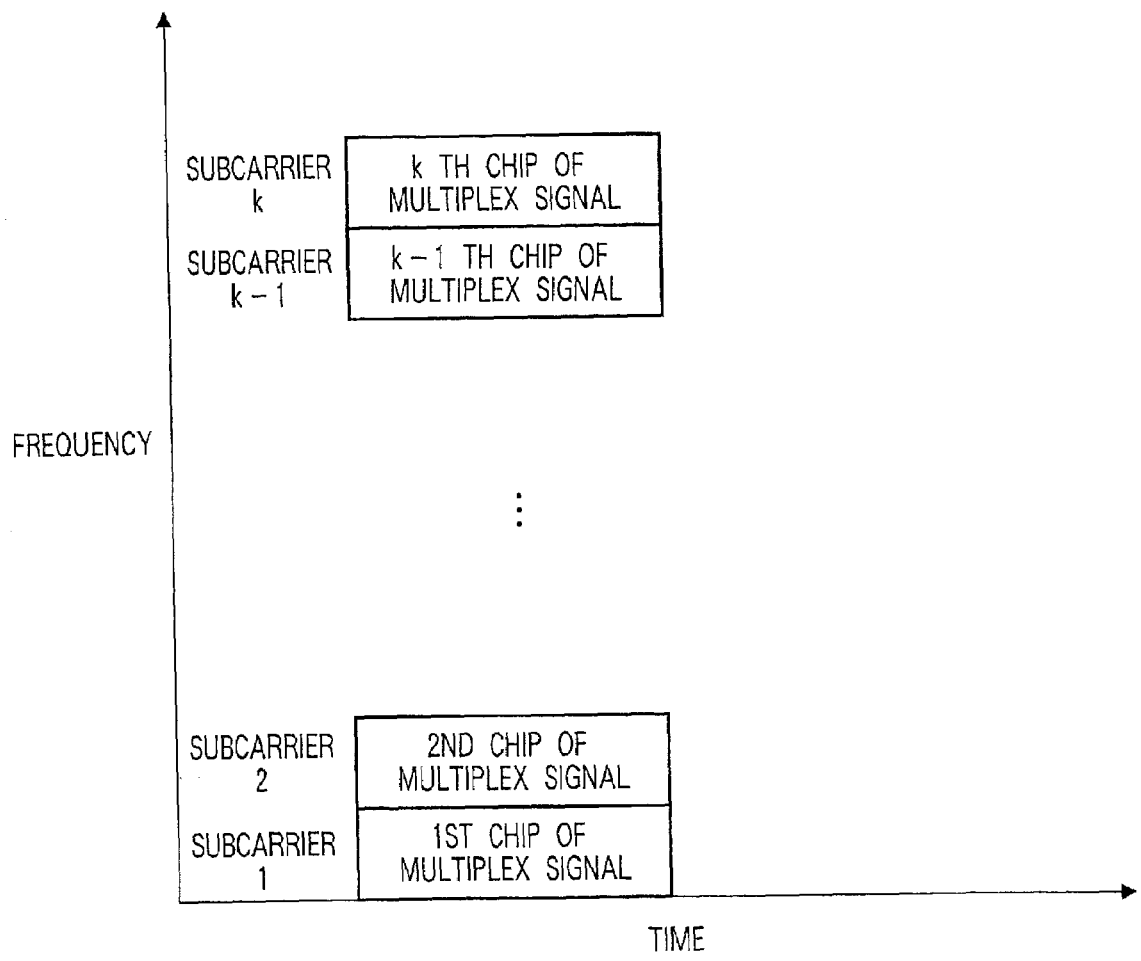
FIG. 31 is a schematic diagram showing an example of the subcarrier arrangement at the time of retransmission request burst generation in an OFDM communication apparatus according to Embodiment 14 of the present invention.

When this OFDM communication apparatus receives a retransmission request burst, only a multiplex signal, and not a transmission path estimation preamble, is output from the selection section 2901 to an IFFT section 1205. By this means, the subcarrier arrangement in IFFT processing by the IFFT section 1205 is such that a transmission path estimation preamble is not superimposed on any subcarrier, as shown in FIG. 31.

<Operation of Receiving System in Transmitting-side Apparatus>

A received signal from an antenna 1207 is output to despreading section 2902. In despreading section 2902, despreading processing is performed on the received signal from antenna 1207—that is, the received signal prior to Fourier transform processing-using a spreading code subjected to inverse Fourier transform processing. It goes without saying that the spreading code here is the same as the spreading code in despreading section 1210 in Embodiment 5 (that is, the spreading code used by spreading section 1204). The signal obtained as a result of the despreading processing by despreading section 2902 is handled by an absolute value detection section 1212 in the same way as the demodulated signal obtained by despreading section 1210 in Embodiment 5.

Thus, according to this embodiment, a retransmission request for a predetermined signal is recognized using a signal obtained by despreading processing on a received signal prior to Fourier transform processing for a retransmission request burst. As a result, it is not necessary to insert a transmission path estimation preamble in a retransmission request burst, enabling the signal length of a retransmission request burst to be shortened. Information signal transmission efficiency can thus be further improved.

An OFDM communication apparatus according to above Embodiment 1 through Embodiment 14 can be installed in a communication terminal apparatus and base station apparatus in a digital mobile communication system. By installing an OFDM communication apparatus that achieves both an improvement in information signal transmission efficiency and an improvement in demodulated signal error rate characteristics, it is possible to provide a communication terminal apparatus and base station apparatus that perform good communications.

As described above, according to the present invention it is possible to provide an OFDM communication apparatus that achieves both an improvement in information signal transmission efficiency and an improvement in demodulated signal error rate characteristics in an OFDM method to which multicasting is applied.

This application is based on Japanese Patent Application No. 2000-360113 filed on Nov. 27, 2000, entire contents of which are expressly incorporated by reference herein.

INDUSTRIAL APPLICABILITY

The present invention relates to an OFDM (Orthogonal Frequency Division Multiplexing) method communication apparatus, and is applicable, in particular, to an OFDM communication apparatus that performs retransmission control (control whereby, if an error occurs in a demodulated signal in a receiving-side apparatus for a predetermined transmit signal, that transmit signal is retransmitted to the receiving-side apparatus).

The invention claimed is:

1. An OFDM communication apparatus comprising:
a receiving section that receives an OFDM signal transmitted to a plurality of OFDM communication apparatuses;
a detecting section that detects whether or not there is an error in a received OFDM signal;
a generating section that generates a retransmission request OFDM signal by superimposing a retransmission request signal on a previously specified subcarrier when there is an error in a received OFDM signal; and
a transmitting section that transmits a generated retransmission request OFDM signal at previously set timing common to all said plurality of OFDM communication apparatuses.

2. The OFDM communication apparatus according to claim 1, wherein said retransmission request signal has a level higher than an information signal contained in an OFDM signal received by said receiving section.

3. An OFDM communication apparatus comprising:
a receiving section that receives a plurality of retransmission request OFDM signals in which a retransmission request signal is superimposed on different subcarriers from a plurality of OFDM communication apparatuses;
an extracting section that extracts a retransmission request signal superimposed on each subcarrier from a received plurality of retransmission request OFDM signals; and
a determining section that determines OFDM signal retransmission for an extracted retransmission request signal based on a level of that retransmission request signal.

4. The OFDM communication apparatus according to claim 3, further comprising a selecting section that selects from among subcarriers on which an identical retransmission request signal extracted by said extracting section is superimposed a subcarrier for which a level of that identical retransmission request signal is highest;
wherein said determining section determines presence or absence of transmission of an OFDM signal for which retransmission is requested, based on a level of a retransmission request signal superimposed on a selected subcarrier.

5. The OFDM communication apparatus according to claim 3, further comprising a generating section that generates an equal-gain-combined signal by combining signals resulting from multiplying an identical retransmission request signal extracted by said extracting section by amplitude of that identical retransmission request signal;
wherein said determining section determines presence or absence of transmission of an OFDM signal for which retransmission is requested, based on a level of a generated equal-gain-combined signal.

6. The OFDM communication apparatus according to claim 3, further comprising a generating section that generates a maximal-ratio-combined signal by combining signals resulting from multiplying an identical retransmission request signal extracted by said extracting section by power of that identical retransmission request signal;
wherein said determining section determines presence or absence of transmission of an OFDM signal for which retransmission is requested, based on a level of a generated maximal-ratio-combined signal.

7. A communication terminal apparatus provided with the OFDM communication apparatus according to claim 1.

8. A base station apparatus provided with the OFDM communication apparatus according to claim 1.

9. An OFDM communication apparatus comprising:
a receiving section that receives an OFDM signal transmitted to a plurality of OFDM communication apparatuses;
a detecting section that detects whether or not there is an error in a received OFDM signal;
a generating section that generates a retransmission request OFDM signal by superimposing on a subcarrier a multiplex signal containing a retransmission request signal subjected to spreading processing by means of a previously specified retransmission request spreading code when there is an error in a received OFDM signal; and
a transmitting section that transmits a generated retransmission request OFDM signal at previously set timing common to all said plurality of OFDM communication apparatuses.

10. The OFDM communication apparatus according to claim 9, wherein said retransmission request signal has a level higher than an information signal contained in an OFDM signal received by said receiving section.

11. The OFDM communication apparatus according to claim 9, wherein said retransmission request spreading code has a smaller spreading ratio than an information signal spreading code used when spreading an information signal contained in an OFDM signal received by said receiving section.

12. The OFDM communication apparatus according to claim 9, wherein said generating section generates a retransmission request OFDM signal by superimposing a signal whose amplitude is zero on a specific subcarrier provided separately from an ordinary subcarrier.

13. The OFDM communication apparatus according to claim 9, wherein said generating section generates a retransmission request OFDM signal by superimposing said multiplex signal on a number of ordinary subcarriers corresponding to a spreading ratio of said retransmission request spreading code.

14. The OFDM communication apparatus according to claim 9, wherein said generating section generates a retransmission request OFDM signal by superimposing a multiplex signal on a previously specified subcarrier.

15. The OFDM communication apparatus according to claim 9, wherein said generating section includes a converting section that converts said multiplex signal from a single-sequence signal to a plurality of sequences of signals based on a retransmission request spreading code rate, and generates a retransmission request OFDM signal by superimposing a converted signal of each sequence on a previously specified ordinary subcarrier.

16. An OFDM communication apparatus comprising:
a receiving section that receives a retransmission request OFDM signal in which a multiplex signal containing a retransmission request signal subjected to spreading processing by means of a previously specified retransmission request spreading code is superimposed on a subcarrier for each of a plurality of OFDM communication apparatuses;
a demodulating section that generates a demodulated signal by despreading a received retransmission request OFDM signal by means of said retransmission request spreading code; and
a determining section that determines retransmission of an OFDM signal for which retransmission is requested for a generated demodulated signal based on a level of that demodulated signal.

17. The OFDM communication apparatus according to claim 16, wherein:
said demodulating section generates a demodulated signal for each said retransmission request spreading code; and
said determining section determines presence or absence of transmission of an OFDM signal for which retransmission is requested, based on a level of said demodulated signal for each said retransmission request spreading code.

18. An OFDM communication apparatus comprising:
a receiving section that receives a retransmission request OFDM signal superimposed on a previously specified ordinary subcarrier for each of a plurality of sequences of signals corresponding to a spreading ratio of a retransmission request spreading code;
an extracting section that extracts a signal superimposed on said ordinary subcarrier of a received retransmission request OFDM signal;
a converting section that converts an extracted signal to a single-sequence signal;
a demodulating section that generates a demodulated signal by despreading said single-sequence signal by means of said retransmission request spreading code; and
a determining section that determines retransmission of an OFDM signal for which retransmission is requested for a generated demodulated signal based on a level of that demodulated signal.

19. The OFDM communication apparatus according to claim 18, further comprising a selecting section that selects from among ordinary subcarriers on which an identical signal extracted by said extracting section is superimposed an ordinary subcarrier for which a level of that identical signal is highest;
wherein said converting section converts a signal superimposed on a selected ordinary subcarrier to a single-sequence signal.

20. The OFDM communication apparatus according to claim 18, wherein said converting section performs conversion to a single-sequence signal by combining signals resulting from multiplying an identical signal extracted by said extracting section by amplitude of that identical signal.

21. The OFDM communication apparatus according to claim 18, wherein said converting section performs conversion to a single-sequence signal by combining signals resulting from multiplying an identical signal extracted by said extracting section by power of that identical signal.

22. A communication terminal apparatus provided with the OFDM communication apparatus according to claim 9.

23. A communication terminal apparatus provided with the OFDM communication apparatus according to claim 9.

24. A communication terminal apparatus provided with the OFDM communication apparatus according to claim 18.

25. A base station apparatus provided with the OFDM communication apparatus according to claim 18.

26. An OFDM communication method comprising:
a receiving step of receiving an OFDM signal transmitted to a plurality of OFDM communication apparatuses;
a detecting step of detecting whether or not there is an error in a received OFDM signal;
a generating step of generating a retransmission request OFDM signal by superimposing a retransmission request signal on a previously specified subcarrier when there is an error in a received OFDM signal; and
a transmitting step of transmitting a generated retransmission request OFDM signal at previously set timing common to all said plurality of OFDM communication apparatuses.

27. An OFDM communication method comprising:
a receiving step of receiving a retransmission request OFDM signal in which a retransmission request signal is superimposed on a previously specified subcarrier for each of a plurality of OFDM communication apparatuses;
an extracting step of extracting a retransmission request signal superimposed on each specified subcarrier of a received retransmission request OFDM signal; and
a determining step of determining retransmission of an OFDM signal for which retransmission is requested for an extracted retransmission request signal based on a level of that retransmission request signal.

28. An OFDM communication method comprising:
a receiving step of receiving an OFDM signal transmitted to a plurality of OFDM communication apparatuses;
a detecting step of detecting whether or not there is an error in a received OFDM signal;
a generating step of generating a retransmission request OFDM signal by superimposing on a subcarrier a multiplex signal containing a retransmission request signal subjected to spreading processing by means of a previously specified retransmission request spreading code when there is an error in a received OFDM signal; and
a transmitting step of transmitting a generated retransmission request OFDM signal at previously set timing common to all said plurality of OFDM communication apparatuses.

29. An OFDM communication method comprising:
a receiving step of receiving a retransmission request OFDM signal in which a multiplex signal containing a retransmission request signal subjected to spreading processing by means of a previously specified retransmission request spreading code is superimposed on a subcarrier for each of a plurality of OFDM communication apparatuses;
a demodulating step of generating a demodulated signal by despreading a received retransmission request OFDM signal by means of said retransmission request spreading code; and
a determining step of determining retransmission of an OFDM signal for which retransmission is requested for a generated demodulated signal based on a level of that demodulated signal.

30. An OFDM communication method comprising:
a receiving step of receiving a retransmission request OFDM signal superimposed on a previously specified ordinary subcarrier for each of a plurality of sequences of signals corresponding to a spreading ratio of a retransmission request spreading code;
an extracting step of extracting a signal superimposed on said ordinary subcarrier of a received retransmission request OFDM signal;
a converting step of converting an extracted signal to a single-sequence signal;
a demodulating step of generating a demodulated signal by despreading said single-sequence signal by means of said retransmission request spreading code; and a determining step of determining retransmission of an OFDM signal for which retransmission is requested for a generated demodulated signal based on a level of that demodulated signal.

31. A communication terminal apparatus provided with the OFDM communication apparatus according to claim 3.

32. A base station apparatus provided with the OFDM communication apparatus according to claim 3.

33. A communication terminal apparatus provided with the OFDM communication apparatus according to claim 16.

34. A base station apparatus provided with the OFDM communication apparatus according to claim 16.

* * * * *